(12) United States Patent
Mitchell et al.

(10) Patent No.: US 11,565,334 B2
(45) Date of Patent: Jan. 31, 2023

(54) METHOD AND APPARATUS FOR PROVIDING FLITCHES TO AN EDGER

(71) Applicant: Salem Equipment, Inc., Sherwood, OR (US)

(72) Inventors: Rory Matthew Mitchell, Beaverton, OR (US); Allison Nicole Mitchell, Beaverton, OR (US)

(73) Assignee: Salem Equipment, Inc., Sherwood, OR (US)

( * ) Notice: Subject to any disclaimer, the term of this patent is extended or adjusted under 35 U.S.C. 154(b) by 414 days.

(21) Appl. No.: 16/823,607

(22) Filed: Mar. 19, 2020

(65) Prior Publication Data

US 2020/0215630 A1 Jul. 9, 2020

Related U.S. Application Data

(63) Continuation-in-part of application No. 16/438,005, filed on Jun. 11, 2019, now Pat. No. 11,267,157.

(60) Provisional application No. 62/683,509, filed on Jun. 11, 2018.

(51) Int. Cl.
*B27B 31/02* (2006.01)
*B23D 59/00* (2006.01)
*B27B 29/02* (2006.01)

(52) U.S. Cl.
CPC ............ *B23D 59/008* (2013.01); *B27B 29/02* (2013.01); *B27B 31/02* (2013.01)

(58) Field of Classification Search
CPC .......... B27B 5/04; B27B 25/00; B27B 25/02; B27B 25/04; B27B 25/06; B27B 31/00; B27B 31/003; B27B 31/006; B27B 31/02; B27B 31/04; B27B 31/06; B65G 47/244
See application file for complete search history.

(56) References Cited

U.S. PATENT DOCUMENTS

| | | | | |
|---|---|---|---|---|
| 4,462,443 A | * | 7/1984 | Allen | ...................... B27B 29/00 144/242.1 |
| 6,308,756 B1 | * | 10/2001 | Anttila | .................... B27B 31/06 144/242.1 |
| 2008/0230151 A1 | * | 9/2008 | Appeldoorn | ......... B23D 59/002 144/382 |

* cited by examiner

*Primary Examiner* — Matthew Katcoff
(74) *Attorney, Agent, or Firm* — Chernoff, Vilhauer, McClung & Stenzel, LLP

(57) ABSTRACT

An edger feed apparatus and method of feeding flitches into an edger are disclosed. The flitches are positioned with minimal spacing between successive flitches and with flitches positioned and the edger adjusted so as to yield a maximum value of lumber from each flitch. The edger feed apparatus may include a fetcher assembly to hold a second flitch in an edger ready position while a portion of the first flitch is directed below on an edger infeed mechanism being transported to the edger. The fetcher assembly releases the second flitch on to the edger infeed mechanism when the first flitch has moved clear from beneath the edger ready position. The edger feed apparatus additionally includes a scanner system for creating and storing a digital three-dimensional model of each flitch for determining a sawing solution to be implemented by the edger.

14 Claims, 51 Drawing Sheets

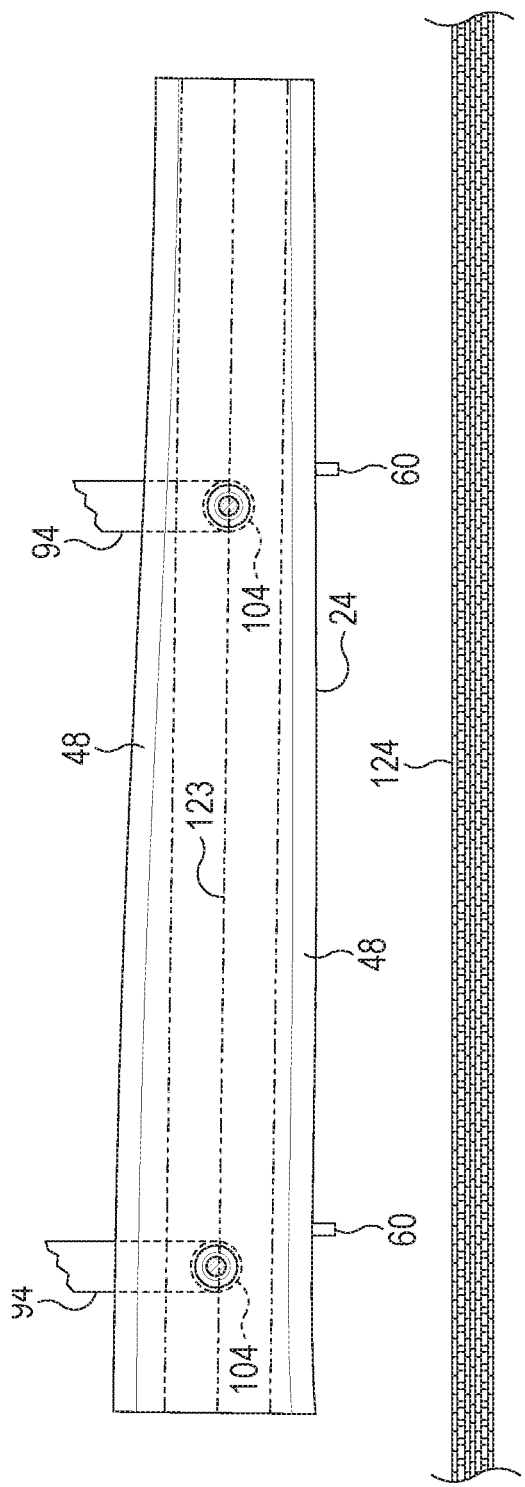
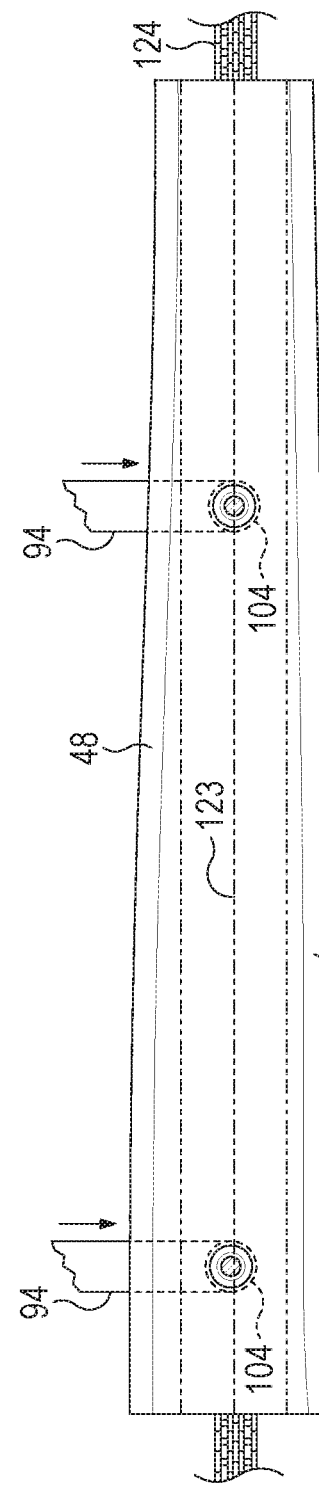
FIG. 11A
FIG. 11B

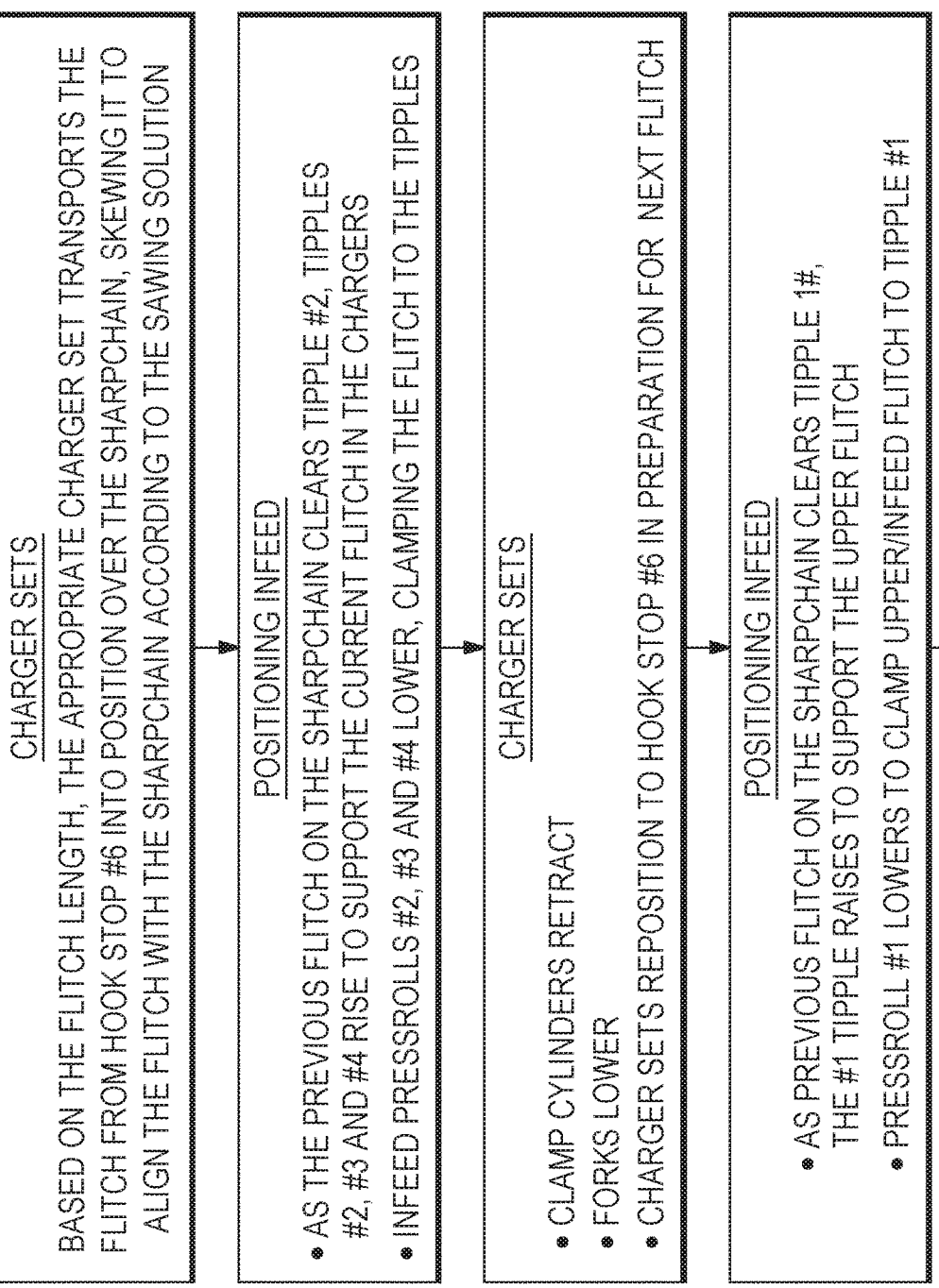

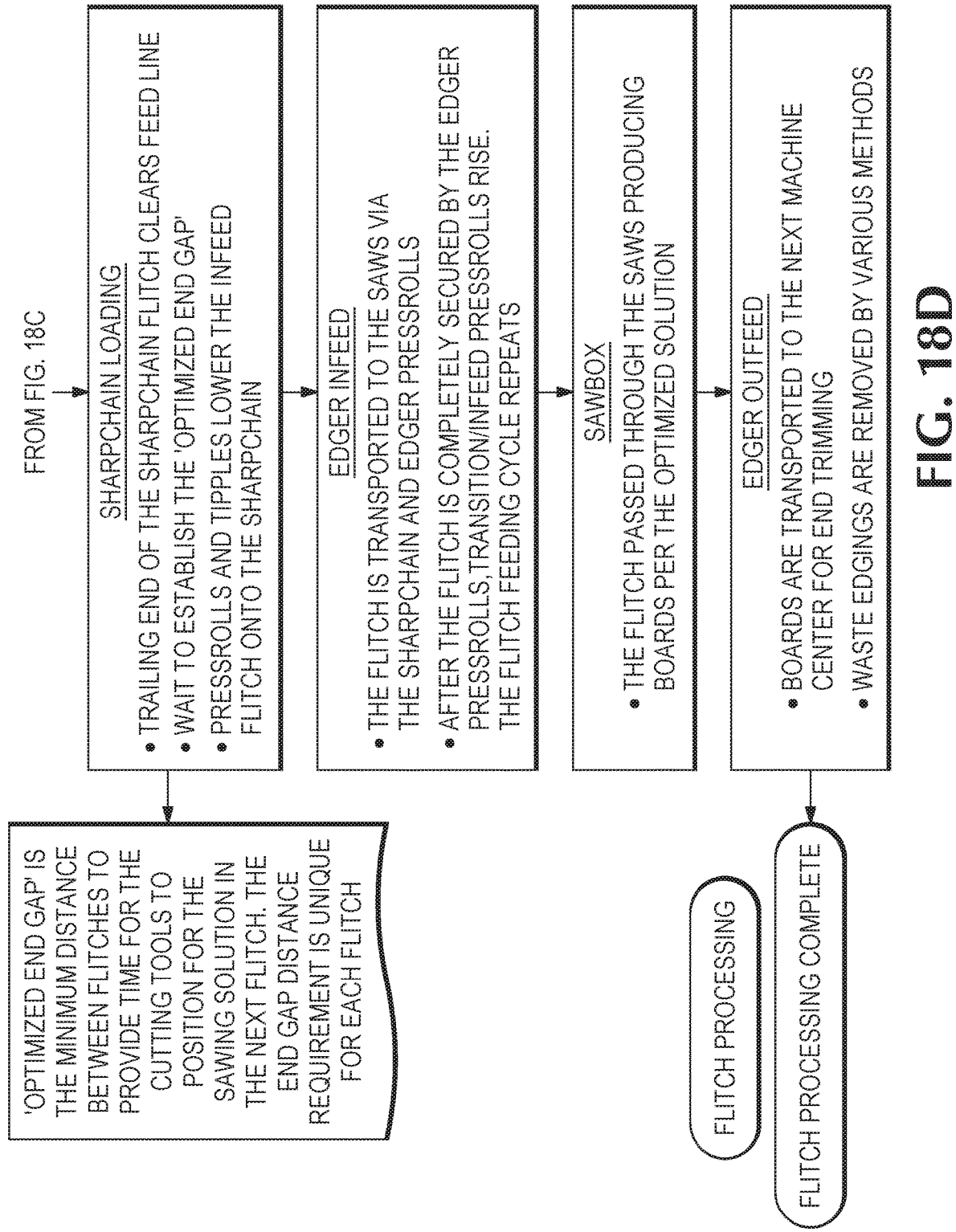

From FIG. 39A

HOOK STOP #7

CONTINUOUSLY RUNNING CHAIN POSITIONS FLITCH FULL TAPER AGAINST HOOK STOPS

PROXIMITY SENSORS MOUNTED NEAR EACH HOOK STOP DETERMINE LENGTH OF THE FLITCH RELATIVE TO LUMBERLINE AND WHICH FETCHERS ARE REQUIRED FOR THE TRANSFER

SELECTED FETCHER DOGS ROTATE DOWN ABOUT FLITCH

EACH DOG MOTOR IS EQUIPPED WITH ENCODER TO DETERMINE DOGS REAL WORLD POSITION

FIRST, LH DOGS PRESS FLITCH AGAINST HOOK STOPS TO PRE-DETERMINED MOTOR TORQUE THEN LOCK IN POSITION BECOMING MASTER DATUM POSITION

NEXT, RH DOGS CLAMP FLITCH AGAINST LH DOGS TO A PRE-DETERMINED MOTOR TORQUE (SLIGHTLY LESS THAN LH DOG MOTOR TORQUE) BECOMING SLAVE POSITION

AFTER FLITCH IS CLAMPED, HOOK STOPS LOWER BELOW TOP OF CHAIN

LH DOGS POSITIONED NEAREST EACH OF FLITCH ARE MASTER POSITION DOGS, ALL OTHER DOG POSITIONS ARE SLAVED TO THESE TWO DOGS

DOGS NEAR EACH END DETERMINE LARGE END WIDTH AND SMALL END WIDTH TO DETERMINE GEOMETRIC CENTERLINE OF FLITCH (SPLIT TAPER)

DOGS CLAMPING FLITCH IN MIDDLE FOLLOW FLITCH AS IT IS TRANSFERRED MAINTAINING CLAMPING FORCE

FLITCH IS READY TO TRANSFER

From FIG. 39C

FLITCH TRANSFER SEQUENCE

THE TRAILING END OF FLITCH 1 ON SCAN BELT CLEARS LUMBERLINE

FLITCH 2 IS PRE-POSITIONED OVER SCAN BELT

WAIT TO ESTABLISH 'OPTIMIZED END GAP', THEN RELEASE FLITCH 2

FETCHERS RETURNS TO LOADING POSITION

FOR FLITCH LENGTHS 10' AND SHORTER, DUAL FETCHERS ARE USED TO MEET 'OPTIMIZED END GAP' TIMING PERFORMANCE

DUAL FETCHERS HAVE TWO SET OF DOGS, WHICH ALLOW ONE SET TO BE LOADING A FLITCH, WHILE OTHER SET IS DISCHARGING A FLITCH

DOGS RETURNING TO LOADING POSITION ROTATE UP 90 DEGREES TO CLEAR WOOD PATH OF NEXT FLITCH

FOR FLITCH LENGTHS >10', SINGLE FETCHERS HAVING ONE SET OF DOGS ARE ABLE TO COMPLETE THE 'LOAD-TRANSFER-DISCHARGE-TRANSFER' CYCLE BEFORE THE PREVIOUS FLITCH COMPLETES THE 'OEG' CYCLE

'OPTIMIZED END GAP' IS MINIMUM DISTANCE BETWEEN FLITCHES TO PROVIDE TIME FOR CUTTING TOOLS TO POSITION FOR THE SAWING SOLUTION IN NEXT FLITCH. END GAP DISTANCE REQUIREMENT IS UNIQUE FOR EACH FLITCH

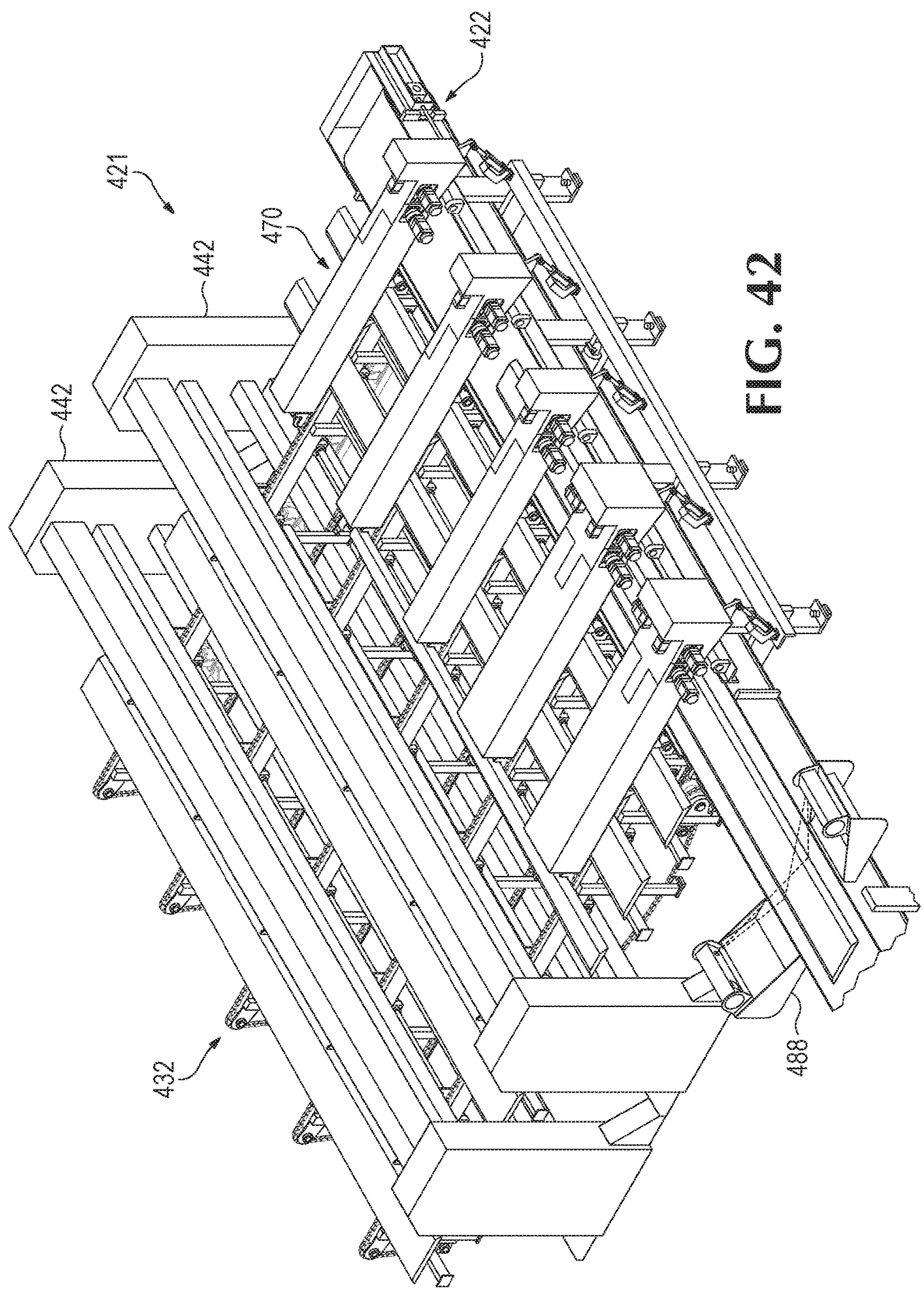

From FIG. 43A

HOOK STOP #7

CONTINUOUSLY RUNNING CHAIN POSITIONS FLITCH FULL TAPER AGAINST HOOK STOPS

PROXIMITY SENSORS MOUNTED NEAR EACH HOOK STOP DETERMINE LENGTH OF THE FLITCH RELATIVE TO LUMBERLINE AND WHICH FETCHERS ARE REQUIRED FOR TRANSFER

SELECTED FETCHER DOGS ROTATE DOWN ABOUT FLITCH

EACH DOG MOTOR IS EQUIPPED WITH ENCODER TO DETERMINE DOGS REAL WORLD POSITION

FIRST, LH DOGS PRESS FLITCH AGAINST HOOK STOPS TO A PRE-DETERMINED MOTOR TORQUE THEN LOCK IN POSITION BECOMING MASTER DATUM POSITION

NEXT, RH DOGS CLAMP FLITCH AGAINST LH DOGS TO PRE-DETERMINED MOTOR TORQUE (SLIGHTLY LESS THAN LH DOG MOTOR TORQUE) BECOMING SLAVE POSITION

AFTER FLITCH IS CLAMPED, HOOK STOPS LOWER BELOW TOP OF CHAIN

LH DOGS POSITIONED NEAREST EACH OF FLITCH ARE MASTER POSITION DOGS, ALL OTHER DOG POSITIONS ARE SLAVED TO THESE TWO DOGS

DOGS NEAR EACH END DETERMINE VARIOUS WIDTHS OF FLITCH SO THE SAW SOLUTION WITHIN FLITCH CAN BE POSITIONED OVER BELT WHEN TRANSFERRED

DOGS CLAMPING FLITCH IN MIDDLE FOLLOW FLITCH AS IT IS TRANSFERRED MAINTAINING CLAMPING FORCE

FLITCH IS READY TO TRANSFER

From FIG. 43C

FLITCH TRANSFER SEQUENCE

TRAILING END OF FLITCH 1 ON SCAN BELT CLEARS LUMBERLINE

FLITCH 2 IS PRE-POSITIONED OVER SCAN BELT

WAIT TO ESTABLISH 'OPTIMIZED END GAP', THEN RELEASE FLITCH 2
FETCHERS RETURN TO LOADING POSITION

FOR FLITCH LENGTHS 10' AND SHORTER, DUAL FETCHERS ARE USED TO MEET 'OPTIMIZED END GAP' TIMING PERFORMANCE

DUAL FETCHERS HAVE TWO SET OF DOGS, WHICH ALLOW ONE SET TO BE LOADING A FLITCH, WHILE OTHER SET IS DISCHARGING A FLITCH

DOGS RETURNING TO LOADING POSITION ROTATE UP 90 DEGREES TO CLEAR WOOD PATH OF NEXT FLITCH BEING TRANSFERED

FOR FLITCH LENGTHS >10', SINGLE FETCHERS HAVING ONE SET OF DOGS ARE ABLE TO COMPLETE THE 'LOAD-TRANSFER-DISCHARGE-TRANSFER' CYCLE BEFORE THE PREVIOUS FLITCH COMPLETES THE 'OEG' CYCLE

'OPTIMIZED END GAP' IS MINIMUM DISTANCE BETWEEN FLITCHES TO PROVIDE TIME FOR CUTTING TOOLS TO POSITION FOR THE SAWING SOLUTION IN THE NEXT FLITCH. END GAP DISTANCE REQUIREMENT IS UNIQUE FOR EACH FLITCH

From FIG. 43D

VERIFICATION SCANNER

AS THE FETCHER RELEASES FLITCH, DROPPING IT TO SCAN BELT, SOME AMOUNT OF SOLUTION MIS-ALIGNMENT MAY OCCUR LANDING ON THE BELT

AFTER TRAVELING A SHORT DISTANCE ON SCAN BELT TO STABILIZE, FLITCH IS SCANNED TO DETERMINE ITS ACTUAL POSITION RELATIVE TO CALCULATED POSITION DETERMINED BY THE FETCHERS

THIS VERIFICATION SCAN IS FOR FLITCH POSITION IDENTIFICATION ONLY, TO UTILIZE THE SAWING SOLUTION PRODUCED BY OPTIMIZER

CUTTING TOOLS ARE POSITIONED BASED ON VERIFICATION SCANNER SOLUTION

SAWBOX

FLITCH PASSES THROUGH THE SAWS PRODUCING BOARDS PER THE OPTIMIZED SOLUTION ( FLITCH PROCESSING COMPLETE )

FIG. 43E

METHOD AND APPARATUS FOR PROVIDING FLITCHES TO AN EDGER

CROSS-REFERENCE TO RELATED APPLICATIONS

This application is a continuation-in-part of U.S. patent application Ser. No. 16/438,005 filed on Jun. 11, 2019 and entitled "Method and Apparatus for Feeding an Edger," which claims the benefit of U.S. Provisional Patent Application Ser. No. 62/683,509 filed on Jun. 11, 2018 and entitled "Method and Apparatus for Feeding an Edger." The complete disclosures of the above applications are hereby incorporated by reference for all purposes.

BACKGROUND OF THE INVENTION

The present invention relates to processing wood products, and in particular to apparatus and a method for feeding flitches into an edger so as to optimize production of marketable lumber from the flitches.

When a log is sawed in the process of producing lumber a cant or cants are produced from the central portion of the log by removing slabs and flitches from sides of the log, usually in a way to maximize the marketable amount of lumber that can be produced from the cants. Flitches removed from the sides of the log may include wane that can be removed by an edger to obtain marketable lumber from each flitch.

An edger typically includes several parallel circular saw blades spaced at standard distances, or in some cases adjustably spaced, along an arbor. Sets of powered bottom rollers and press rollers are arranged to run a flitch longitudinally through the edger saws to produce standard-sized boards and remove edge portions that have no commercial value as lumber.

In conventional practice, an edger operator manually places each flitch onto infeed rollers of an edger in a position estimated to provide the maximum amount of marketable lumber from a particular flitch, in some cases with the assistance of laser guidelines. In such conventional edger operation flitches are delivered serially and longitudinally into a preliminary position where the edger operator must adjust its position and orientation before edger infeed rollers pinch the flitch and deliver it into the saw blades. As a result, there is a significant gap between the tail end of a flitch being sawn in the edger and the head end of the next flitch to enter the edger saw blades.

As a result of the gaps between flitches being fed into an edger, there may be a significant delay, or dead time, of as much as a few seconds between flitches going through an edger. The output of an edger could be significantly increased by reducing the space between the tail of one flitch and the head end of the next flitch, thus reducing the dead time between successive flitches.

What is desired, then, is a way to reduce the dead time between flitches being sent through an edger, and at the same time to maximize the production of marketable lumber from flitches by ensuring that they are located and oriented, as they pass through an edger, so as to produce boards calculated to result in the maximum value of marketable boards from each flitch.

SUMMARY OF THE INVENTION

As an answer to some of the needs explained above, an edger feeding apparatus and a method of feeding flitches into an edger with only a minimum spacing and dead time between successive flitches are disclosed hereinbelow and defined in the claims that form a part of the disclosure.

In one embodiment of the apparatus disclosed herein, a feed line, also called a scanner and carriage assembly (or carriage assembly), moves individual flitches laterally, in a direction transverse to the length of each flitch, and a scanning system associated with the feed line measures each flitch and creates and stores a digital three-dimensional model of each flitch. The flitches are moved to a transfer ready position at an outfeed end of the scanner and carriage assembly in readiness to be transferred laterally to an edger ready position near the infeed end of an edger and a small distance above the edger infeed mechanism. Transfer of successive flitches to the edger infeed mechanism is accomplished in a much shorter time than by moving each flitch longitudinally after another.

In one embodiment of the apparatus, a scanning system is associated with the edger infeed mechanism downstream from a fetcher assembly to create and store a digital three-dimensional model of each flitch. In one embodiment of the apparatus, a first scanning system is associated with the feed line to create and store a digital three-dimensional model of each flitch, and a second scanning system is associated with the edger infeed mechanism downstream from a fetcher assembly to verify the position of the flitch on the edger infeed mechanism prior to the flitch arriving at the edger to determine if the saw positions based on the sawing solution from the three-dimensional model need to be adjusted.

In one embodiment of the apparatus, a control computer keeps the digital models of the flitches in memory in a queue specifically identifying the three-dimensional model of each flitch. Based on, for example, tabulations of the commercial values of different sizes and qualities of boards, the control computer determines how each flitch should be located and oriented on the edger infeed mechanism as it proceeds longitudinally through the edger, to produce the most valuable yield of lumber from that flitch. Alternatively, or additionally, the control computer determines a sawing solution based on three-dimensional model and the expected or actual position of each flitch on a conveyor belt of the edger infeed mechanism.

In one embodiment of the apparatus, each flitch is stopped in a transfer ready holding position and then is engaged to be moved by a charger subassembly. Each charger subassembly includes a lower flitch carrier member spaced apart from another along the length of the flitch, and each flitch carrier member includes a turntable portion which can engage the bottom of the flitch. A respective upper contact pad is moved down by an actuator to press the flitch onto the turntable portion of the flitch carrier member. The upper contact pad is positioned located directly above the turntable portion of the flitch carrier member. The flitch carriers are moved to carry the flitch laterally to the edger ready position, in a desired location and orientation above the edger infeed mechanism in a very short time. Each of the upper contact pads is controlled to move together with and remain aligned with the turntable of its corresponding flitch carrier member as the feed forks and contact pads move the flitch to the desired edger ready position with respect to an infeed mechanism of the edger that will result in the maximum commercial value of the boards that can be obtained from that flitch.

For example, an edge portion may be removed from each edge of a flitch, leaving a single dimensional board with four flat sides. For another flitch the control computer may direct the feed forks to orient and position the flitch where the edger will produce one board with four flat sides and another, lower grade, board with one edge surface including acceptable wane, depending upon the shape of the digital model of the flitch that has been produced by the control computer as result of scanning the flitch. Yet another flitch may be oriented and positioned so that when it proceeds through the edger two boards with acceptable wane will be produced.

In one embodiment of the apparatus, when a flitch is positioned above the infeed mechanism, a set of tipples adjacent the infeed mechanism is moved upward and into supporting contact with the underside of the flitch. At the same time, an infeed press roller associated with a tipple is lowered into contact with the upper side of the flitch, so the flitch is held in the correct location. Once the flitch has been grasped and is held by the tipples and the press rollers the flitch carrier members and the upper contact pads release the flitch and are retracted. The infeed press rollers keep the flitch in the desired orientation and location established by the carrier members and pressure pads and in contact with and supported by the tipples.

Once a preceding flitch has been moved far enough toward the edger saws the tipples are lowered and the accompanying infeed press rollers are raised, moving the flitch in the direction of movement of the infeed mechanism and lowering the flitch onto the infeed mechanism. In one embodiment of the invention the control computer takes into account the time that may be required to adjust the positions of the edger saw blades after the preceding flitch has cleared, while the flitch is supported and held by the tipples and press roller. The flitch is then lowered onto the edger infeed mechanism at a calculated time and in a controlled fashion so as to come into contact with the edger infeed mechanism in the position and orientation that has been calculated by the control computer to result in producing boards of optimum value from that flitch.

In one embodiment of the apparatus, each flitch is stopped in a transfer ready holding position and then is engaged to be moved by one or more fetcher subassemblies. Each fetcher assembly includes one or two sets of fetchers, with each set of fetcher having a left-hand (LH) dog and a right-hand (RH) dog. First sets of LH and RH dogs move toward each other to grip a first flitch and then move the first flitch from a transfer ready position to an edger ready position spaced upwardly apart from the edger infeed mechanism. Second sets of LH and RH dogs move toward each other to grip a second flitch. The first sets of LH and/or RH dogs move apart to release the first flitch from the edger ready position onto a conveyor belt of the edger infeed mechanism. The first sets of LH and RH dogs pivot about 90 degrees to a stow position, allowing the second sets of LH and RH dogs to move the second flitch from the transfer ready position to the edger ready position such that a portion of the first flitch is on a part of the conveyor belt that is directly below the second flitch in the edger ready position. When the first flitch has moved clear from beneath the edger ready position, the second sets of LH and/or RH dogs move apart to release the second flitch from the edger ready position onto the conveyor belt of the edger infeed mechanism.

In accordance with one aspect of a method disclosed herein, then, each of a series of flitches is scanned, a queue of three-dimensional models is produced, and the control computer calculates a position and an orientation for each flitch so as to feed the flitch into the edger and thus produce the optimal yield of lumber from the flitch. When a flitch reaches the final position on the feedline, or carriage assembly, where it is the next in line to be sent through the edger, it is moved by the flitch carrier members to a predetermined orientation and position above the edger infeed mechanism. When a preceding flitch has moved out of the way the flitch is engaged by tipples and pressure rollers and the flitch carrier members are retracted.

After a preceding flitch has moved a calculated distance toward the edger saws the flitch may be lowered onto the edger infeed chain and moved to where it can be engaged by infeed rollers of the edger. If the flitch is to be sawn into a different number of boards or into boards of widths or locations within the flitch that are different from the preceding flitch the amount of time required to adjust the edger saws is taken into account in determining when to move the flitch from the ready position to be engaged by the edger infeed mechanism.

The foregoing and other objectives and features of the invention will be more readily understood upon consideration of the following detailed description of the invention taken in conjunction with the accompanying drawings.

BRIEF DESCRIPTION OF THE SEVERAL DRAWINGS

FIG. 11A is a somewhat schematic top plan view taken in the direction of the line 11A-11A in FIG. 10, showing a portion of the charger assembly at the outfeed end of the scanner and carriage assembly, showing the position of engagement of a flitch by the feed forks.

FIG. 11B is a view similar to that of FIG. 11A showing the flitch in a position of readiness to be lowered onto the edger infeed mechanism.

FIG. 18A-18D are a functional flowchart of a functional operational sequence for operation of the edger feed apparatus shown in FIG. 1.

FIGS. 39A-39E is a functional flowchart of a functional operational sequence for operation of the edger feed apparatus shown in FIG. 21.

FIG. 42 is an isometric view of a further example of an edger feed apparatus according to the present disclosure.

FIGS. 43A-43E is a functional flowchart of a functional operational sequence for operation of the edger feed apparatus shown in FIG. 42.

DETAILED DESCRIPTION OF PREFERRED EMBODIMENTS

Figure 1:
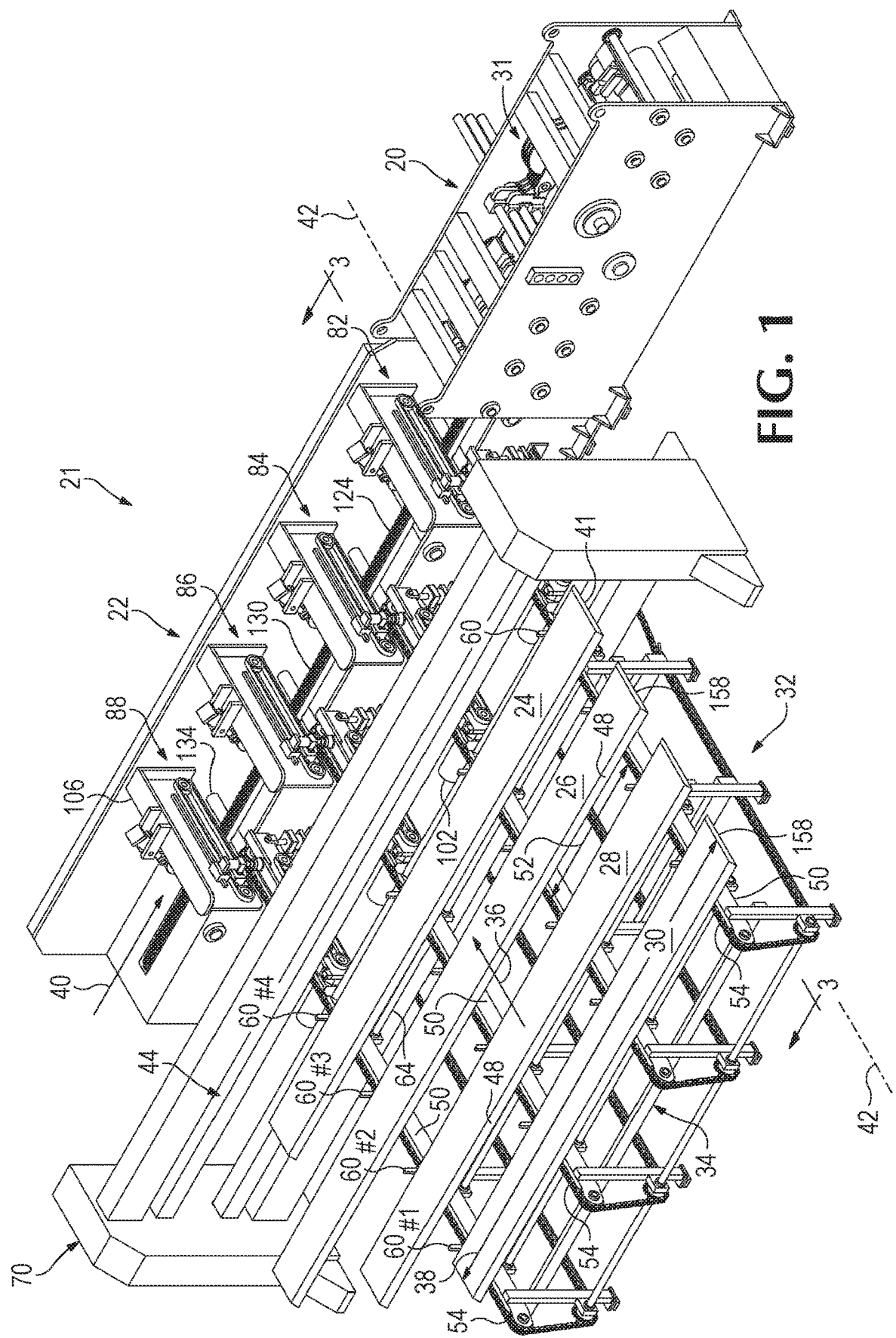
FIG. 1 is an isometric view of an example of an edger feed apparatus according to the present disclosure.
Figure 2:
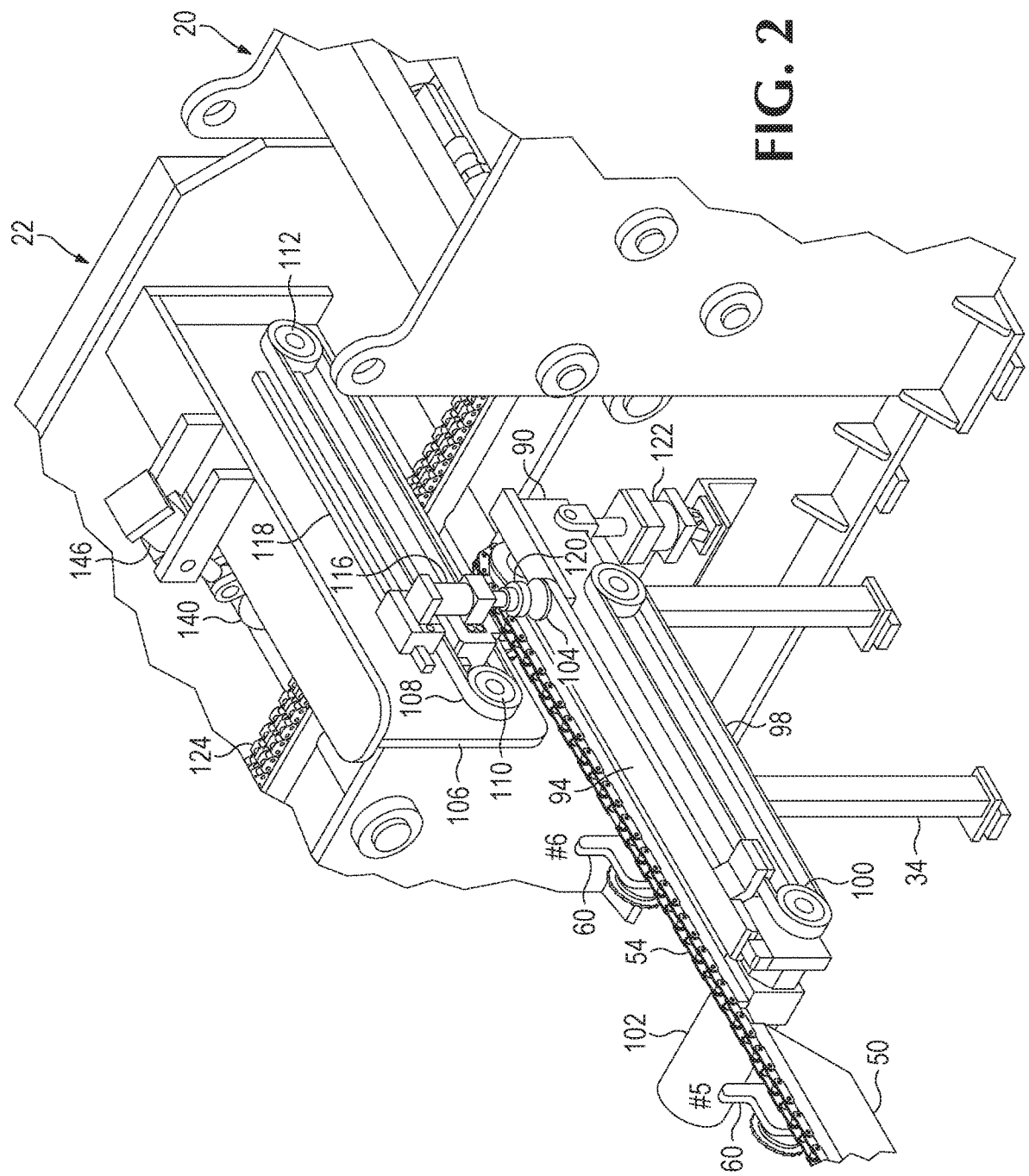
FIG. 2 is a view of a portion of FIG. 1, at an enlarged scale.

Referring first to FIGS. 1-4 of the drawings that form a part of the disclosure herein, an edger 20 and an edger feed apparatus 21 that includes an edger infeed mechanism 22 arranged to deliver a flitch of wood 24, 26, 28, or 30, etc. into the edger 20. The edger 20 includes a set of edger saws 31 that are spaced apart from each other so as to produce a board or set of boards from a flitch 24, etc., while removing bark-covered wane portions of the flitch that are of no commercial value as lumber. Unless explicitly stated, edger feed apparatus 21 may additionally, or alternatively, include one or more components of one or more other edger feed apparatus of the present disclosure. Edger infeed mechanism 22 is controlled and operated by various sensors and servo systems shown schematically in FIG. 19.

Edger feed apparatus 21 further includes a scanner and carriage assembly 32, that also may be called a feedline or carriage assembly, has a structural frame 34 oriented to deliver flitches 24, 26, etc. to the edger 20 by moving each flitch laterally, that is, in the direction of the arrow 36, perpendicular to the length 38 of each flitch 24, 26, etc. The flitches are arranged side-by-side, lying flat and with their lengths oriented generally parallel with the arrow 40, indicating the direction in the direction of which each flitch will pass longitudinally through the edger 20. An end of each flitch that will be the leading end 41 as the flitch enters the edger is aligned with a lumber line 42, at the right-hand end of the scanner and carriage assembly 32 as seen in FIG. 1. The flitches may be loaded onto the scanner and carrier assembly 32 manually or by conventional loading apparatus that need not be disclosed herein.

Figure 18A:
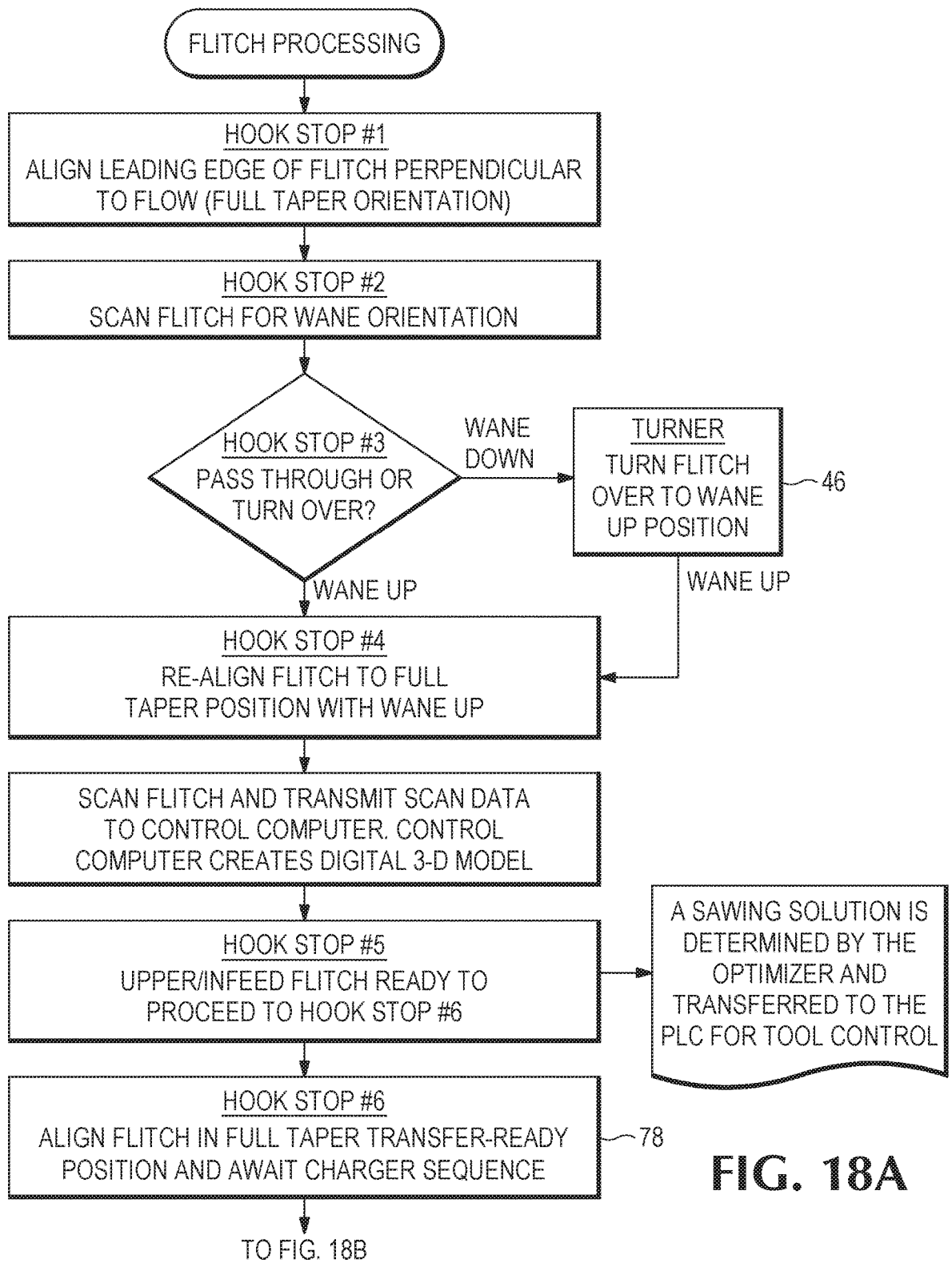

Depending upon the amount of manual labor that will be acceptable, the scanner and carriage assembly 32 may include a scanner (not shown) capable of discovering whether a wane side of a flitch is up or down. A flitch turning mechanism 46 mentioned in FIG. 18A, may be included in the feed line assembly 32 to turn flitches over as necessary for the wane side 48 of each flitch 24, etc. to face upward. Such a mechanism is well known and need not be described herein. Flitches located on the scanner and carriage assembly are desirably oriented with the narrower, or waned, face of each facing upward to be measured by the scanner system 44 in determining how to edge the flitch.

The frame 34 of the feed chain or scanner and carriage 32 assembly or scanner and carriage 30 includes a group of feed rail assemblies 50 that are oriented horizontally and parallel with each other, separated from one another by a distance 52 that is somewhat less than the length of the shortest flitch intended to be fed to the edger 20. For example, the feed rail assemblies 50 may be spaced apart from each other by a distance corresponding to a standard board length intended to be produced. As shown in FIG. 1, there are four feed rail assemblies 50 in the scanner and carriage assembly 32.

Figure 3:
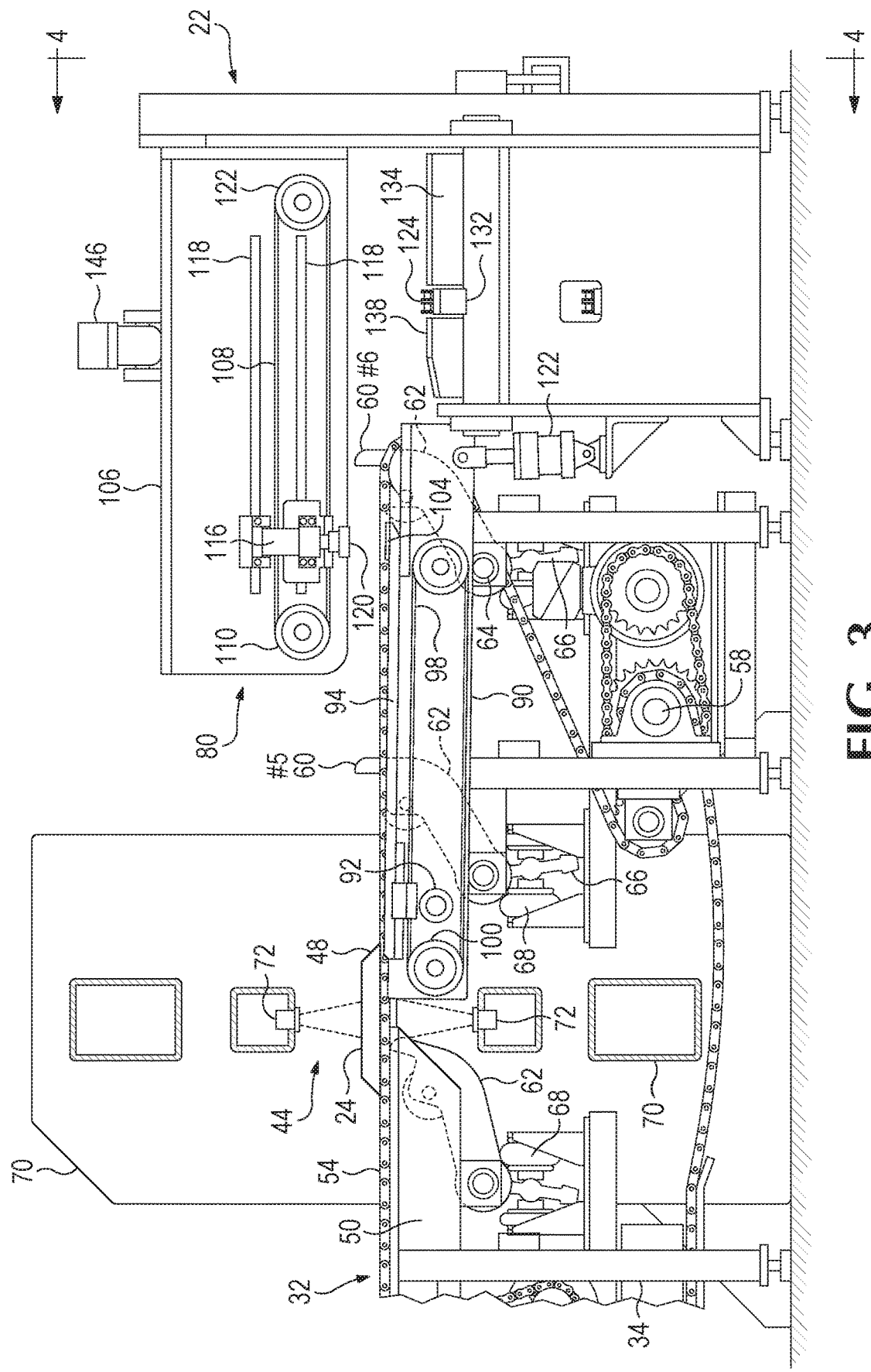
FIG. 3 is a right side elevational view of a portion of the apparatus shown in FIG. 1, taken along lines 3-3 in FIG. 1.

Endless loop feed chains 54 of which there are four shown in FIG. 1, are engaged with appropriate sprockets so as to move in respective parallel vertical planes. The endless feed chains 54 are arranged to be driven synchronously by drive sprockets carried on a chain drive shaft 58, as best seen in FIG. 3. An upper portion of each of the endless chains 54 may be disposed horizontally and ride along the top of a respective one of the feed rail assemblies 50 to support flitches 24, 26, etc. and move them along the feed rail assemblies 50 toward the edger infeed mechanism 22, spaced apart from each other by a desired distance. The feed chains 54 are driven to move continuously to carry the flitches 24, 26, etc. toward the edger infeed mechanism 22.

Six sets of hooks 60, seen in FIG. 1, extend across the direction of movement of the feed chains. They are carried on pivoted arms 62 and are arranged to be raised and lowered periodically to let each flitch 24, 26, etc. move in steps through predetermined distance along the scanner and carriage assembly 32 toward the edger infeed mechanism 22, and to keep the flitches separated from each other. When a set of hooks 60 is raised and obstructs one of the flitches the feed chains 54 continue to move, but the links of the feed chains preferably have smooth straight outer surfaces that can slide along the bottom face of a flitch 24, etc. without causing damage when the flitch is held stationary by one of the sets of hooks 60. At the same time, however, the flitches 24, 26, 28, etc. are engaged by the feed chains 54 with sufficient friction that each flitch is carried with negligible slippage when the flitch is not obstructed by a set of the hooks 60.

As may be seen in FIG. 1, there may be six sets of hooks, spaced apart by a convenient distance such as 30 inches that may be designed accordingly to the size of flitches installed to be handled. As a flitch is carried along the scanner and carriage assembly 32 it is stopped momentarily at each set of hooks 60, which may be called hook stop #1, or hook stop #2, etc. Various functions may be carried out at each hook stop or between one hook stop and the next, as will be explained in greater detail below.

The arms 62 carrying the ones of a set of hooks 60 may all be mounted on a shaft 64 extending transversely of the scanner and carriage, or feed line, assembly, thus parallel with the length of a flitch on the scanner and carriage assembly. Each such shaft 64 may be rotated through a few degrees in either direction by a respective lever 66 that is moved in either direction by suitable means such as inflation and deflation of the ones of a respective pair of airbags 68, for example, as may be seen in FIG. 3.

Figure 19:
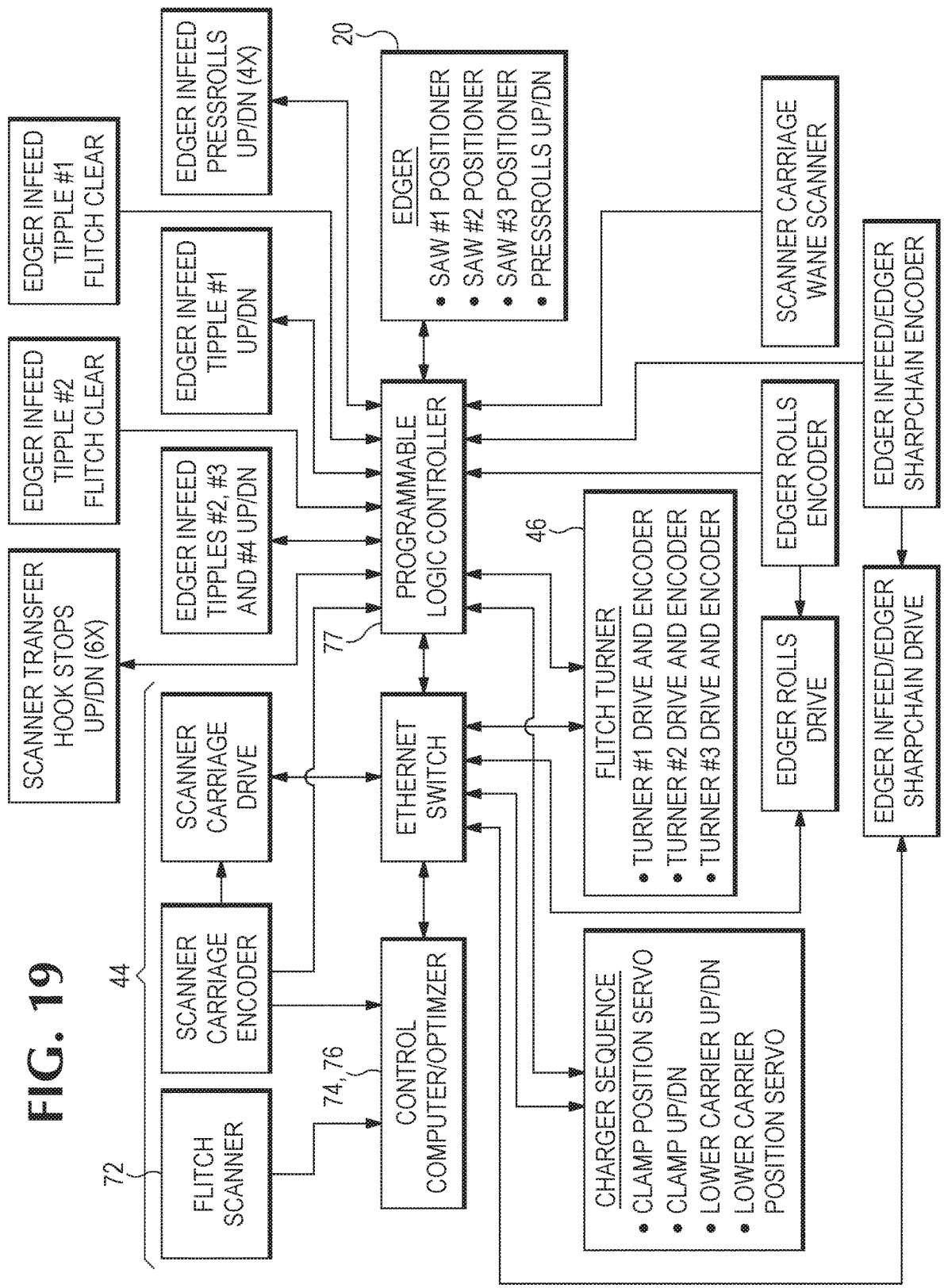
FIG. 19 is a block diagram of the control signal paths between some of the sensors and control and flitch-moving portions of the apparatus.

The flitch measuring scanner system 44, not shown in detail, is supported on a scanner support structure 70 extending above the scanner and carriage assembly 32. The scanner support structure 70 is long enough to permit passage of the longest flitch intended to be handled by the edger infeed mechanism. The scanner system 44 may include a scanner array 72 of several laser scanners, and is located between hook stop #4 and hook stop #5 along the scanner and carriage assembly 32, where each flitch 24, 26, etc. can be scanned precisely as it is carried along the feed rail assemblies 50 by the feed chains 54. The scanner array 72 may, for example, measure a flitch on a grid of points spaced at 0.035"×0.035" separation on all surfaces of the flitch. The scanner array 72 is connected functionally to a control computer 74, as shown in FIG. 19. Digital data derived from scanning each flitch 24, 26, etc. is delivered to the control computer 74, as by a suitable data cable (not shown).

The control computer 74 is adapted to receive the digital data from the scanner array 72 and to compile it as a digital three-dimensional model, such as a wireframe model, of each flitch. The three-dimensional model of a flitch may preferably be prepared to a resolution of 0.001 inch, to identify the boundaries of the flat upper face of each flitch, where the flitch begins to wane, and the control computer 74 utilizes the digital three-dimensional model as a basis for deciding what parts of the flitch should be removed by the edger 20. An optimizer section 76 of the control computer 74 incorporates a database which may include a tabulation of many different sizes, types, and grades of lumber and the current value of each. The control computer 74 may be programmed to determine from the three-dimensional model what boards of which grades can be produced from a particular flitch 24, for example, which parts of the flitch should be removed by the edger and how to cut the remaining portion of the flitch into pieces which can result in an optimum value of marketable lumber. A sawing solution is then developed by the control computer 74 and conforming instructions and data may be communicated among the various elements of the edger 20, the scanner and carriage assembly 32, and the edger feed mechanism 22 using a programmable logic controller 77 so that the flitch will be sawed accordingly by the edger 20. The sawing solution may include instructions to require the edger to adjust the positions of individual ones of the various saw blades.

The digital three-dimensional flitch models are retained in digital memory by the control computer 74, and are coordinated with data from the feed chains 54, making three-dimensional model of each flitch 24, 26, 28, or 30, etc. the size and shape of each flitch available for use by the control computer 74 when the flitch reaches a transfer ready position 78, in hook stop #6, at the outfeed end of the scanner and carriage, or feedline, assembly 32.

Edger feed apparatus 21 further includes a charger assembly 88 located at the outfeed end of the scanner and carriage assembly 32 to transfer each flitch to an edger infeed mechanism. The charger assembly includes a charger subassembly 82, 84, 86, and 88, each conveniently associated with one of the feed chains 54. The charger subassemblies for convenience will be called charger sets numbers 1, 2, 3, and 4, as seen in right-to-left order in FIG. 1. Each charger set 82, etc. includes a respective lower charger beam 90 supported by the frame 34 of the scanner and carriage assembly 32, and each such beam 90 is attached to the frame 34 by a pivot 92 near a rear, or inner, end of the beam 90. An elongate charger lower flitch support member 94 is mounted to move along a slide track extending along to the lower charger beam 90. An endless chain or toothed belt 98 is disposed as a loop encircling around a sprocket 99 at an outer end of the beam 90 and a sprocket 100 on a shaft of a servo motor 102 mounted at the inner end of the beam 90. The belt 98 is connected so as to move the charger lower flitch support member 94 longitudinally along the slide track as controlled by the servo motor 102. The servo motor is preferably capable of being controlled by the control computer 74 to move the endless belt to position the lower charger flitch support member 94 precisely, to an accuracy of ±0.001 inch.

Each of the elongate charger lower support members 94 desirably has a portion 104 near its outer end that may be called a turntable. The turntable 104 may be a set of concentric circular ridges extending proud of the surrounding surface of the respective lower charger member with a height of, for example, 0.020 inch, that will provide a reasonably secure grip on a bottom face of a flitch, without noticeably marring the surface of the wood. With a charger lower flitch support member 94 in the retracted position, a flitch 24, etc. in the transfer ready location 78 at hook stop #6 is directly above the turntable of the feed fork.

An upper charger support structure 106 that is part of each charger set 82 or 84, etc. extends toward the scanner and carriage assembly 32 from a support frame structure at a rear side of the edger infeed assembly 22. An endless belt 108 extends horizontally along the upper charger support structure 106, looped around a sprocket 110 at an outer end of the upper support charger structure 106 and a drive sprocket 112 mounted on a clamp pad positioning servo motor 114 at an inner end of the upper support frame structure. A clamp pad actuator 116 that may be an air cylinder-and-piston assembly is mounted on a slide track 118 extending horizontally along the upper support structure 106. The clamp pad actuator 116 is connected with the endless belt 108 so that the clamp pad servo motor 114 controls its position along the slide track 118 under the control of the computer 74 with the same degree of precision by which the lower charger flitch carrier member 94 is controlled, so as to keep the actuator 116 located above the turntable 104. A clamp pad 120 is carried on a moveable member of the clamp pad actuator 116, and is thus kept directly above the center of the turntable 104. The clamp pad 120 is arranged to move vertically so as to press a flitch 24, 26, etc. down onto the turntable 104 of the lower flitch support member 94. It will be understood that either an air cylinder or another convenient type of motor such as an electric actuator or a hydraulic cylinder-and-piston assembly could be used as the clamp pad actuator 116.

The lower charger beam 90 of each charger set 82, 84, etc. can be moved through a small angle about its pivot 92, by a motor 122 such as an air cylinder and piston mounted on the frame of the scanner and carriage assembly and linked to an outer end of the beam 90. By lowering the outer end of the beam 90, the outer end of the charger lower flitch support member 94 can be lowered a small distance, for example about ½ inch, to be clear of the bottom face of a flitch 24, 26, etc. in the transfer ready position 78 at the outfeed end of the scanner and carriage assembly 32 until the turntable 104 and clamp pad 120 of the charger set 82, etc. is in a required position and is intended to engage the flitch at the middle 123 of its width. When the charger set 82, etc. is correctly located the motor 122 can raise the outer end of the lower flitch support member 94, bringing its turntable 104 into contact with the flitch that is ready to be transferred. At the same or shortly later time the clamp pad 120 can be lowered against the upper face of the flitch.

Figure 10:
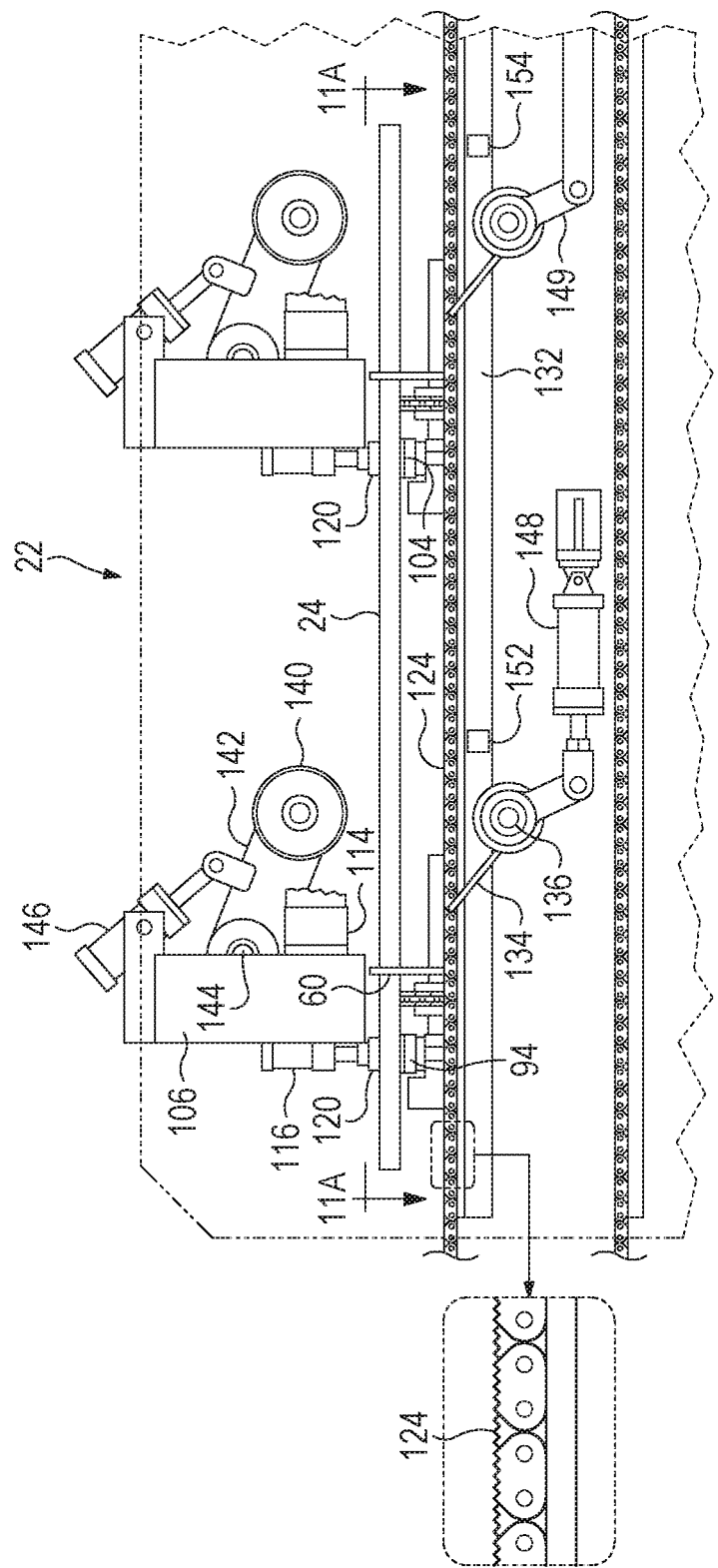
FIG. 10 is a rear elevational view, taken in the direction of line 10-10 in FIG. 6, showing a portion of the apparatus shown in FIG. 4, at an enlarged scale, with a flitch in the transfer ready position and with a rear main plate of the apparatus shown in phantom view to disclose portions of the apparatus that otherwise would be hidden.

The edger infeed mechanism 22 may include an endless edger infeed chain 124 arranged as a loop around suitable sprockets, a drive sprocket 126 and an idler sprocket 128, and driven continuously in a vertical plane perpendicular to the infeed chains of the scanner and carriage assembly 32 so as to carry a flitch 24, etc. longitudinally into the edger 20. An upper run 130 of the edger infeed chain 124 may extend along and ride upon a suitable horizontal support rail 132. The edger feed chain 124 may be a roller chain with the outer edges of the side plates of each link having a sawtooth shape, as shown in the inset in FIG. 10, intended to engage a bottom surface of a flitch 24, etc. firmly but without noticeable marring, and the edger infeed chain may be referred to herein as a sharpchain 124.

A respective tipple 134 is associated with each of the charger sets 82, 84, 86, and 88, and each tipple will be referred to separately by the member of the charger set with which it as associated. Each tipple is mounted on a respective tipple shaft 136 extending horizontally and perpendicular to the plane of the edger infeed chain 124 and thus parallel with the direction of movement of flitches along the scanner and carriage assembly 32. The tipples 134 may be generally planar, extending radially outwardly away from the respective tipple shafts 136. The tipples 134 have outer margins 138 that may have roughened or textured surfaces intended to engage a bottom face of a flitch frictionally.

A respective infeed press roller 140 may be mounted for rotation about the axis perpendicular in the place of the sharpchain 124 and may be carried on a support arm 142 attached to each of the upper charger support beams 106 on its upstream side, further from the edger 20 and opposite the location of the associated clamp pad actuator 116. The support arm 142 may be arranged to pivot up and down about a horizontal pivot axis 144 that may also be perpendicular to the plane of the edger infeed sharpchain 124. A suitable motor 146 such as an air cylinder-and-piston assembly is arranged to raise and lower the edger infeed press roller 140 to press a flitch 24, etc. down against a tipple 134 in the edger ready position and also while lowering the flitch onto the upper 130 of the sharpchain 124, and then to keep the flitch in contact with the sharpchain 124 as the flitch is delivered into the edger 20.

Figure 4:
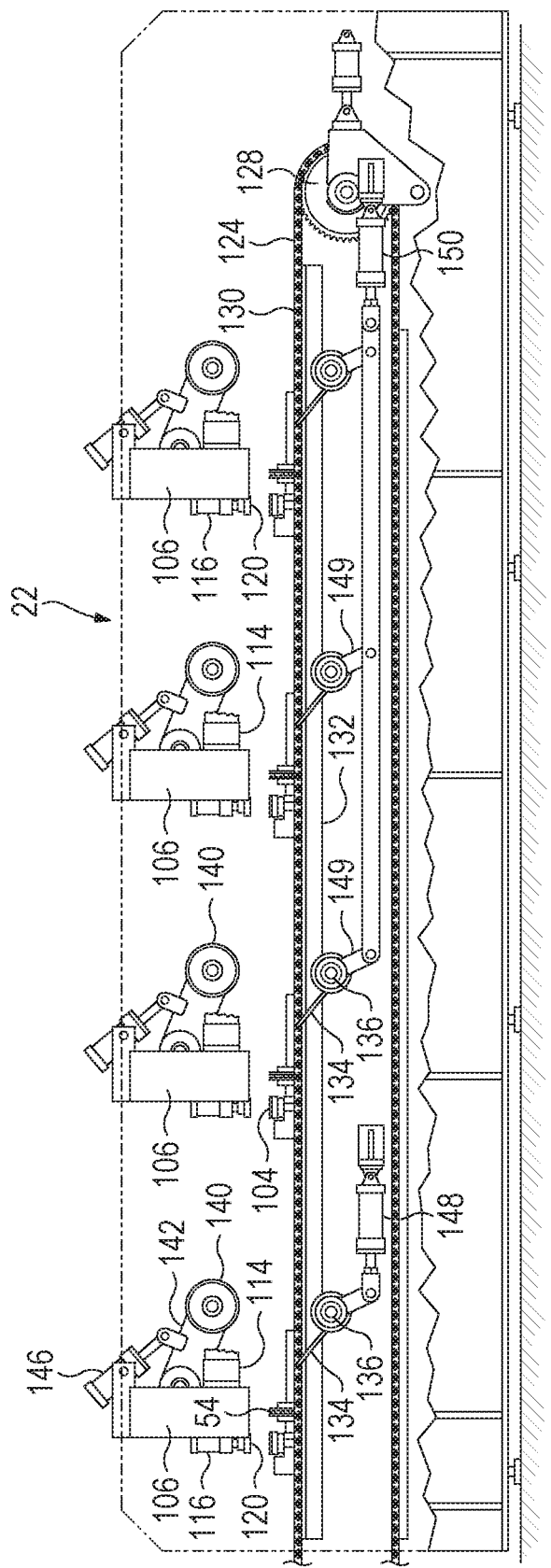
FIG. 4 is a partially cutaway rear elevational of the apparatus shown in FIG. 1, taken along lines 4-4 in FIG. 3.
Figure 12:
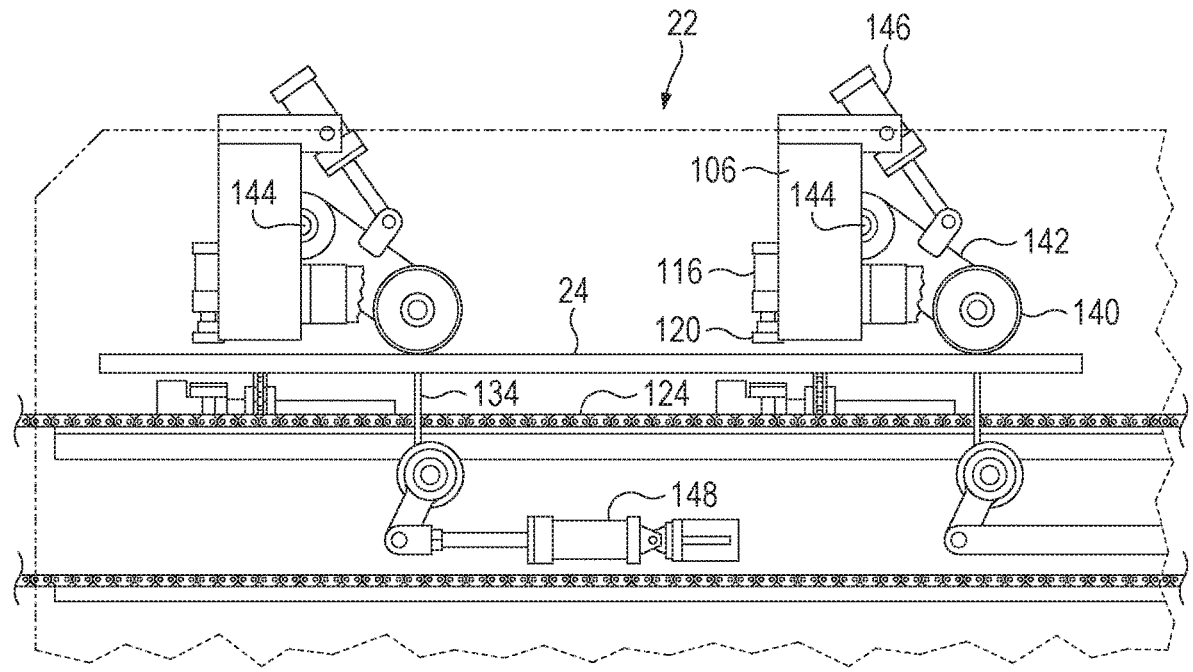
FIG. 12 is a view of the portion of the apparatus shown in FIG. 10, showing a flitch being supported by tipples and held in the edger ready position or station by infeed press rollers with the lower charger mechanisms and press pads disengaged from the flitch.

The tipple shafts 136 are located beneath the infeed press rollers 140, allowing each of the tipples 134 to be rotated, between a lowered position as seen in FIG. 4, alongside the upper run 130 of the edger infeed sharpchain 124, and a raised, generally upright, position as shown in FIG. 12, in which an outer margin 138 of each tipple is located above the sharpchain 124 and can bear upon a bottom face of a flitch supported on the charger lower flitch support member 94. The shaft of the #1 tipple can be rotated by an associated bell crank and motor 148, while the shafts of the #2, #3, and #4 tipples have respective bell cranks 149 all linked together and controlled by motor 150, so that the #2, #3, and #4 tipples can all be raised or lowered simultaneously.

Suitable sensors such as photocells 152, 154 may be located respectively a short distance upstream from each of the #1 tipple and the #2 tipple, in positions enabling the sensors to recognize that a tail end 162 of a flitch is passing the respective one of the tipples 134.

Under digital control from the control computer 74, each lower flitch carrier servo motor 102 and the associated clamp pad actuator positioning servo motor 114 are operated synchronously to move a respective end of a flitch 24, etc. from the transfer ready position 78 over a distance determined by the control computer 74 on the basis of the digital three-dimensional model of the particular flitch. A flitch thus can be moved from the transfer ready location 78 toward a calculated edger ready position 156 directly above the sharpchain 124 of the edger infeed mechanism 22. As shown in FIGS. 11A and 11B, the control computer 74 causes each charger set 82, 84, etc. to move a respective end of a flitch a distance calculated to place the flitch in a required location and orientation above the edger infeed sharpchain 124, ready to be carried to the saws 31 of the edger 20 and sawn into a board or boards that will maximize the value of the lumber cut from each flitch.

Figure 18B:
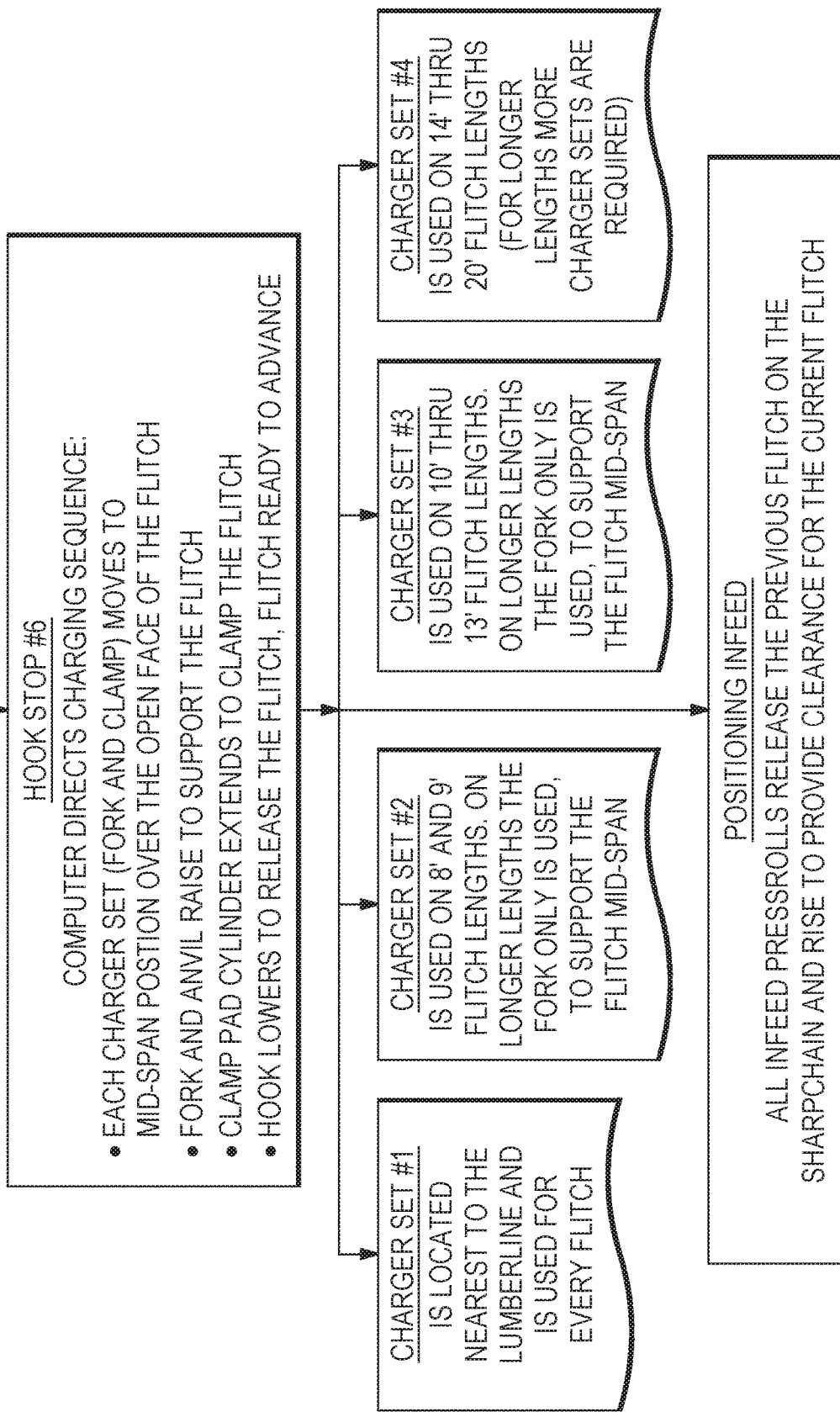

An example of the sequence of steps for carrying flitches through the edger feed apparatus and the edger is shown in a flow chart embodied in FIG. 18. Other examples of the sequence of steps may add, omit, replace, and/or substitute one or more steps shown in FIG. 18, such as with one or more steps described in the present disclosure. An example of the components and the communication connections between those components are shown in FIG. 19. However, there may be additional and/or alternative components and/or communication connections as described in the present disclosure. An example of the timing sequence of actions in a cycle of handling a flitch is diagrammed in FIG. 20. Other examples of the timing sequence of actions may add, omit, replace, substitute, speed up, slow down one or more actions shown in FIG. 20, such as with one or more actions described in the present disclosure.

Figure 20:
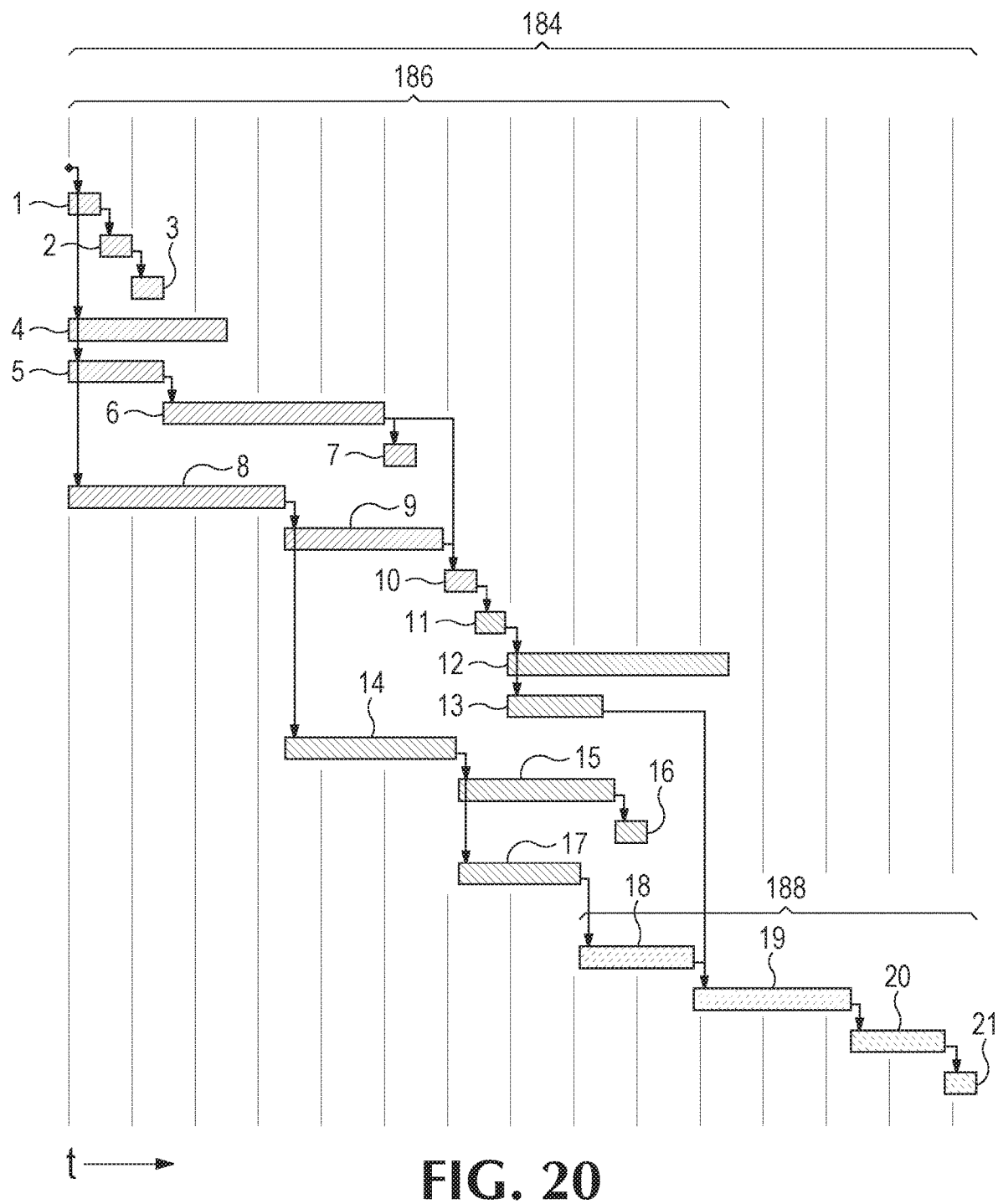
FIG. 20 is a timing diagram showing movements of components involved in transferring a scanned flitch from the outfeed end of the scanner and carriage assembly onto the sharpchain of the edger infeed mechanism, and then carrying the flitch into the edger.

The actions shown in FIG. 20 will be noted herein by step numbers in parentheses. A flitch may be placed flat on the scanner and carriage apparatus 32 with an end 158 of the flitch that is eventually to be the leading end of the flitch aligned with the lumber line 42 at the right end of the scanner and carriage assembly 32. The feed chains 54 are continuously in motion and carry the flitch 30 to hook stop #1, where the first set of hooks 60 engage the leading edge of the flitch and align the flitch 30 in the full taper orientation. At an appropriate time, ultimately as a result of a flitch being transferred away from hook stop #6, the set of hooks of hook stop #1 will be dropped allowing the flitch to move to hook stop #2, where flitch 28 is shown in FIG. 1. At each hook stop sensors will detect when the hooks 60 at the next subsequent hook stop are lowered so that a preceding flitch is starting to move away leaving space for the flitch being held at the lower-numbered hook stop, whose hooks 60 will then be lowered in response. As soon as a flitch has moved clear of a hook stop the hooks 60 are again raised to stop the next flitch. When the hooks 60 of hook stop #2 are dropped, the feed chains carry the flitch to hook stop #3 where it is engaged and stopped by the again-raised hooks 60 at hook stop #3. While moving between hook stop #2 and hook stop #3 the flitch 26 may have been scanned by a relatively simple scanner (not shown) to determine whether the wane is oriented up or down, and the determination will have been transmitted to the control computer 74. Between hook stop #3 and hook stop #4 there may be a flitch turner selectively operative to turn up the wane side of a flitch if necessary. If the wane face is down the flitch turner will engage the flitch and turn it over to bring the wane face to the top. If the wane is already facing upward the control computer 74 will cause the feed chains 54 to carry the flitch on to hook stop #4, carrying the flitch so its leading edge contacts the hooks 60 and the flitch is thereby placed into a full taper orientation.

Figure 5:
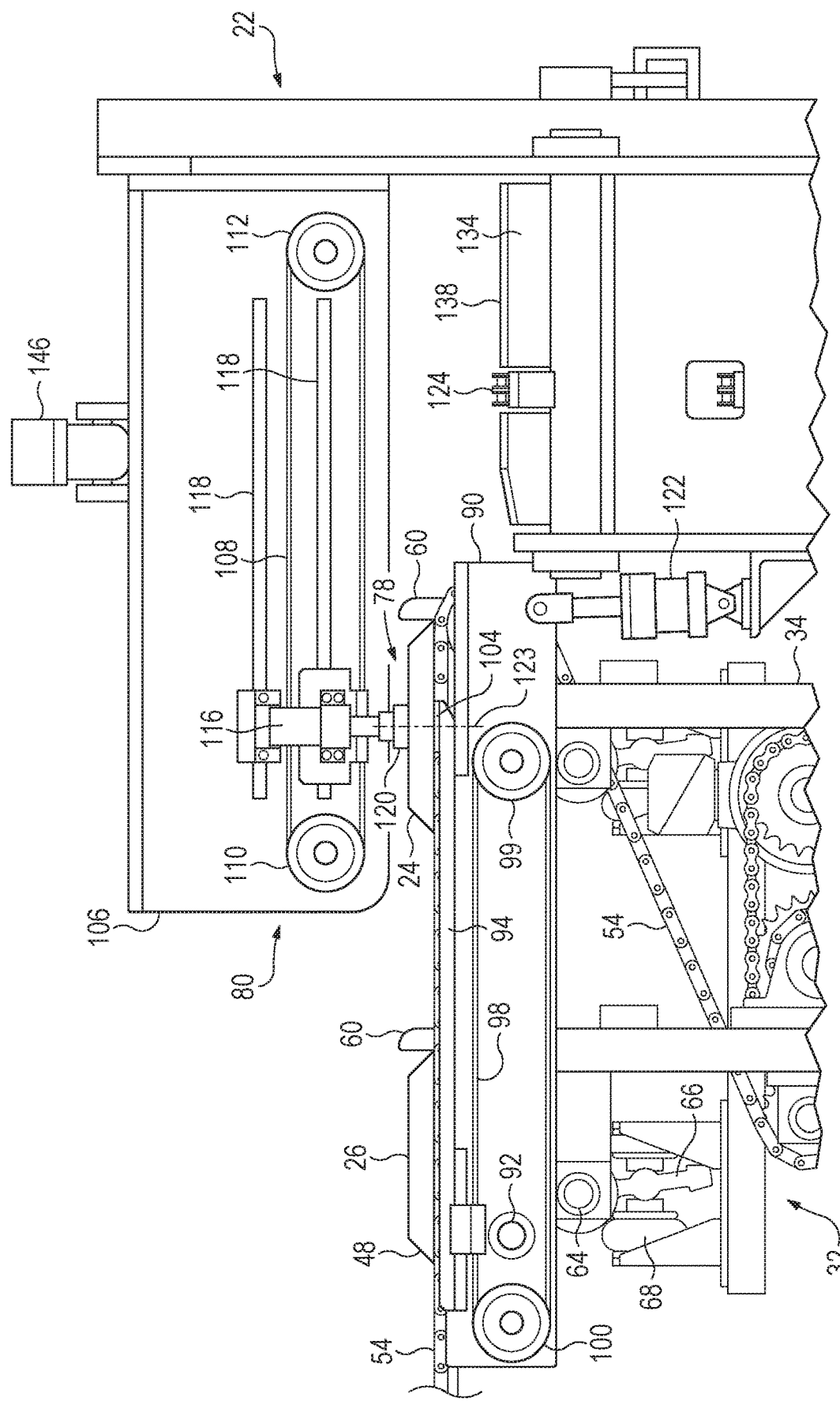
FIG. 5 is a right side elevational view of a portion of the apparatus similar to that shown in FIG. 3, at an enlarged scale and showing a flitch ready to be moved into position to be fed into the edger.
Figure 6:
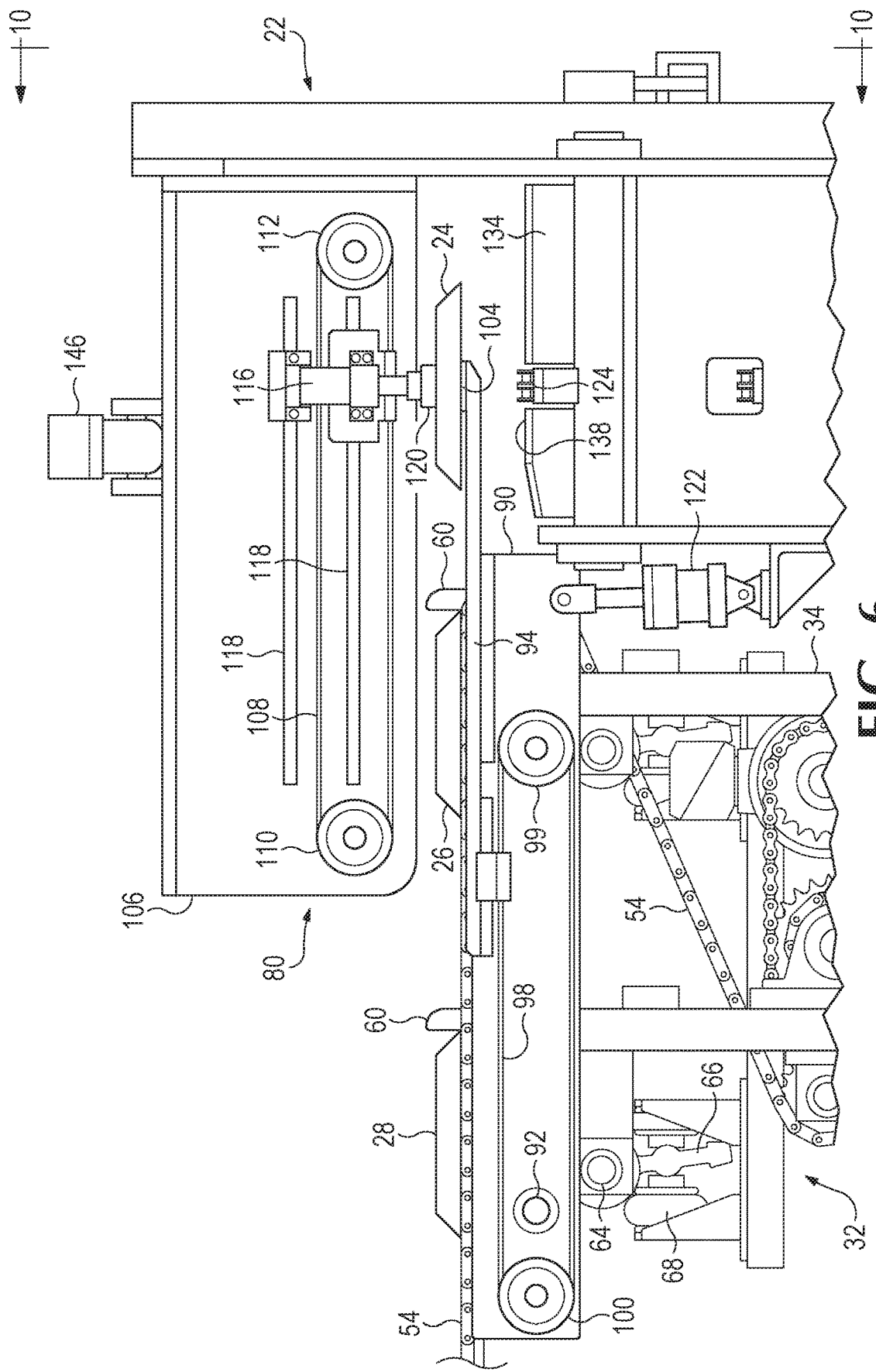
FIG. 6 is a view of a portion of the apparatus similar to that shown in FIG. 5, showing a flitch being held in an edger ready station above the edger infeed mechanism.
Figure 7:
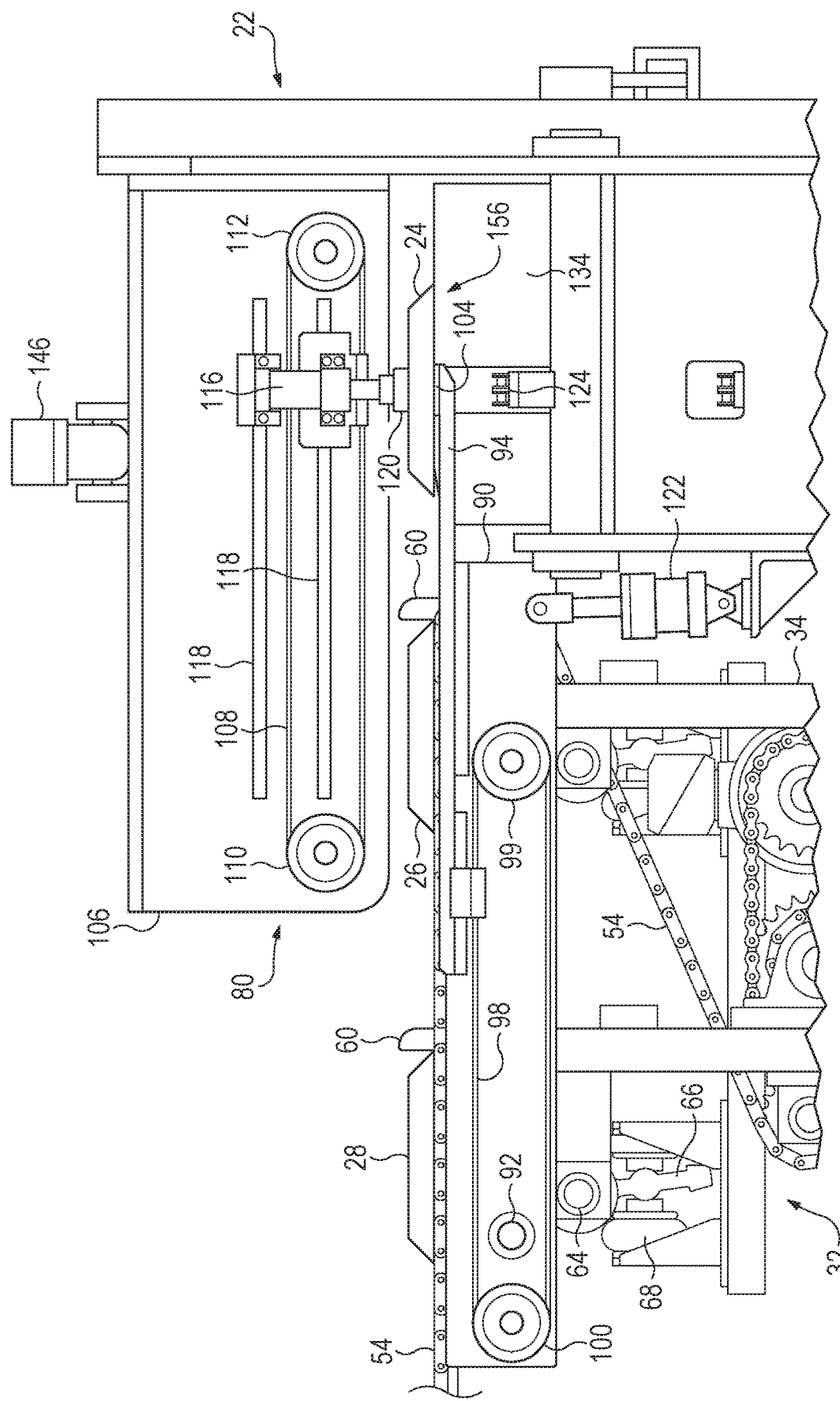
FIG. 7 is a view similar to FIG. 6, showing a tipple raised into position to support the flitch in the edger ready station.

When the hooks of hook stop #4 are lowered the feed chains 54 carry the flitch through the scanner support structure 70, and the upper and lower scanner arrays 72 measure the flitch and transmits scanner data to the control computer 74, enabling the control computer to generate the digital three-dimensional model of the flitch. When the flitch just scanned reaches hook stop #5 the flitch is retained until a preceding flitch at hook stop #6 has been engaged by the charger mechanism 80 and is being transferred toward the edger ready position 156. When the charger mechanism 80 has carried a proceeding flitch clearly away from the transfer ready position at hook stop #6 the hooks of hook stop #6 are raised to stop the flitch being moved from hook stop #5 in the transfer ready position in hook stop #6 at the outfeed end of the scanner and carriage assembly as shown in FIG. 5.

The feed chains 54 thus eventually carry each flitch 24, 26, etc. to the transfer ready position 78 at an outfeed end of the scanner and carriage assembly 32 at hook stop #6, where a charger assembly receives the flitch and moves it to the edger ready location 156 above an edger infeed mechanism 22 arranged to carry the flitch into the edger 20.

In the transfer ready position 78, the desired set of hooks 60 of hook stop #6 stop the flitch 24 and establish a full taper orientation, located where the flitch can be grasped to be moved to the desired orientation in the edger ready position and location 156 from which it is to be moved onto the edger infeed mechanism 22. With the flitch in the transfer ready location 78, at least a pair of the elongate charger lower flitch support members 94, are located beneath the flitch in a retracted position along the slide track on the beam 90.

When the flitch 24 has arrived at hook stop #6 it is ready for the charging sequence to be performed as directed by the control computer 74. This begins as shown in FIG. 3, with each charger set 82, 84, 86, etc. spanned by the length of the flitch 24 being moved to the position of the centerline 123 of the flitch, as determined from the three-dimensional digital model. With the lower flitch support member 94 lowered and the clamp pad 120 raised. Based on the digital three-dimensional model of the flitch 24 developed by the control computer 74, each lower flitch support member 94 is moved along the beam 90 by the servo motor 102 to place the turntable 104 beneath the longitudinal centerline 123 of the flitch 24, with the lower charger flitch support members 94 in their respective lowered positions. The lower flitch support members 94 can then be raised to bring the turntable 104 into contact with the bottom face of the flitch, as shown in FIG. 5 (step 1), and the clamp pads 120 can also be lowered onto the upper face of the flitch (step 2). Depending on the sawing solution the appropriate charger sets (depending on the length of the flitch), engage the flitch 24. The clamp pads of the #1 charger set 82 and of the charger set 88 nearest the opposite end of the flitch 24 are lowered to press on the top face of the flitch, but the clamp pads of a charger set between those charger sets are not lowered to press on the flitch. Once this has been accomplished the hooks 60 of hook set #6 are lowered (step 3).

When a previous flitch has been carried on the sharpchain 124 far enough into the edger 20 for press rollers 121 within the edger 20 to grip the previous flitch, the press rollers 140 of the charger sets #2, #3, and #4 are raised (step 4). When the tail end 162 is detected passing a sensor such as photocell 152 at the #1 charger set 82 the infeed press roller 140 at the #1 charger set 82 is raised, providing clearance above the sharpchain 124 to receive the flitch 24 being supported by the charger sets 82 and 88 at the transfer ready location. While the press rollers 140 are being raised the charger sets are briefly held (step 5) before moving the flitch 24 to the edger ready position 156.

When the space above the tipples 134 is cleared the two engaged charger sets may move by slightly different distances away from the transfer ready location 78 and toward the opposite side of the edger infeed mechanism 22, moving the flitch 24 to the edger ready position 156 above the sharpchain 124 of the edger infeed mechanism in which the desired saw cut lines are parallel with the sharpchain 124 and where the flitch is offset laterally as necessary to rest in an optimal transport position on the sharpchain (step 6).

Figure 14:
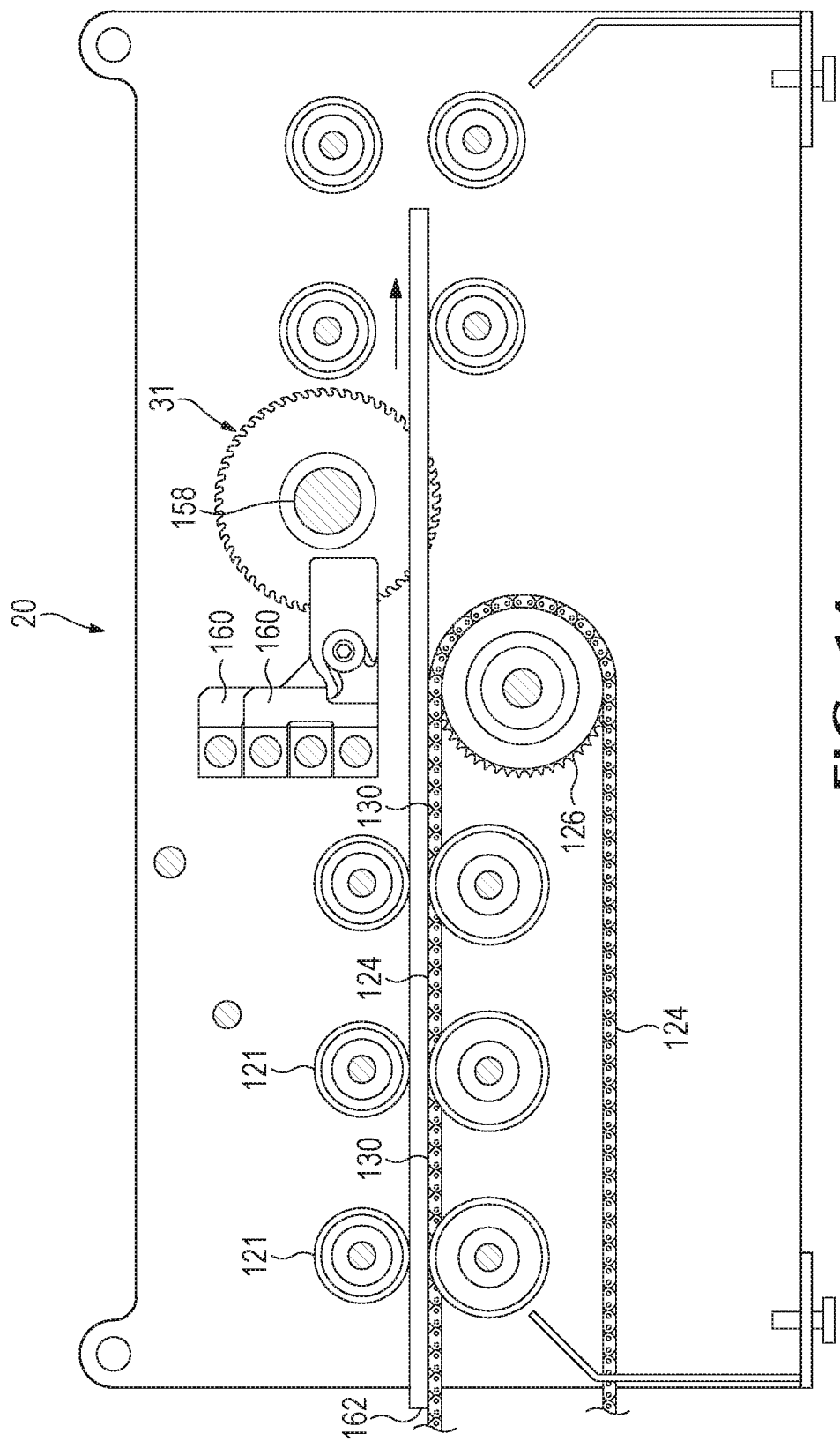
FIG. 14 is a simplified front elevational view of the edger shown in FIGS. 1 and 2.

As the flitch 24 moves clear of the transfer ready position 78 the hooks 60 of hook stop #6 are raised (step 7). When a flitch 24 has been carried by the lower flitch carrier members to the edger ready position in the calculated location and orientation above the sharpchain 124 of the edger infeed mechanism 22 it is held there until a preceding flitch has been moved far enough into the edger 20 so that none of the preceding flitch remains above any of a set of tipples 134, as in FIG. 14. The tipples 134 are then rotated to their raised positions (steps 9, 15) in which a portion of each tipple 134 extends upward on each side of the sharpchain 124, and the outer margin surfaces 138 of the tipples bear against the underside of the flitch 24 and support the flitch in the edger ready position 156 established by the charger assembly 80. The tipples may thus lift the flitch 24 slightly. The edger infeed press roller arms 142 are then pivoted downward bringing the infeed press rollers 140 into contact on the upper face of the flitch, urging the flitch against the outer margin surfaces 138 of the tipples 134 (step 10).

Once the flitch 24 is supported by the tipples 134, the lower charger beam actuator 122 is retracted to lower the lower flitch carrier members 94 a small distance from the lower face of the flitch, and the hold down pads 120 are raised from the upper face of the flitch (step 11). The flitch carrier motors 102 and hold down clamp pad carrier motors 114 are then operated to retract the lower flitch carrier members and move the clamp pad actuator 116 toward the transfer ready position 78 so as to be clear of the flitch 24 and ready to engage the flitch 26 when it is moved into the transfer ready position by the next cycle of the scanner and carriage assembly 32 (steps 12, 13).

Figure 8:
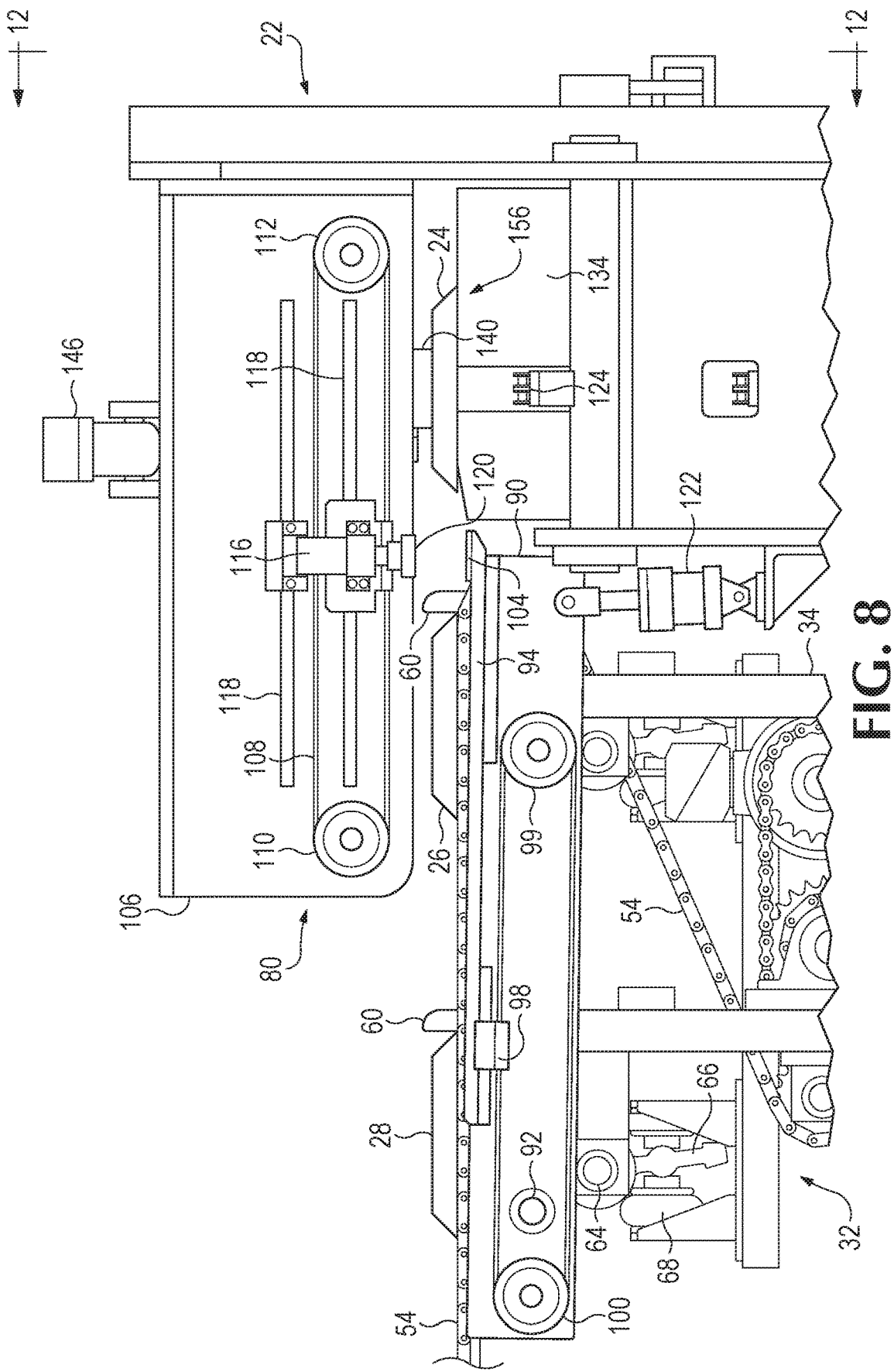
FIG. 8 is a view similar to FIG. 7, showing the tipple supporting the flitch and the feed fork and pressure pad moved toward a transfer ready position at the delivery end of the scanner and, carriage assembly
Figure 9:
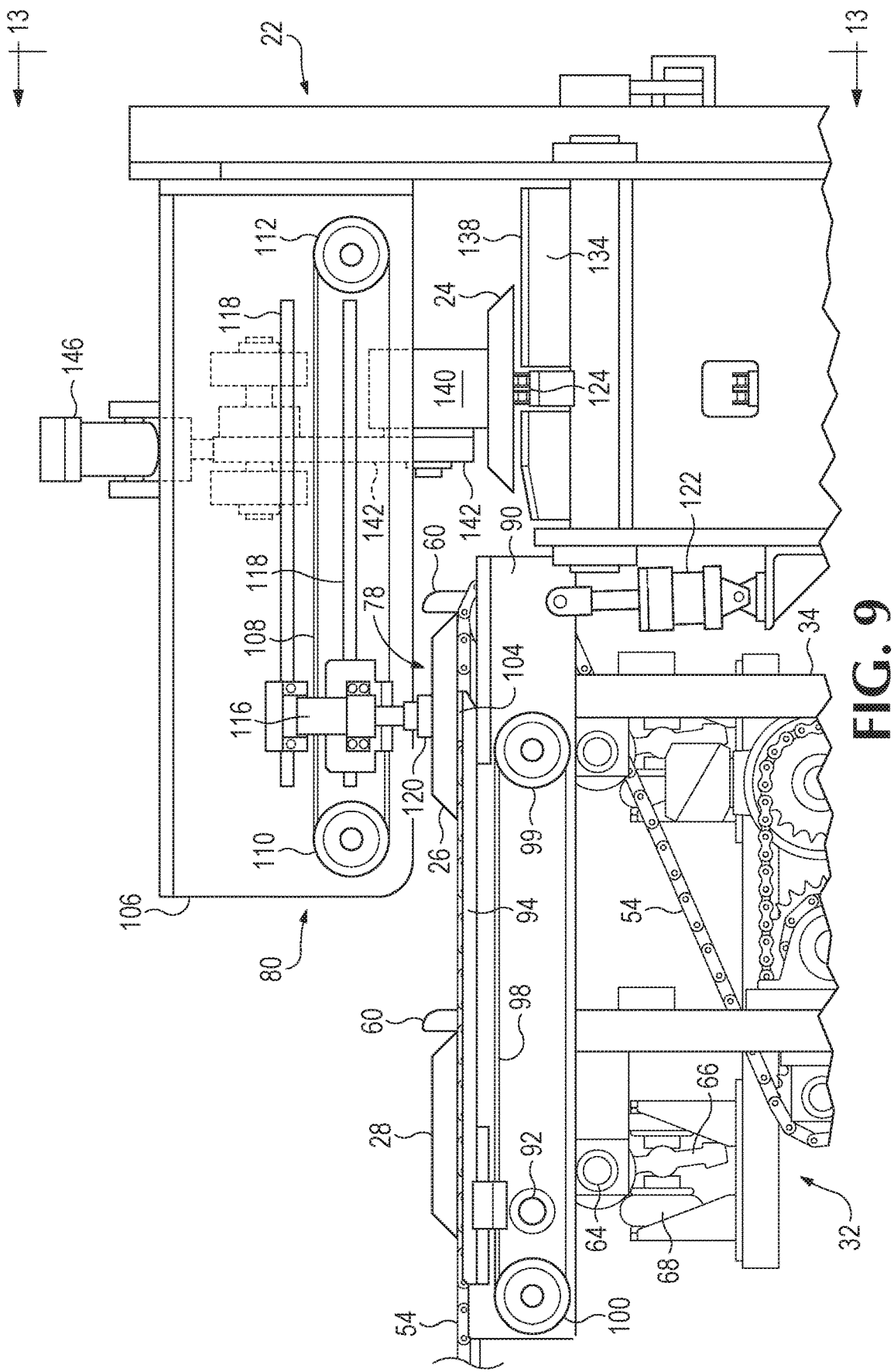
FIG. 9 is a view similar to FIG. 5, showing the flitch after being lowered onto the edger infeed mechanism.

The flitch 24 is then held between the tipples 134 and the edger infeed press rollers 140 as shown in FIG. 8 for at least a long enough time to provide an optimum end gap, enough separation between the tail end of the preceding flitch and the leading end 41 of the current flitch 24 for the preceding flitch to be sawn and moved clear of the saws 31 within the edger 20, before the current flitch engages the saws 31. Additionally, lowering the current flitch 24 must be delayed long enough to permit any relocation of the sawblades on the saw arbor that may be required in accordance with the sawing solution determined by the control computer 74.

Figure 15:
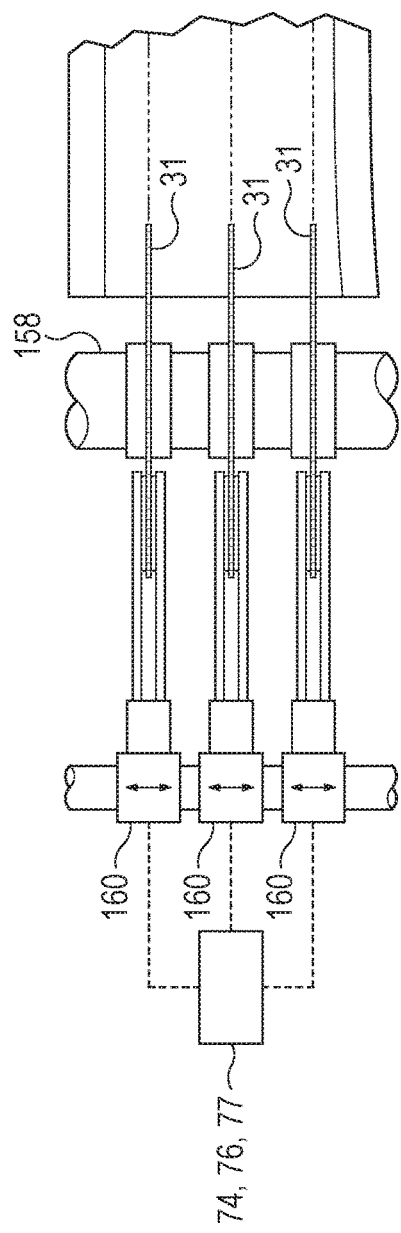
FIG. 15 is a somewhat schematic view showing saw blades of the edger shown in FIG. 14 and apparatus for moving the saw blades along an arbor of the edger.
Figure 16:
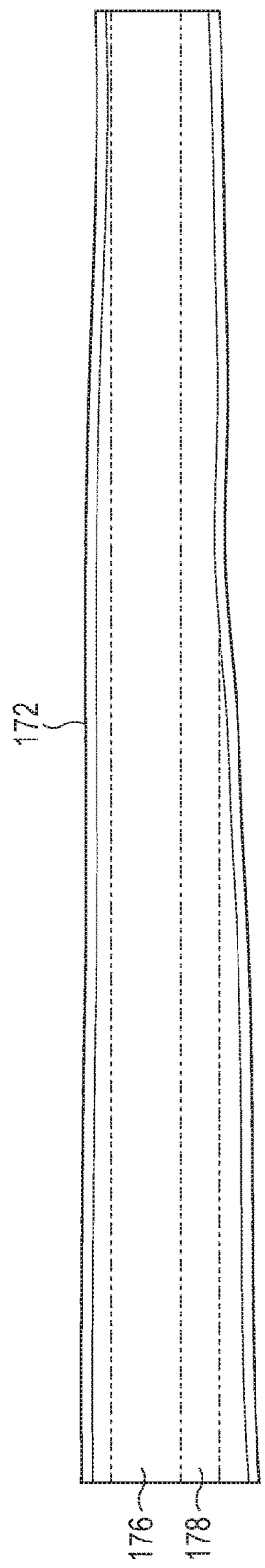
FIG. 16 is a top plan view of a flitch showing the positions of saw cuts on the flitch according to a sawing solution developed by the control computer.
Figure 17:
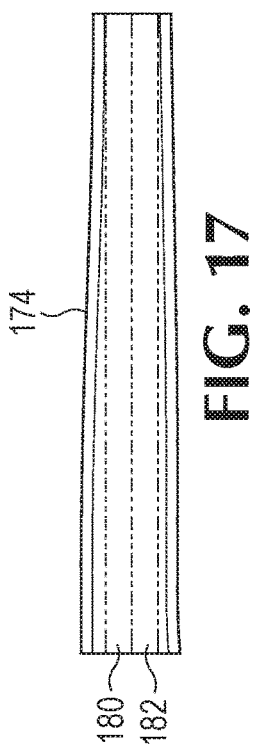
FIG. 17 is a top plan view of a different flitch from that shown in FIG. 16, and showing the planned cuts according to a sawing solution for that flitch.

Once the charger lower flitch support members 94 and clamp pad 120 and their actuators 116 have moved away from the flitch 24 the tipples 134 are not obstructed and are clear to be rotated downward. When the sawing solution for the flitch 24 being moved laterally into the upper edger ready position 156 calls for it to be sawn by the edger 20 into the same number and sizes of boards as the immediately preceding flitch, very little time is required for adjustment of the positions of the edger saw blades by the servo motors 160 as directed by the control computer 74 as shown in FIG. 15. There is then only a minimum delay (step 18) required between the tail end 162 of a preceding flitch and the leading end 41 of the flitch 24 about to be lowered onto the edger infeed sharpchain 124. When the flitch 24 is to be sawn into boards of different widths and locations on the flitch 24 than how the preceding flitch has been sawn, the positions of the edger saw blades 31 must be adjusted along the edger saw arbor 158 using servo motors 164 controlled by the control computer, as shown in FIG. 15. This requires additional time (and resulting distance along the edger feed chain 124) between the tail end 162 of the preceding flitch and the leading end 41 of the flitch 24. That distance may be determined by the photocell 152 sensing passage by the tail end 162 of the preceding flitch past the #1 tipple 134 (step 14), and by data from encoders on the feed roller 121 of the edger 20. The edger saws 31 can be quickly relocated on the arbor 158 as controlled by the computer 74, using data from the optimizer 76 and processed through programmable logic controller 77. The edger 20 can thus be quickly adjusted to saw the flitches 172 and 174 into different widths of boards 176, 178, 180 and 182, shown in FIGS. 16 and 17.

Figure 13:
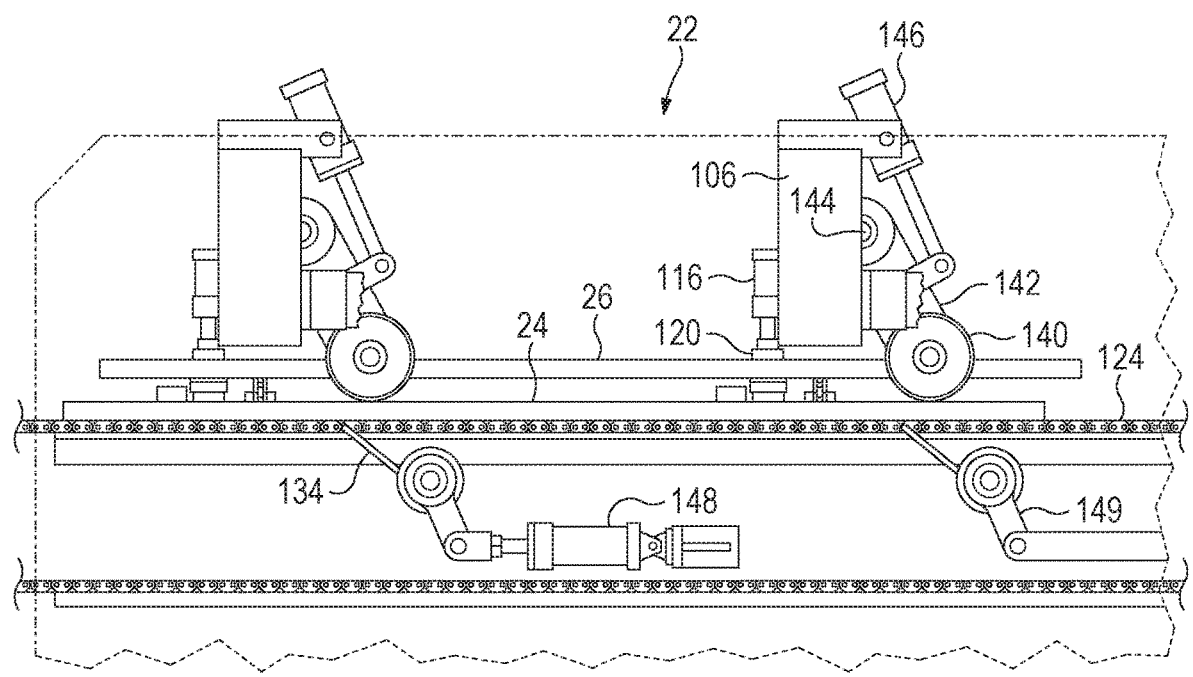
FIG. 13 is a view similar to FIG. 12, but showing the flitch resting on a sharpchain portion of the edger infeed mechanism with the tipples lowered and the infeed press rollers pressing the flitch onto the infeed mechanism sharpchain, while the lower charger mechanisms and press pads have engaged a following flitch at the transfer ready position.

As may be seen in FIG. 12 and FIG. 13, rotating the tipples 134 downward accelerates the flitch in the direction of movement of the upper surfaces of the sharpchain 124 toward the entry into the space between the press rollers 121 of the edger itself, as well as lowering the flitch into contact with the top of the sharpchain 124.

As the tipples 134 are rotated downward the infeed press rollers 140 are also moved downward, remaining in contact with the top face of the flitch 124 and pressing the flitch first against the outer margins 138 of the tipples and then against the upper edges of the sharpchain. The sharpchain 124 then carries the flitch toward the edger 20, feeding the leading end of the flitch between the edger press rolls 121 which then engage the flitch and move it through the saws to cut the flitch into boards according to the optimal sawing solution that was generated by the control computer 74 prior to operation of the charger mechanism.

After the calculated amount of movement of the tail end 162 of the previous flitch beyond the tipples, allowing for repositioning of the edger saws as mentioned above, the tipples 134 are lowered and the flitch 24 descends down upon the edger infeed sharpchain 124 and is pressed downward against the edger infeed sharpchain 124 by the infeed press rollers 140. The edger infeed sharpchain 124 then carries the flitch 24 toward the edger 20. Referring now to FIGS. 14-17 the feed rollers 121 of the edger 20 then carry the flitch 24 into engagement by the saws 31, which cut the flitch 24 into boards and scrap edge material according to the sawing solution determined by the control computer 74.

By the time the flitch 24 has been moved far enough into the edger 20 and is being moved through the saws 31 by the feed rolls 121 of the edger 20 far enough so that the tail end of the flitch 24 has moved beyond the #1 tipple, the tipple 134 closest to the edger 20, the following flitch 26 should have been carried by the lower flitch carrier members 94 and clamp pads 120 into the edger ready position 156, so that the cycle can be repeated as subsequent flitches 28, 30 etc. are moved laterally through the series of hook stops, and are scanned and converted into three-dimensional models and saved in the memory of the control computer 74, together with the data necessary to each flitch to the edger ready position and ultimately through the edger 20.

Once the preceding flitch has cleared the tipples and the leading end 41 of the flitch 24 is supported by the tipples 134, when the tipples are lowered the flitch 24 supported by the tipples is already positioned to be fed to the edger saw blades 31 in the most advantageous position and orientation. The flitch has only to drop a small distance, such as about 4 inches, from the edger ready position 156 once the tail end 162 of the preceding flitch is clear from beneath the leading end 41 of the flitch 24 supported by the tipples. Lowering the tipples 134, with the edger infeed presser rollers 140 pushing down on the top of the flitch, accelerates the flitch toward the edger saw blades 31, bringing it to a speed approaching that of the edger infeed sharpchain 124. The tipples 134 and the edger infeed presser rollers 140 continue to positively grasp and hold the flitch 24 until the flitch-contacting surfaces 138 of the tipples 134 have been lowered beneath the level of the upper faces of the edger infeed sharpchain 124. The edger infeed sharpchain 124 then engages and moves the flitch toward the edger press rollers 121. This transfer of the flitch 24 from the infeed scanner and carriage assembly 32 to the edger infeed sharpchain 124 and the change of direction from lateral movement to longitudinal movement of the flitch can all occur within a very brief time, as shown in FIG. 20, since the flitches moving laterally are at a higher location than the flitches moving longitudinally and have a shorter travel distance, and thus, the flitches moving laterally can be moved precisely, controlled by the charger sets to a properly oriented edger ready position 156 directly above the edger feed mechanism 22 that is moving longitudinally toward the edger saw blades, and the flitch 24 then can be lowered onto the edger infeed sharpchain.

Each time division on the time axis in FIG. 20 represents 100 milliseconds. As may be seen in FIG. 20, an entire cycle 184 of moving a scanned flitch 24 from the transfer ready position 78, through the edger ready position 156, and into the press rollers 121 of the edger 20, occurs in a very short time. The numbered steps shown in FIG. 20 are listed in the following table:

TABLE 1

1. Lower flitch carrier 94 raises in position on center of flitch face
2. Clamp pad 120 lowers in position on center of flitch face
3. #6 hook stop lowers
4. Edger infeed press rollers 140 rise TABLE 1-continued 5. Delay charger set advance as press rollers 140 rise
6. Charger set advances flitch to sawing solution relative to center line
7. #6 Hook stop rises
8. Trailing end of preceding flitch clears tipple #2
9. Tipples 2, 3, 4 rise
10. Press rollers 2, 3, 4 lower, clamping flitch 24 to tipples
11. Clamp pad 120 raises & flitch carrier 94 lowers
12. Charger sets return to charger ready position (center of flitch face)
13. Charger set clear of flitch 24
14. Trailing end 162 of preceding flitch clear tipple #1
15. Tipple 1 raises
16. Press roll 1 lowers, clamping infeed flitch 24 to tipples
17. Trailing end 162 of preceding flitch clears lumberline
18. Minimum required end gap relative to lumberline
19. Press rollers 140 & tipples lower flitch 24 onto sharpchain 124 to feed edger 20
20. Flitch 24 past number 2 edger press roll 121
21. Edger #2 press roll down on flitch 24

During the entire cycle 184 a flitch transfer charging cycle 186, the complete set of actions for transfer of a flitch in a lateral direction from the scanner and carriage assembly 32 to the charger ready position 156, may be completed in less than one second. After necessary delay while a preceding flitch clears the edger infeed mechanism 22 and enough space is left behind the tail end 162 of the preceding flitch for the preceding flitch to be clear of the saws 31 of the edger 20 and the saw blade positions are adjusted, before the next flitch engages the saw blades 31. In a complete sharpchain loading cycle 188 each flitch can be lowered from the edger ready position 156 onto the edger feed sharpchain 124 and delivered into the edger 20 far enough to be engaged by the second feed press rollers 121 in slightly more than 0.6 second.

Figure 21:
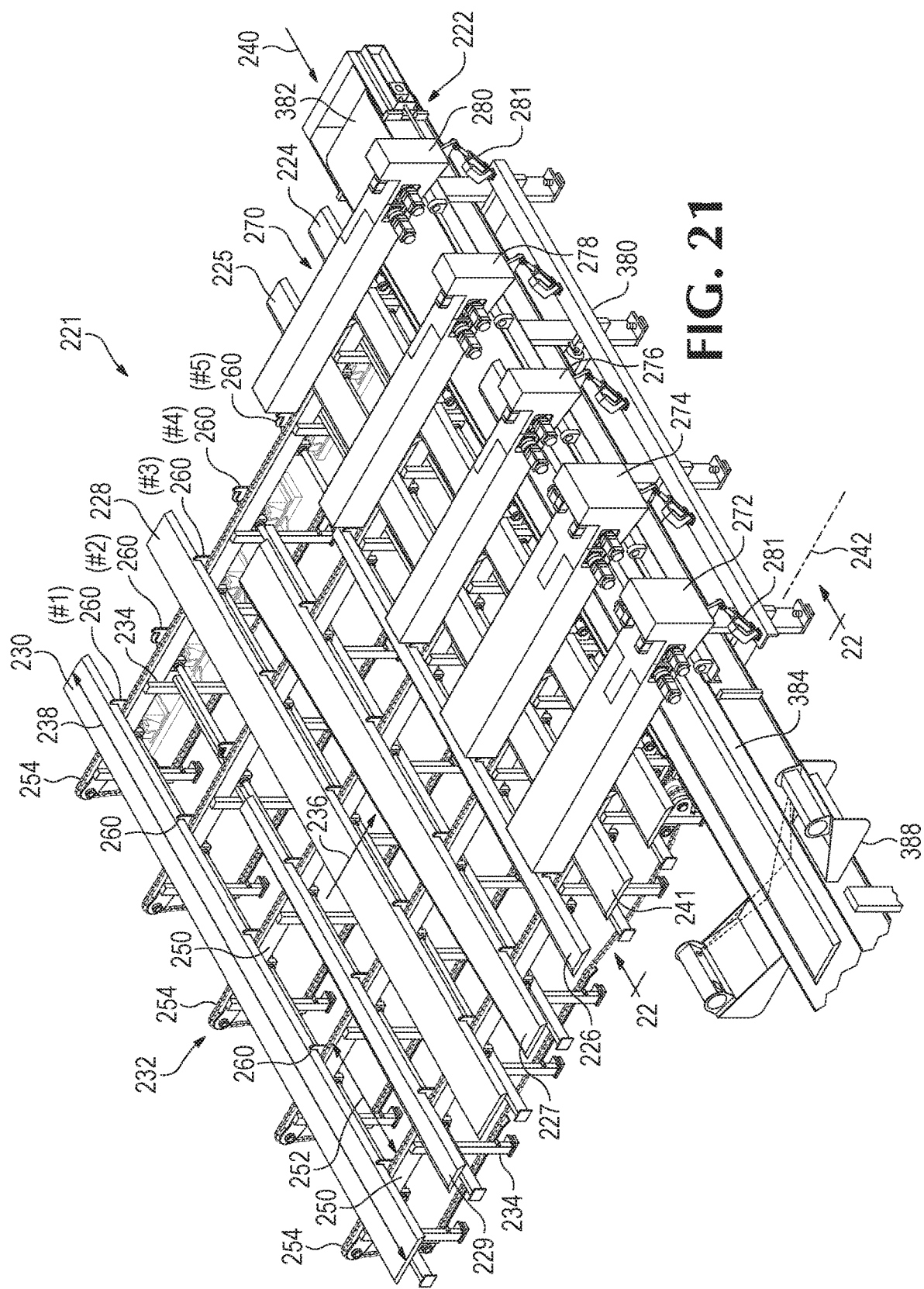
FIG. 21 is an isometric view of another example of an edger feed apparatus according to the present disclosure.

Referring to FIG. 21, another example of edger feed apparatus 21 according to the present disclosure is generally indicated at 221. Unless explicitly stated, edger feed apparatus 221 may additionally, or alternatively, include one or more other components of one or more other edger feed apparatus of the present disclosure. Edger feed apparatus 221 includes an edger infeed mechanism 222 arranged to deliver a flitch of wood 224, 225, 226, 227, 228, 229, or 230, etc. into an edger, such as edger 20 described above. The edger infeed mechanism is controlled and operated by various components shown schematically in FIG. 40.

Edger feed apparatus 221 additionally includes a carriage assembly 232, which has a structural frame 234 oriented or positioned to deliver flitches 224, 226, etc. to the edger by moving each flitch laterally in the direction of arrow 236, which is perpendicular to a length 238 of each flitch 224, 226, etc. The flitches are arranged side-by-side, lying flat and with their lengths oriented or positioned generally parallel with arrow 240, indicating the direction of which each flitch will pass longitudinally through the edger. An end of each flitch that will be leading end 241 as the flitch enters the edger is aligned with a lumber line 242, at the right-hand end of carriage assembly 232. The flitches may be loaded onto carrier assembly 232 manually or by a loading apparatus not disclosed herein.

Frame 234 of carriage assembly 232 includes a group of feed rail assemblies 250 that are oriented or positioned horizontal and parallel with each other, separated from one another by a distance 252 that is somewhat less than the length of the shortest flitch intended to be fed to the edger, such as a distance corresponding to a standard board length intended to be produced. As shown in FIG. 21, there are five feed rail assemblies 250 in carriage assembly 232. However, other carriage assemblies may include less or more feed rail assemblies.

Figure 28:
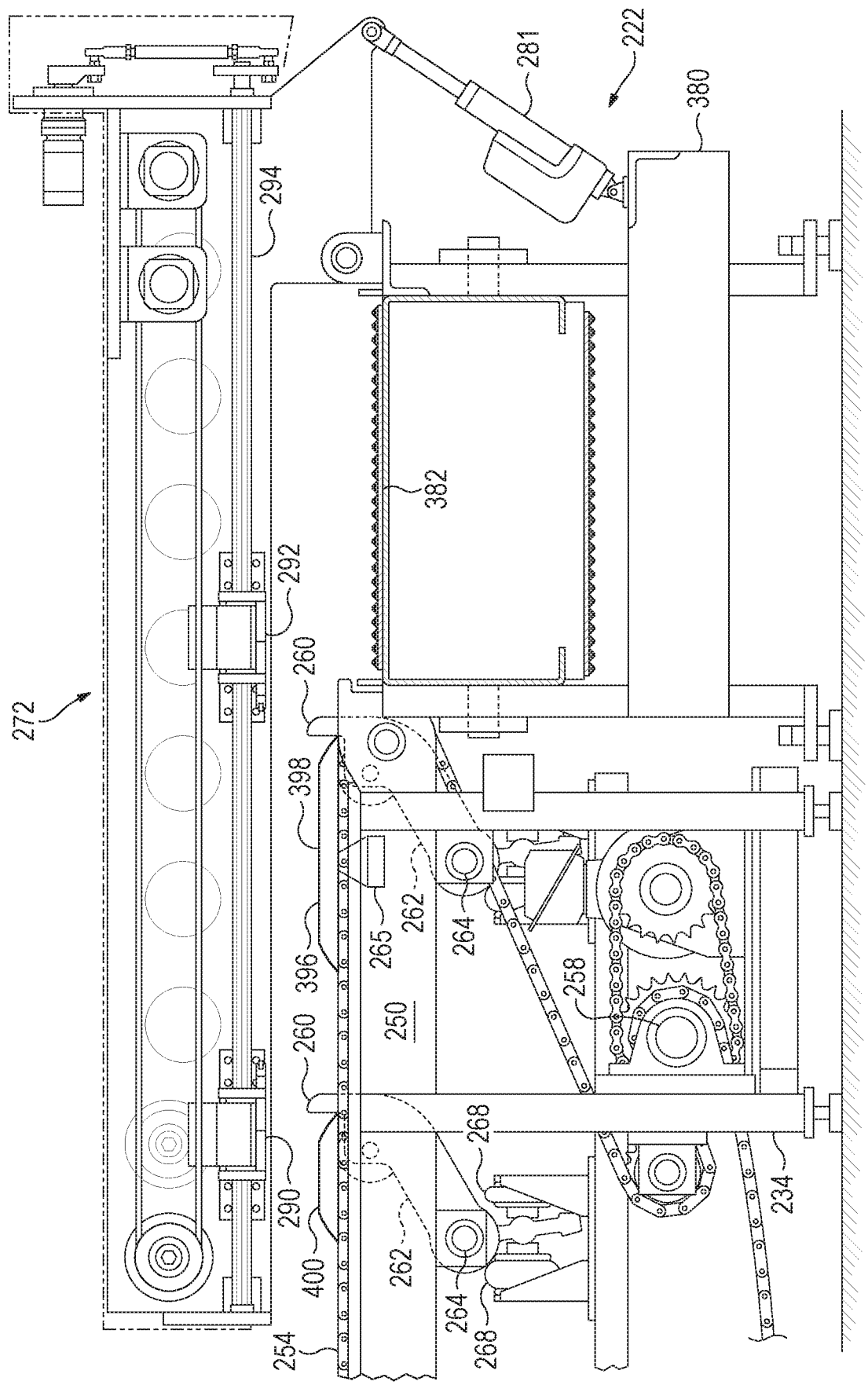
FIGS. 28-38 are partial sectional of the edger feed apparatus of FIG. 21 taken along lines 22-22 in FIG. 21 or partial top views of the edger feed apparatus of FIG. 21, showing without covers to show movement of flitches from a transfer ready position, to an edger ready position, and onto the edger infeed mechanism.

Endless loop feed chains 254 of which there are five shown in FIG. 21, are engaged with appropriate sprockets so as to move in respective parallel vertical planes. The endless feed chains 254 are arranged to be driven synchronously by drive sprockets carded on a chain drive shaft 258, as best seen in FIG. 28. An upper portion of each of the endless chains 254 may be disposed horizontally and ride along the top of a respective one of feed rail assemblies 250 to support flitches 224, 226, etc. and move them along feed rail assemblies 250 toward edger infeed mechanism 222, spaced apart from each other by a desired distance. Feed chains 254 are driven to move continuously to carry flitches 224, 226, etc. toward edger infeed mechanism 222.

Figure 22:
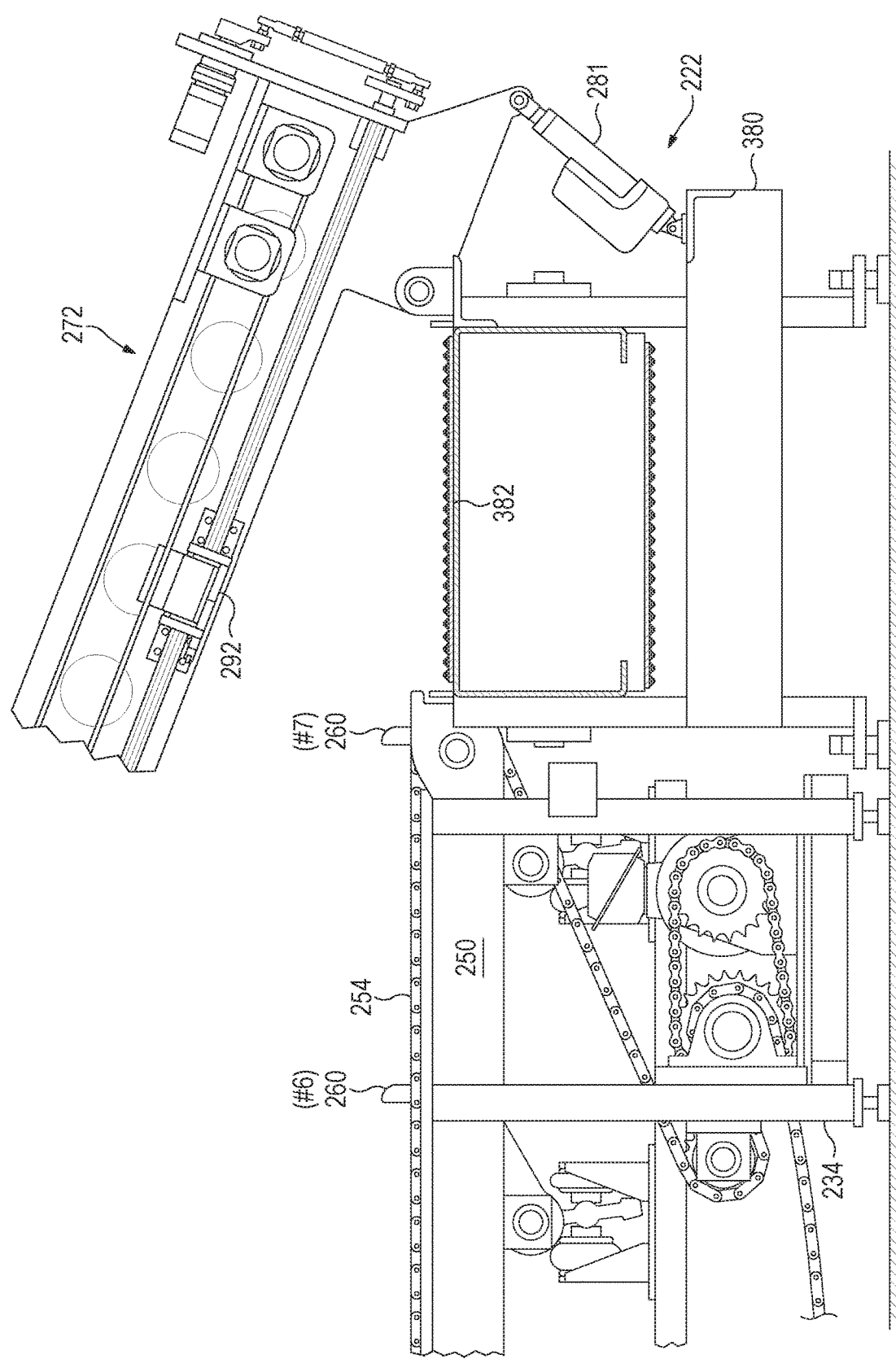
FIG. 22 is a side view of a portion of the apparatus shown in FIG. 21, taken along lines 22-22 in FIG. 21.
Figure 23:
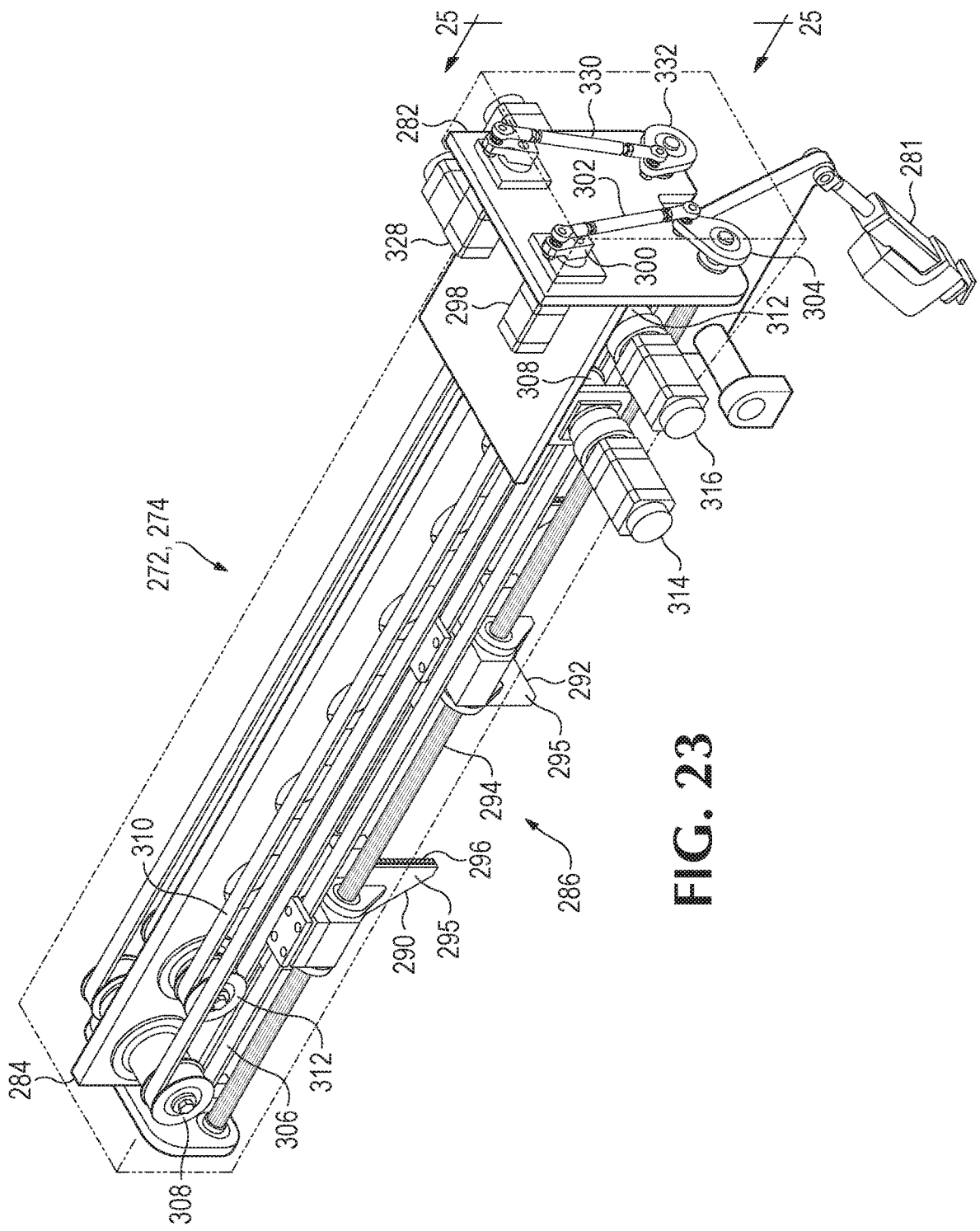
FIGS. 23-24 are isometric views of a fetcher subassembly having dual sets of fetchers of the edger feed apparatus of FIG. 21.
Figure 24:
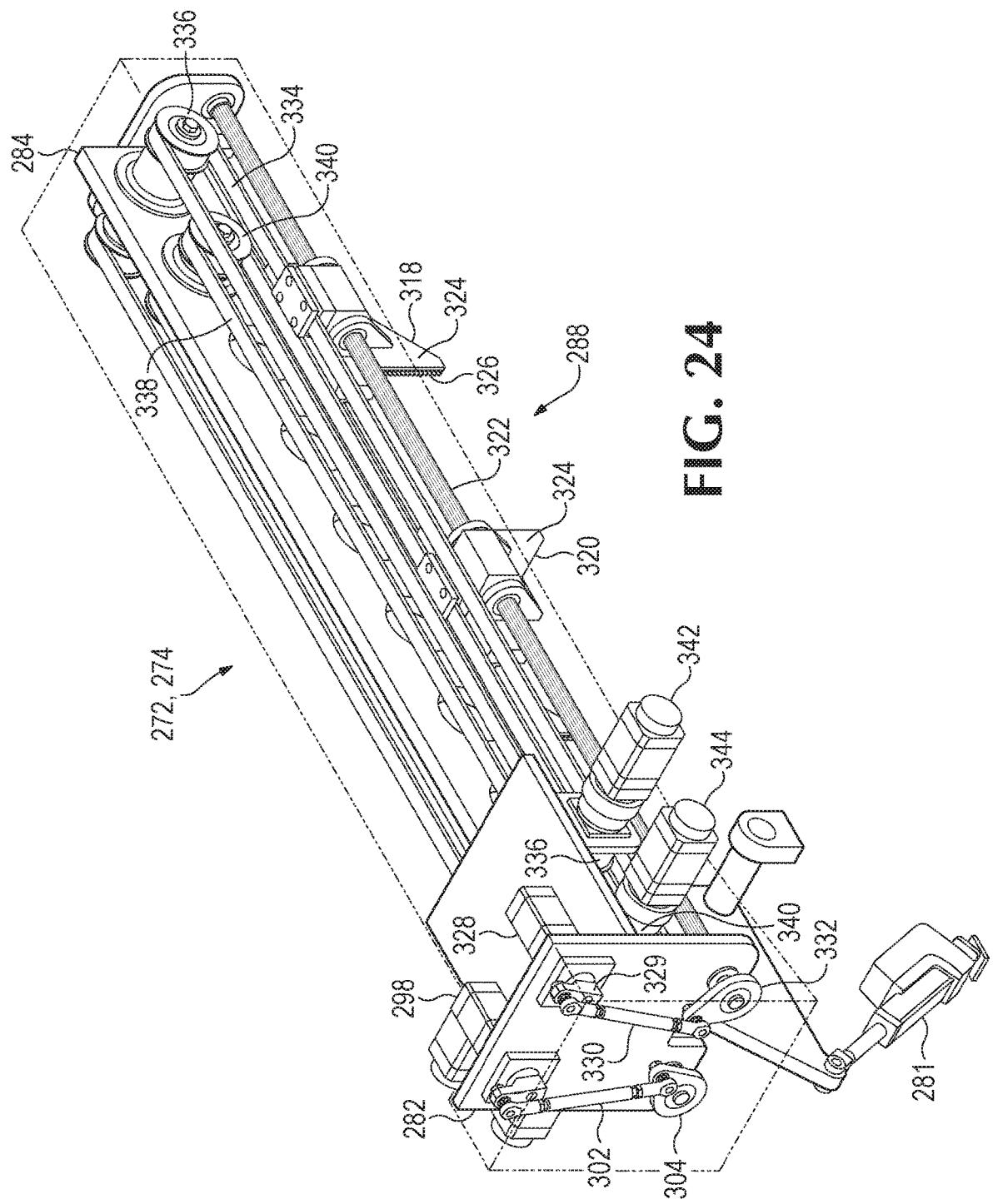
Figure 25:
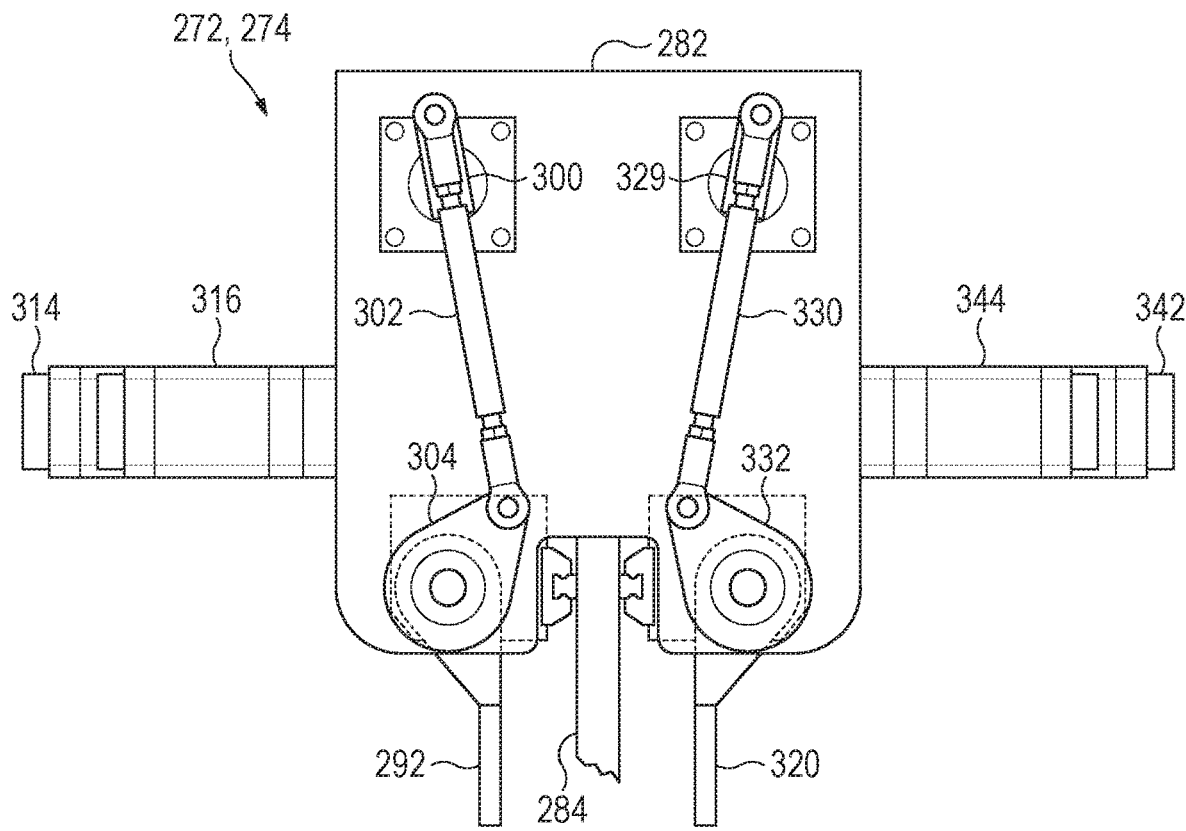
FIGS. 25-26 are end views of the fetcher assembly of FIG. 22 shown without a cover.
Figure 26:
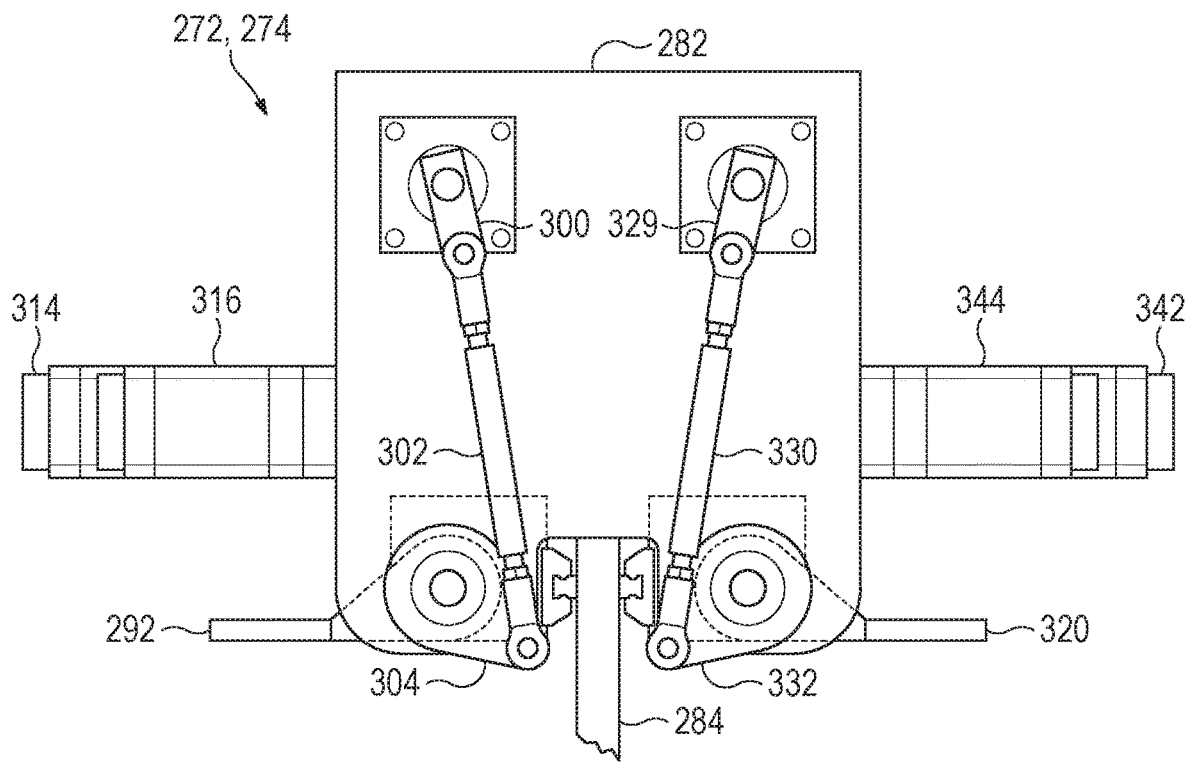

Seven sets of hooks 260 (five are seen in FIG. 21 and the remaining two are seen in FIG. 22), extend across the direction of movement of the feed chains. They are carried on pivoted arms 262 and are arranged to be raised and lowered periodically to let each flitch 224, 226, etc. move in steps a predetermined distance along carriage assembly 232 toward edger infeed mechanism 222, and to keep the flitches separated from each other. When a set of hooks 260 is raised and obstructs one of the flitches, feed chains 254 continue to move but the links of the feed chains preferably have smooth straight outer surfaces that can slide along the bottom face of a flitch 224, etc. without causing damage when the flitch is held stationary by one of the set of hooks 260. At the same time, however, flitches 224, 226, 228, etc. are engaged by feed chains 254 with sufficient friction that each flitch is carried with negligible slippage when the flitch is not obstructed by a set of hooks 260.

There may be seven sets of hooks, spaced apart by a convenient distance such as 30 inches that may be designed according to the size of flitches to be handled. As a flitch is carried along carriage assembly 232, it is stopped momentarily at each set of hooks 260, which may be called hook stop #1, or hook stop #2, etc. Various functions may be carried out at each hook stop or between one hook stop and the next.

Arms 262 carrying the ones of a set of hooks 260 may all be mounted on a shaft 264 extending transversely of carriage assembly 232, thus parallel with the length of a flitch on the carriage assembly. Each such shaft 264 may be rotated through a few degrees in either direction by suitable means, such as inflation and deflation of the ones of a respective pair of airbags 268, for example, as may be seen in FIG. 28.

A fetcher assembly 270 is located at the outfeed end of carriage assembly 232 and above edger infeed mechanism 222 to transfer each flitch to the edger infeed mechanism. The fetcher assembly includes fetcher subassemblies 272, 274, 276, 278, and 280, each conveniently associated with one of feed chains 254. In the example shown in FIG. 21, fetcher subassemblies 272 and 274 include dual sets of fetchers (also called dual fetcher #1 and #2, respectively), while fetcher subassemblies 276, 278, and 280 include single sets of fetchers (also called single fetcher #3, #4, and #5, respectively). Each of the fetcher subassemblies are pivotably connected to edger infeed mechanism 222 and a linear actuator 281 (e.g., air or hydraulic cylinder) allows a user to selectively raise any of the fetcher subassemblies for operational or maintenance purposes as shown in FIG. 22. Although fetcher assembly 270 is shown to include five fetcher subassemblies, other examples of fetcher assembly 270 may include more or less fetcher subassemblies. Additionally, although fetcher assembly 270 is shown to include two fetcher subassemblies having dual sets of fetchers and three fetcher subassemblies having single sets of fetchers, other examples of fetcher assembly 270 may include dual fetchers for none, less, more, or all of the fetcher subassemblies, which may depend on the flitch sizes being processed.

A representative one of fetcher subassemblies 272 and 274 is depicted in FIGS. 23-26. Fetcher subassemblies 272 and 274 include a fetcher support structure 282 that extends over the outfeed end of carriage assembly 232 and above edger infeed mechanism 222. Fetcher support structure 282 includes a vertical wall 284 that separates a first set of fetchers 286 from a second set of fetchers 288. The first set of fetchers includes a first pair of dogs, namely a left-hand (LH) dog 290 and a right-hand (RH) dog 292, that are connected to a first elongate rod or first shaft 294 such that those dogs pivot or rotate when first shaft 294 pivots or rotates. In the example shown in FIGS. 22-25, LH dog 290 and RH dog 292 each includes a generally planar member 295 having an edge with a plurality of teeth 296 for gripping flitches. A first shaft motor 298 is connected to first shaft 294 via a first shaft torque arm 300, a first tie rod 302, and a first shaft arm 304 to selectively pivot first shaft 294 and the LH and RH dogs such that the LH and RH dogs pivot between a ready or operating position in which the LH and RH dogs are perpendicular to a flitch in the transfer ready position, and a stow position in which the LH and RH dogs are parallel to a flitch in the transfer ready position.

Although LH dog 290 and RH dog 292 are connected to first shaft 294 such that those dogs pivot when the first shaft pivots, the LH and RH dogs also are slidably connected to first shaft 294 to allow those dogs to slide relative to that shaft. In the example shown in FIGS. 23-26, first shaft 294 is a shaft with external longitudinal splines (or a splined shaft) that fit into corresponding internal grooves in the LH and RH dogs allowing the LH and RH dogs to slide relative to the first shaft and also to rotate with the first shaft. LH dog 290 is connected to a LH belt 306 supported on idlers or spools 308, while RH dog 292 is connected to a RH belt 310 supported on idlers or spools 312. A LH dog motor 314 selectively rotates the LH belt to move the LH dog toward or away from a flitch in the transfer ready position. Similarly, a RH dog motor 316 selectively moves the RH belt to move the RH dog toward or away from a flitch in the transfer ready position. In other words, the LH and RH dog motors move the LH and RH dogs between a grip position in which the LH and RH dogs contact a flitch in the transfer ready position, and a release position in which the LH and RH dogs are spaced from a flitch in the transfer ready position.

Second set of fetchers 288 similarly includes a second pair of dogs, namely a left-hand (LH) dog 318 and a right-hand (RH) dog 320, that are connected to a second elongate rod or second shaft 322 such that those dogs pivot or rotate when second shaft 322 pivots or rotates. Similar to the first set of fetchers, LH dog 318 and RH dog 320 each includes a generally planar member 324 having an edge with a plurality of teeth 326 for gripping flitches. A second shaft motor 328 is connected to second shaft 322 via a second shaft torque arm 329, a second tie rod 330, and a second shaft arm 332 to selectively pivot second shaft 322 and the LH and RH dogs such that the LH and RH dogs pivot between a ready or operating position in which the LH and RH dogs are perpendicular to a flitch in the transfer ready position, and a stow position in which the LH and RH dogs are parallel to a flitch in the transfer ready position.

Although LH dog 318 and RH dog 320 are connected to second shaft 322 such that those dogs pivot when the second shaft pivots, the LH and RH dogs also are slidably connected to second shaft 322 to allow those dogs to slide relative to that shaft. In the example shown in FIGS. 23-26, second shaft 322 is a shaft with external longitudinal splines (or a splined shaft) that fit into corresponding internal grooves in the LH and RH dogs allowing the LH and RH dogs to slide relative to the first shaft and also to rotate with the first shaft. LH dog 318 is connected to a LH belt 334 supported on idlers or spools 336, while RH dog 320 is connected to a RH belt 338 supported on idlers or spools 340. A LH dog motor 342 selectively rotates the LH belt to move the LH dog toward or away from a flitch in the transfer ready position. Similarly, a RH dog motor 344 selectively moves the RH belt to move the RH dog toward or away from a flitch in the transfer ready position. In other words, the LH and RH dog motors move the LH and RH dogs between a grip position in which the LH and RH dogs contact a flitch in the transfer ready position, and a release position in which the LH and RH dogs are spaced from a flitch in the transfer ready position.

Figure 27:
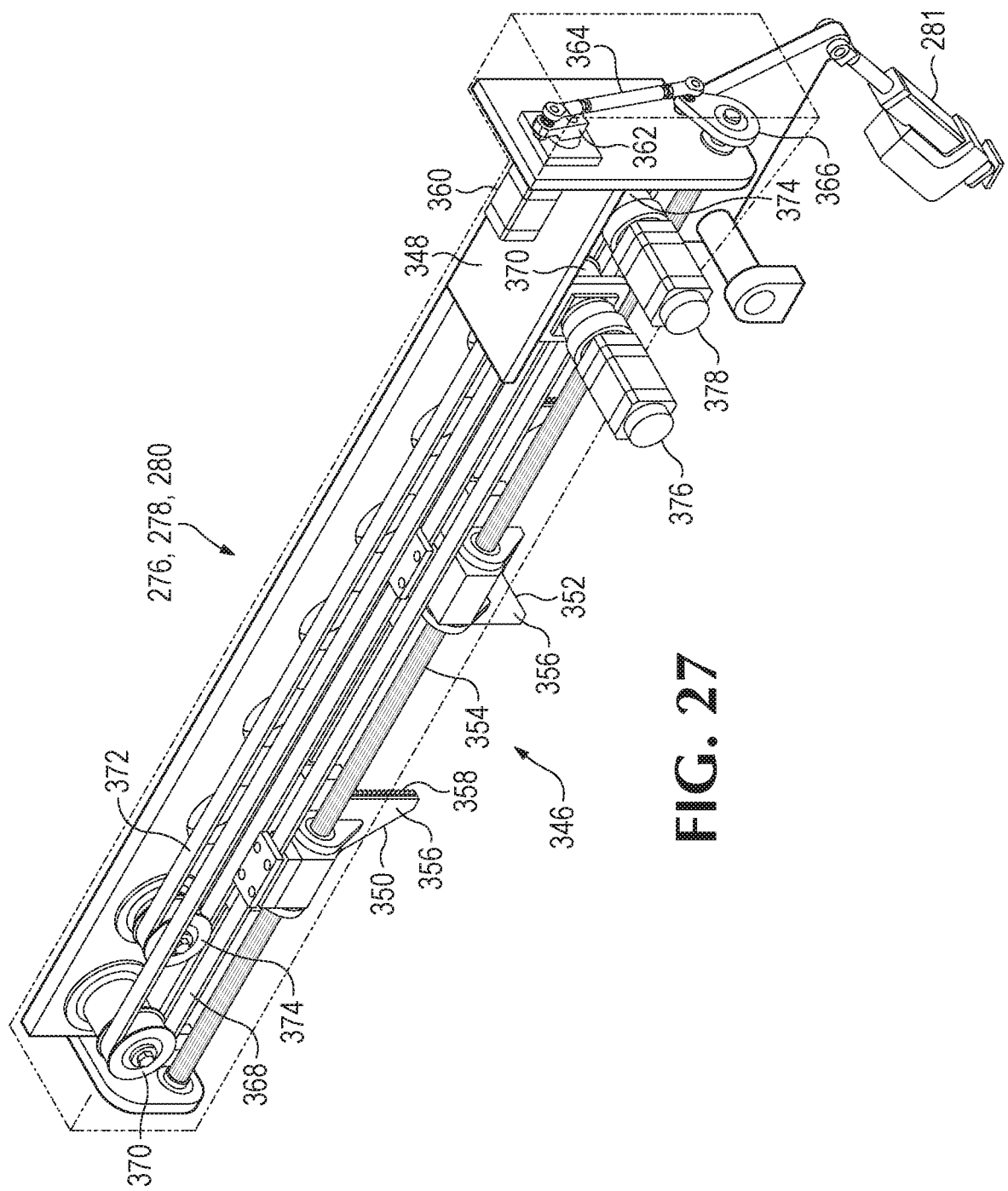
FIG. 27 is an isometric view of a fetcher assembly having only a single pair of dogs of the edger feed apparatus of FIG. 21.

A representative one of fetcher subassemblies 276, 278, and 280 is depicted in FIG. 27 having only a first set of fetchers 346 (and without a second set of fetchers). Fetcher subassemblies 276, 278, and 280 have substantially the same structure and components as fetcher subassemblies 272 and 274 but without the second set of fetchers. For example, fetcher subassemblies 276, 278, and 280 include a fetcher support structure 348. The first set of fetchers includes a pair of dogs, namely a left-hand (LH) dog 350 and a right-hand (RH) dog 352, that are connected to an elongate rod or shaft 354 such that those dogs pivot or rotate when shaft 354 pivots or rotates. LH dog 350 and RH dog 352 each includes a generally planar member 356 having an edge with a plurality of teeth 358 for gripping flitches. A shaft motor 360 is connected to shaft 354 via a shaft torque arm 362, a tie rod 364, and a shaft arm 366 to selectively pivot shaft 354 and the LH and RH dogs such that the LH and RH dogs pivot between a ready or operating position in which the LH and RH dogs are perpendicular to a flitch in the transfer ready position, and a stow position in which the LH and RH dogs are parallel to a flitch in the transfer ready position.

LH dog 350 and RH dog 352 also are slidably connected to shaft 354 to allow those dogs to slide relative to that shaft. LH dog 350 is connected to a LH belt 368 supported on idlers or spools 370, while RH dog 352 is connected to a RH belt 372 supported on idlers or spools 374. A LH dog motor 376 selectively rotates the LH belt to move the LH dog toward or away from a flitch in the transfer ready position. Similarly, a RH dog motor 378 selectively moves the RH belt to move the RH dog toward or away from a flitch in the transfer ready position. In other words, the LH and RH dog motors move the LH and RH dogs between a grip position in which the LH and RH dogs contact a flitch in the transfer ready position, and a release position in which the LH and RH dogs are spaced from a flitch in the transfer ready position.

Figure 35:
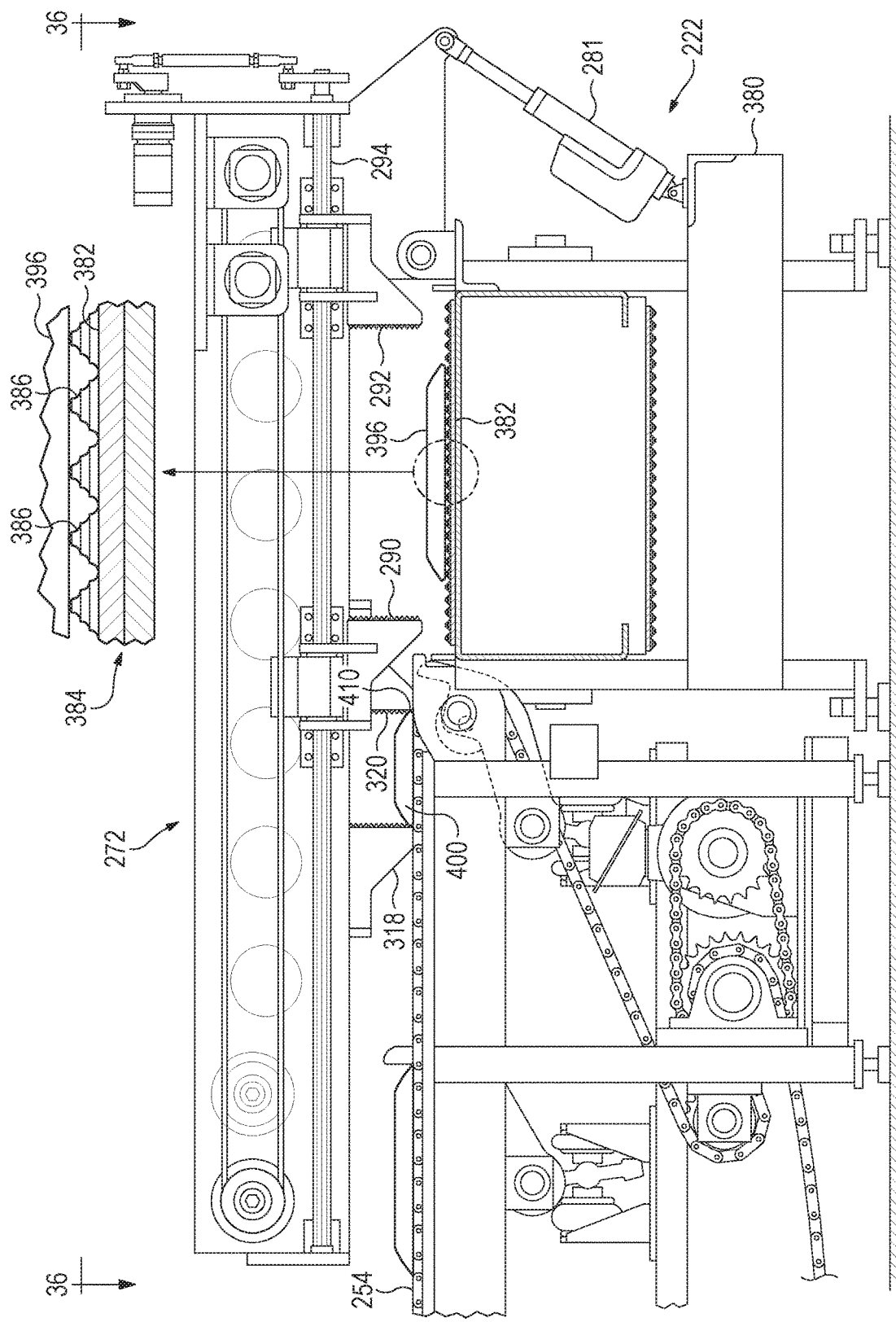

Referring back to FIGS. 21-22, edger infeed mechanism 222 includes a frame 380 and a conveyor belt 382 having a transport surface 384 that moves in a direction that is parallel to the length of the flitches (and perpendicular to the direction of travel of the flitches on the carriage assembly) toward the edger. The transport surface of the conveyor belt includes a plurality of projections 386 to cushion the flitches (as best seen in FIG. 35), which is also referred to as a "roughtop surface" or a "roughtop conveyor belt."

Figure 40:
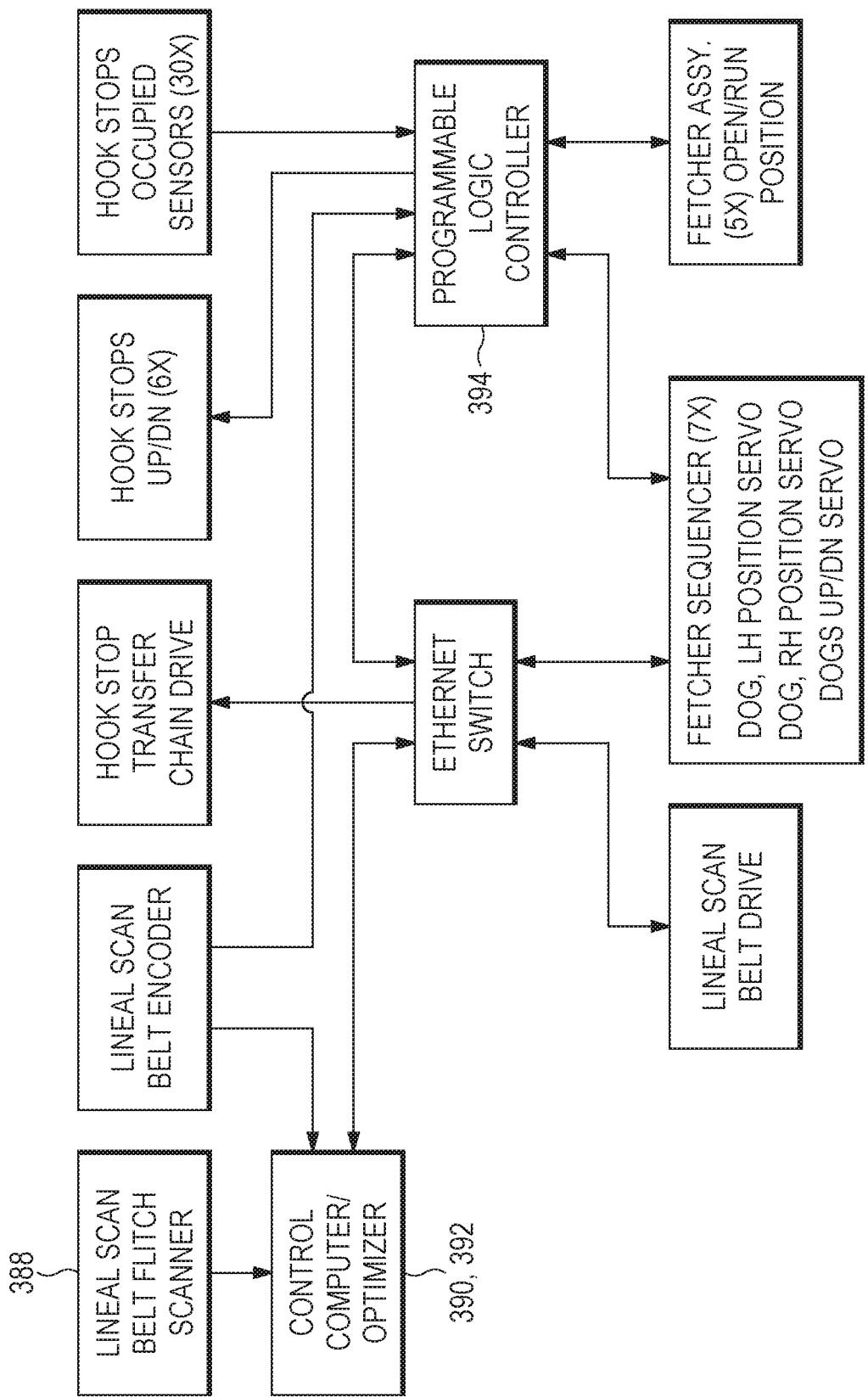
FIG. 40 is a block diagram of the control signal paths between some of the sensors and control and flitch-moving portions of the edger feed apparatus shown in FIG. 21.

Edger infeed mechanism 222 also includes a linear scanner system 388 disposed downstream from the fetcher assembly, as shown in FIG. 21. The scanner system scans each flitch precisely as it is carried on the conveyor belt toward the edger. The scanner system is connected functionally to a control computer 390, as shown in FIG. 40. Digital data derived from scanning each flitch 224, 226, etc. is delivered to the control computer 390, as by a suitable data cable (not shown).

The control computer 390 is adapted to receive the digital data from scanner system 388 and to compile it as a digital three-dimensional model, such as a wireframe model, of each flitch. The three-dimensional model of a flitch may preferably be prepared to a resolution of 0.001 inch, to identify the boundaries of the flat upper face of each flitch, where the flitch begins to wane, and the control computer 390 utilizes the digital three-dimensional model as a basis for deciding what parts of the flitch should be removed by the edger. An optimizer section 392 of control computer 390 incorporates a database which may include a tabulation of many different sizes, types, and grades of lumber and the current value of each. The control computer may be programmed to determine from the three-dimensional model what boards of which grades can be produced from a particular flitch, for example, which parts of the flitch should be removed by the edger and how to cut the remaining portion of the flitch into pieces which can result in an optimum value of marketable lumber. A sawing solution is then developed by control computer 390 and conforming instructions and data may be communicated among the various elements of the edger, carriage assembly 232, and edger infeed mechanism 222 using a programmable logic controller 394 so that the flitch will be sawed accordingly by the edger. The sawing solution may include instructions to require the edger to adjust the positions of individual ones of the various saw blades.

An example of the sequence of steps for carrying flitches through edger feed apparatus 221 and the edger is shown in a flow chart in FIGS. 39A-39E. Other examples of the sequence of steps may add, omit, replace, and/or substitute one or more steps shown in FIGS. 39A-39E, such as with one or more steps described in the present disclosure (e.g., FIG. 18 flowchart). An example of the components and the communication connections between those components are shown in FIG. 40.

Figure 41:
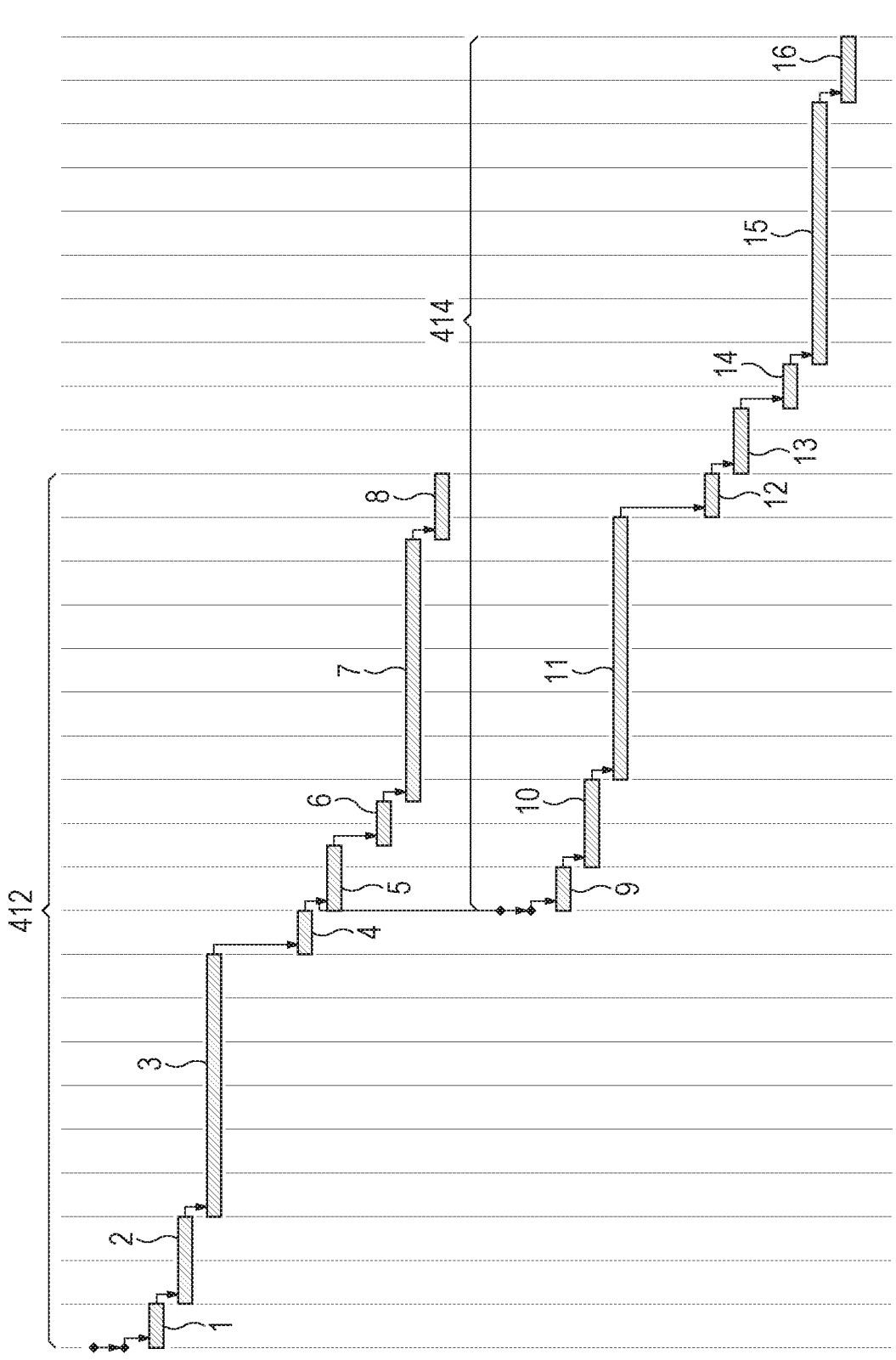
FIG. 41 is a timing diagram showing movements of components involved in transferring a flitch from the outfeed end of the carriage assembly onto the conveyor belt of the edger infeed mechanism, and then carrying the flitch into the edger.
Figure 43A:
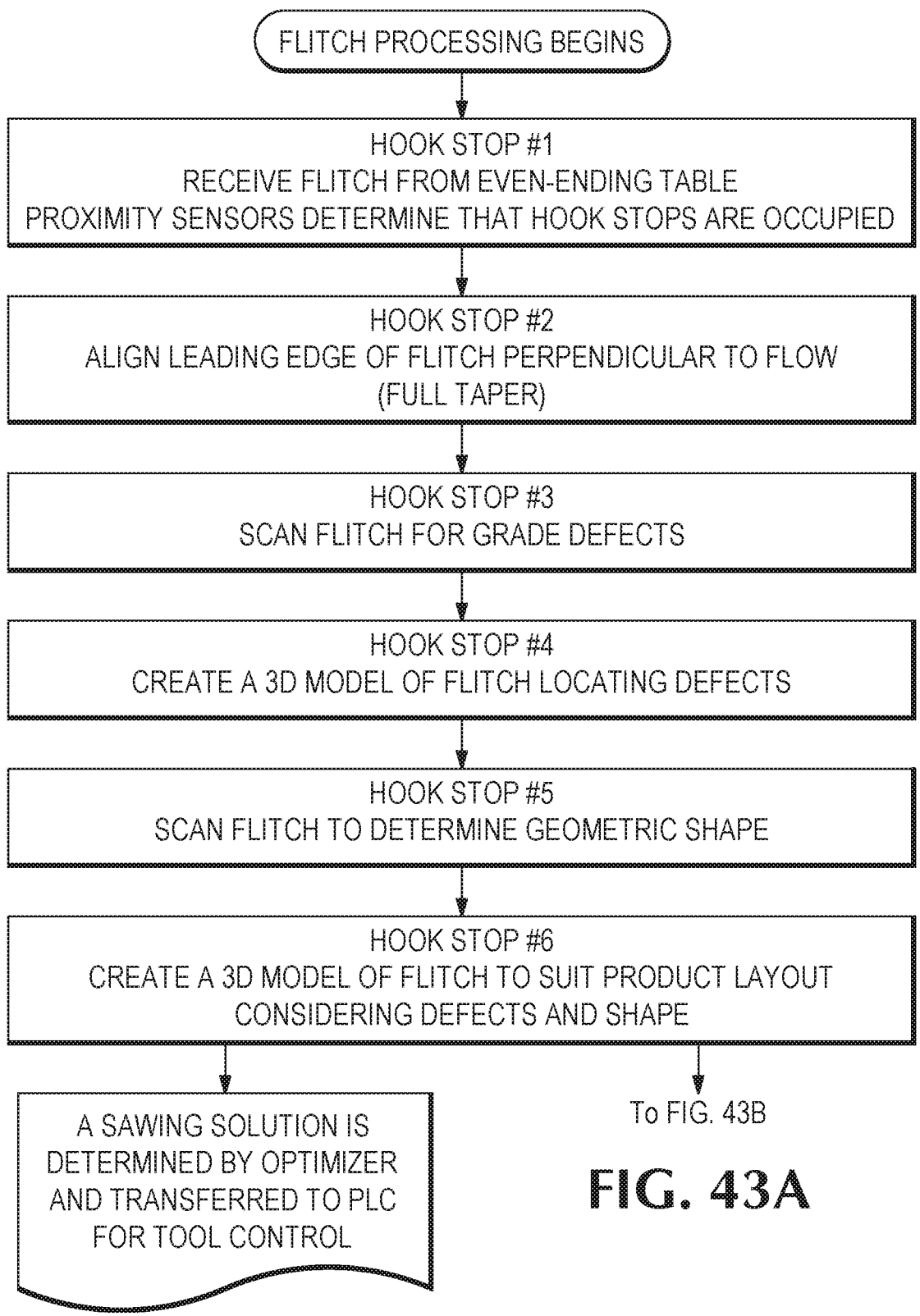
Figure 43C:
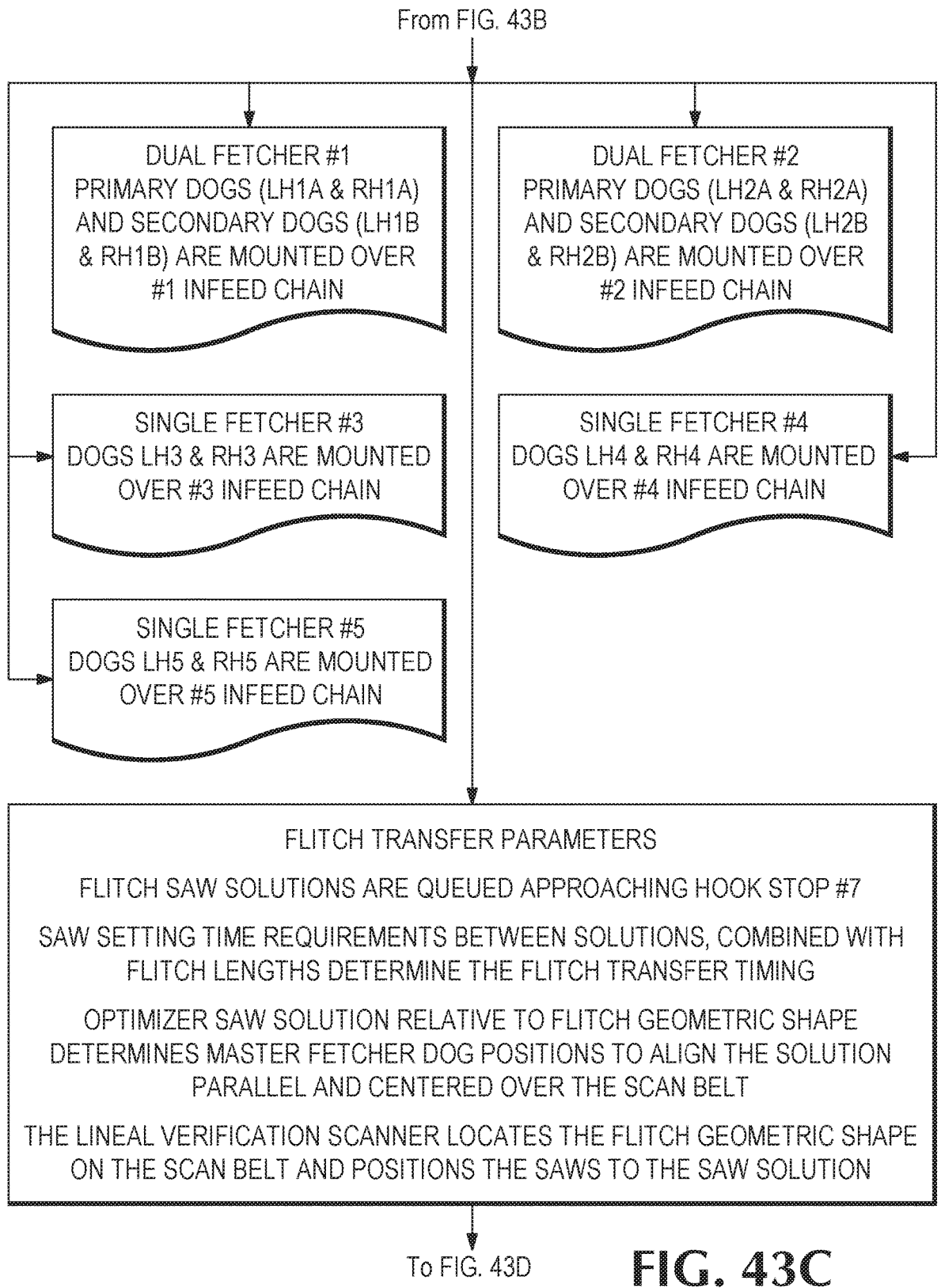

However, there may be additional and/or alternative components and/or communication connections as described in the present disclosure (e.g., FIG. 19). An example of the timing sequence of actions for fetcher subassemblies having dual fetchers is shown in FIG. 41. Other examples of the timing sequence of actions may add, omit, replace, substitute, speed up, slow down one or more actions shown in FIG. 41, such as with one or more actions described in the present disclosure (e.g., FIG. 20).

A flitch may be placed flat on the carriage assembly 232 with an end 241 of the flitch that is eventually to be the leading end of the flitch aligned with the lumber line 242 at the right end of the carriage assembly 232. Feed chains 254 are continuously in motion and carry the flitch to hook stop #1, where the first set of hooks 260 engage the leading edge of the flitch. Proximity sensors (one example is shown in FIG. 28 at 265) determine that hooks stops are occupied. Examples of proximity sensors include photocells, lasers, wands, and camera systems. At an appropriate time, the set of hooks of hook stop #1 will be dropped allowing the flitch to move to hook stop #2, where the leading edge of flitch 229 shown in FIG. 21 is aligned perpendicular to flow. At each hook stop, sensors will detect when the hooks 260 at the next subsequent hook stop are lowered so that a preceding flitch is starting to move away leaving space for the flitch being held at the lower-numbered hook stop, whose hooks 260 will then be lowered in response. As soon as a flitch has moved clear of a hook stop, the hooks 260 are again raised to stop the next flitch. When the hooks 260 of hook stop #2 are dropped, the feed chains carry the flitch to hook stop #3 where it is engaged and stopped by the again-raised hooks 260 at hook stop #3. A similar process occurs as the flitch is moved from hook stop #3, to hook stop #4, to hook stop #5, and to hook stop #6. At each of the above hooks stops, the leading edge of the flitch shown in FIG. 21 is aligned perpendicular to flow.

When the flitch reaches hook stop #6 the flitch is retained until a preceding flitch at hook stop #7 has been engaged by fetcher assembly 270 and is being transferred toward edger ready position 406. When fetcher assembly 270 has carried a proceeding flitch clearly away from the transfer ready position at hook stop #7, the hooks of hook stop #7 are raised to stop the flitch being moved from hook stop #6 to hook stop #7 at the outfeed end of the carriage assembly. Feed chains 254 thus eventually carry each flitch on the carriage assembly to transfer ready position 398 at an outfeed end of carriage assembly 232 at hook stop #7, where fetcher assembly 270 receives the flitch and moves it to the edger ready location 406 above an edger infeed mechanism 222 arranged to carry the flitch into the edger.

In transfer ready position 398, the desired set of hooks 260 of hook stop #7 stop the flitch and establish a full taper orientation, located where the flitch can be grasped to be moved to the desired orientation in the edger ready position and from which it is to be moved onto edger infeed mechanism 222. When the flitch has arrived at hook stop #7 it is ready for the fetching sequence to be performed as directed by control computer 390. Proximity sensors mounted near each hook stop sense the length of the flitch relative to the lumberline and the control computer determines based on those sensors which fetcher subassemblies and/or sets of fetchers of those subassemblies are required for the transfer. For example, all five fetcher subassemblies are used for flitch 396 in FIG. 36 but only the first two fetcher subassemblies are used for flitch 400.

Referring to FIG. 28, a first flitch 396 is against hook stop #7 in a transfer ready position 398 and a second flitch 400 is spaced upstream of the first flitch. The LH and RH dogs of the first and second set of fetchers of fetcher subassemblies 272, 274, 276, 278, and 280 are in the stow position.

Figure 29:
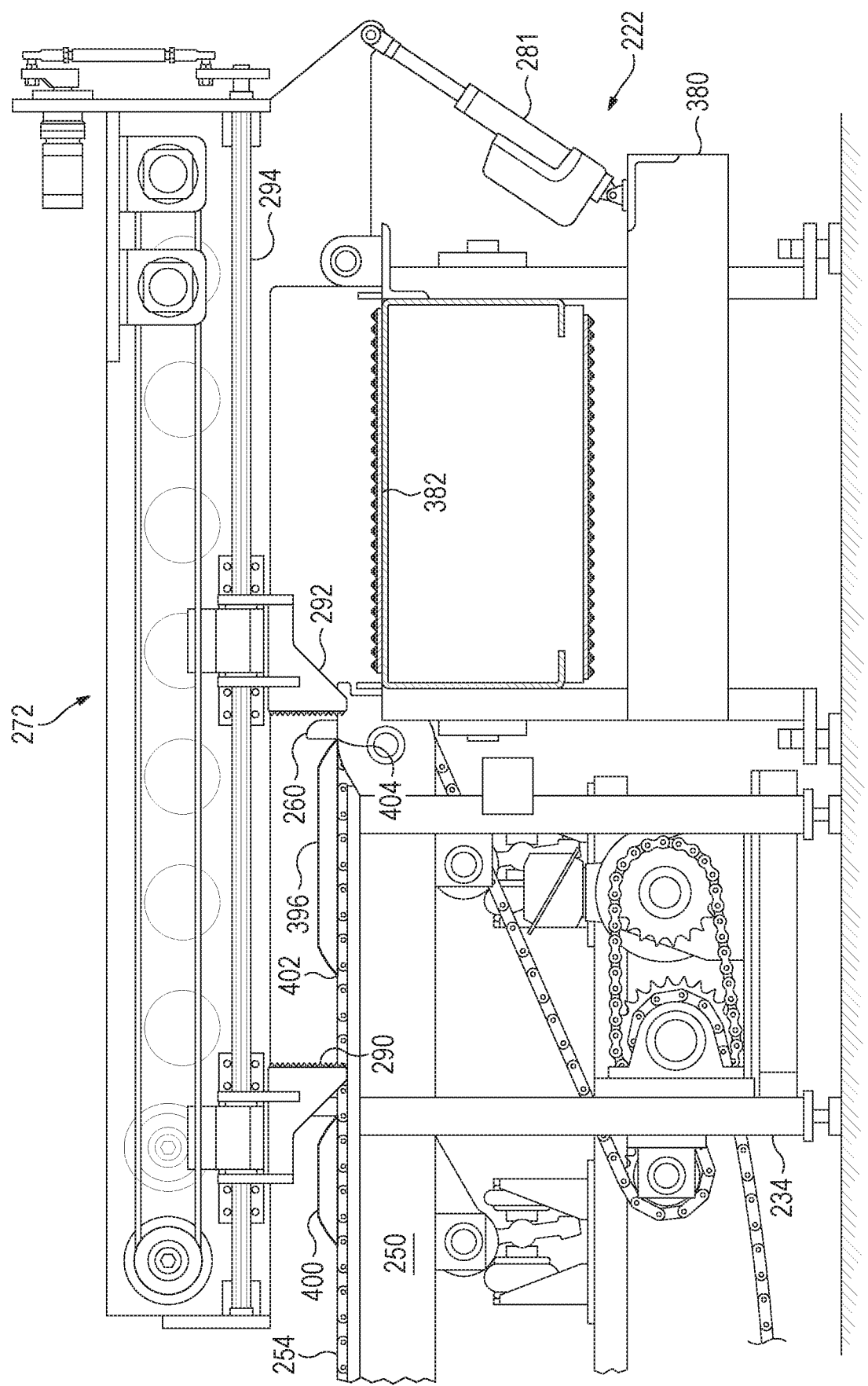
Figure 30:
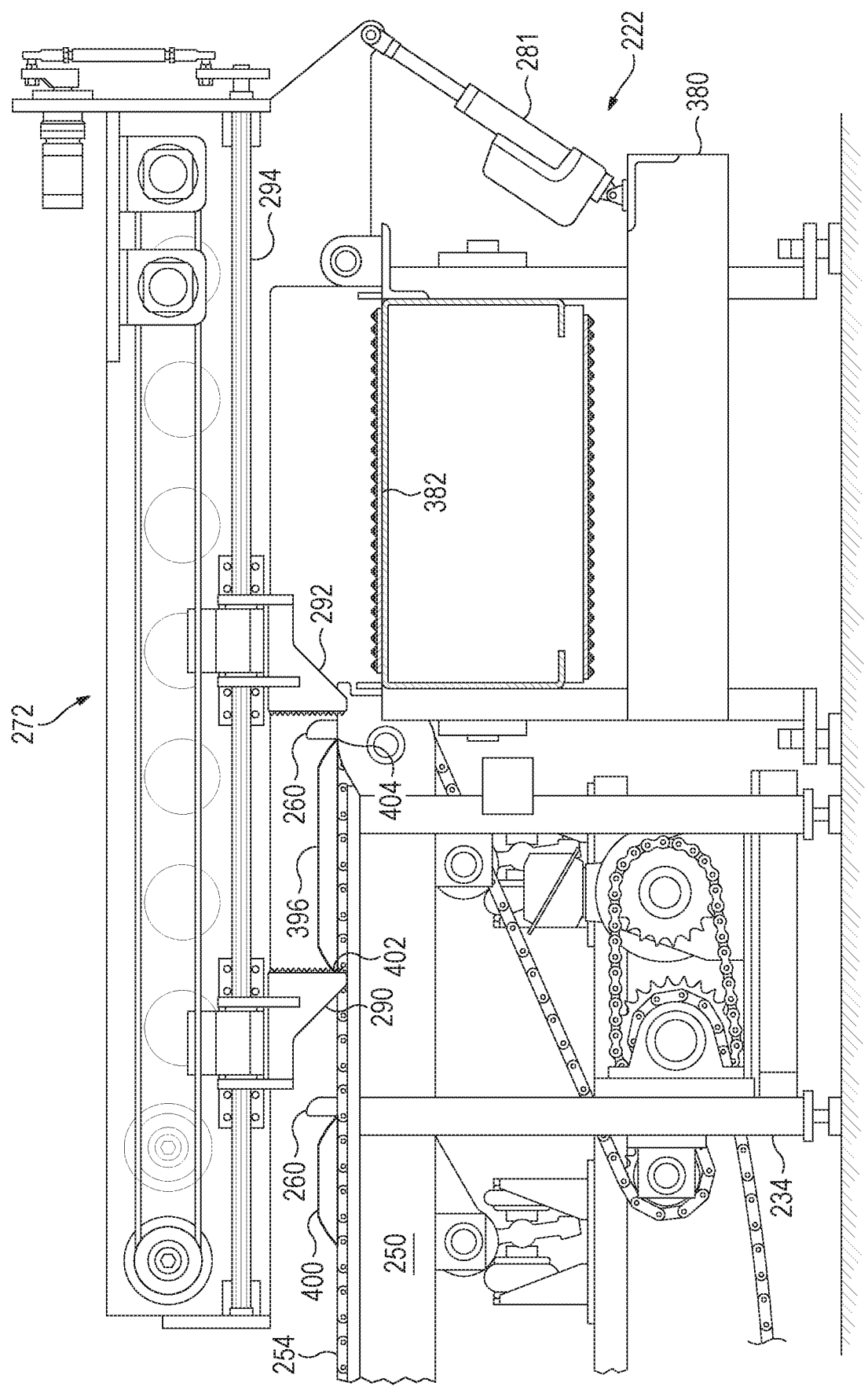
Figure 31:
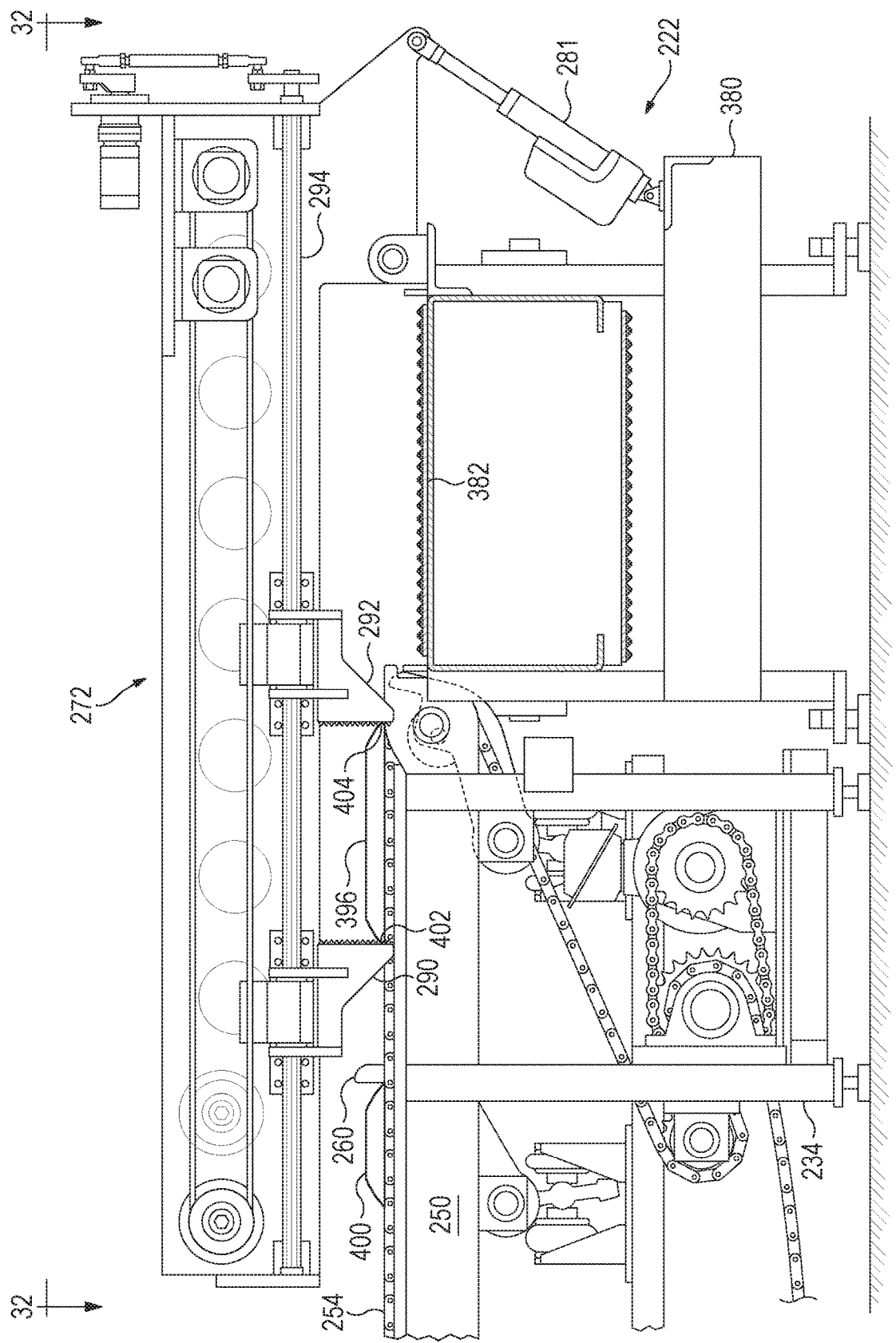
Figure 32:
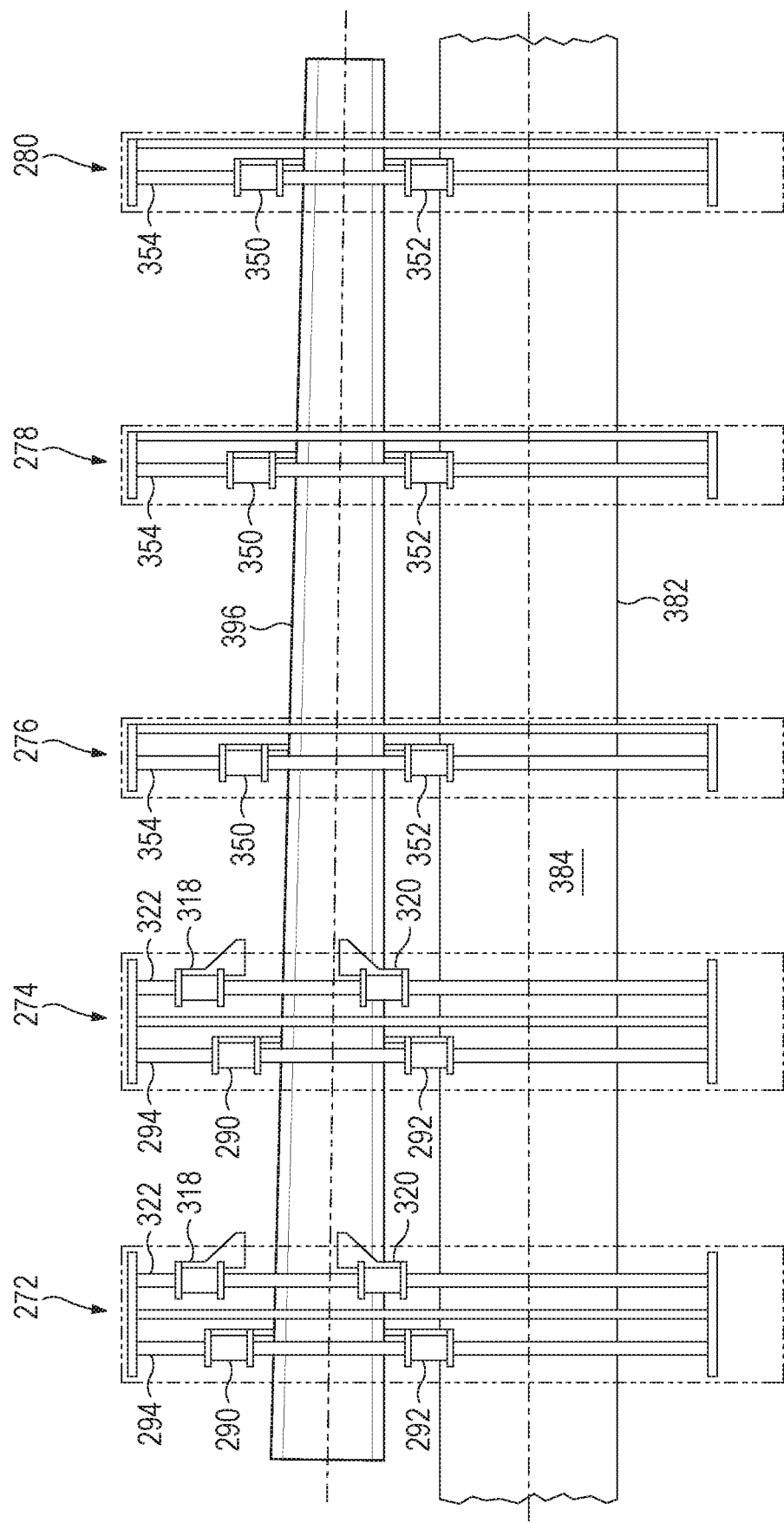

Referring to FIG. 29, the LH and RH dogs of the first set of fetchers of the fetcher subassemblies move from the stow position to the ready position. The LH and RH dogs are spaced from the lateral edges of the first flitch. Referring to FIG. 30, the LH dogs of the first set of fetchers of the fetcher subassemblies move to the grip position contacting a lateral edge 402 of the first flitch and pushing the first flitch against hook stop #7 to a predetermined motor torque and then lock in position becoming the master datum position. Referring to FIGS. 31-32, the RH dogs of the first set of fetchers of the fetcher subassemblies move to the grip position contacting and pushing against opposed lateral edge 404 of the first flitch to a predetermined motor torque (which may be slightly less than the LH dog motor torque) becoming the slave position. The control computer determines the widths of the flitch (e.g., large end width and small end width) via the grip position of the LH and RH dogs near each opposed longitudinal end of the flitch to determine the geometric centerline of the flitch (split taper). After flitch is clamped, hook stops #7 lower below top of chain.

Figure 33:
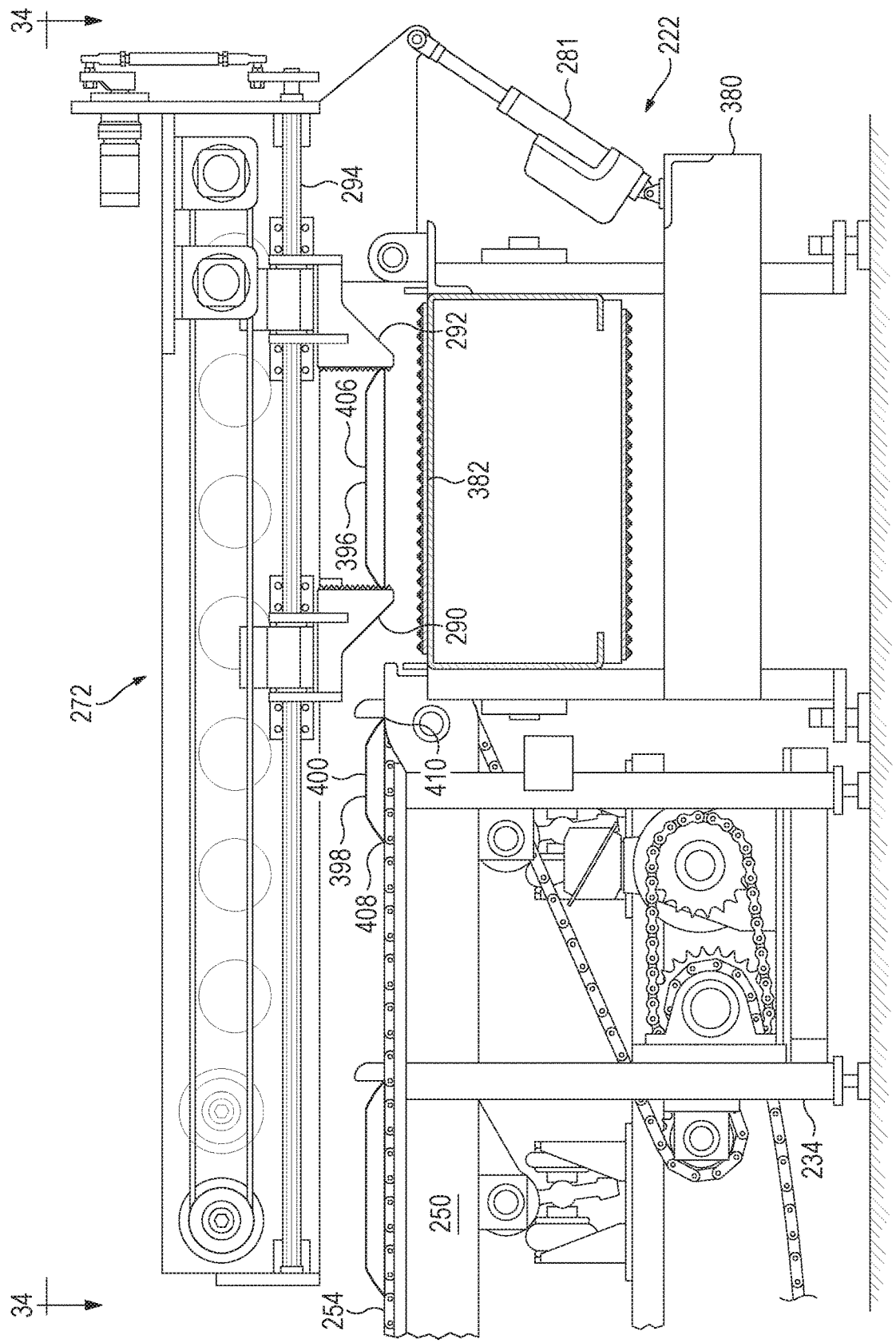
Figure 34:
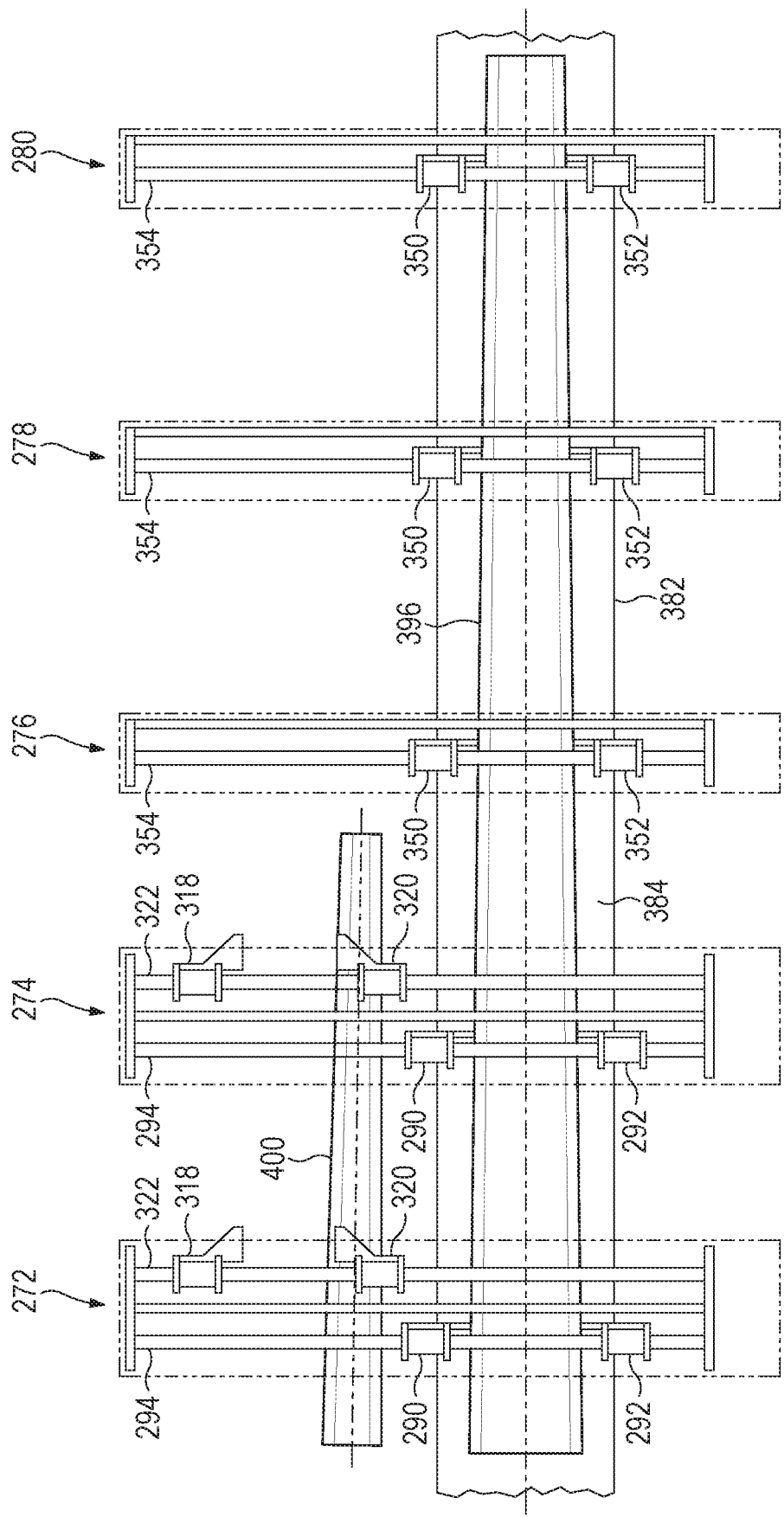

Referring to FIGS. 33-34, the LH and RH dogs of the first set of fetchers of the fetcher subassemblies move first flitch 396 to an edger ready position 406 above the transport surface of the conveyor belt of edger infeed mechanism 222. The LH and RH dogs in the middle fetcher subassemblies follow flitch as it is transferred to maintain clamping force on the flitch being moved or transferred. Second flitch 400 is in transfer ready position 398 against hook stop #7. Subsequently, the LH and RH dogs of the second set of fetchers of the fetcher subassemblies move from the stow position to the ready position spaced from the second flitch. The LH dogs of the second set of fetchers of the fetcher subassemblies move to the grip position contacting a lateral edge 408 of second flitch 400 and pushing the second flitch against hook stop #7.

Figure 36:
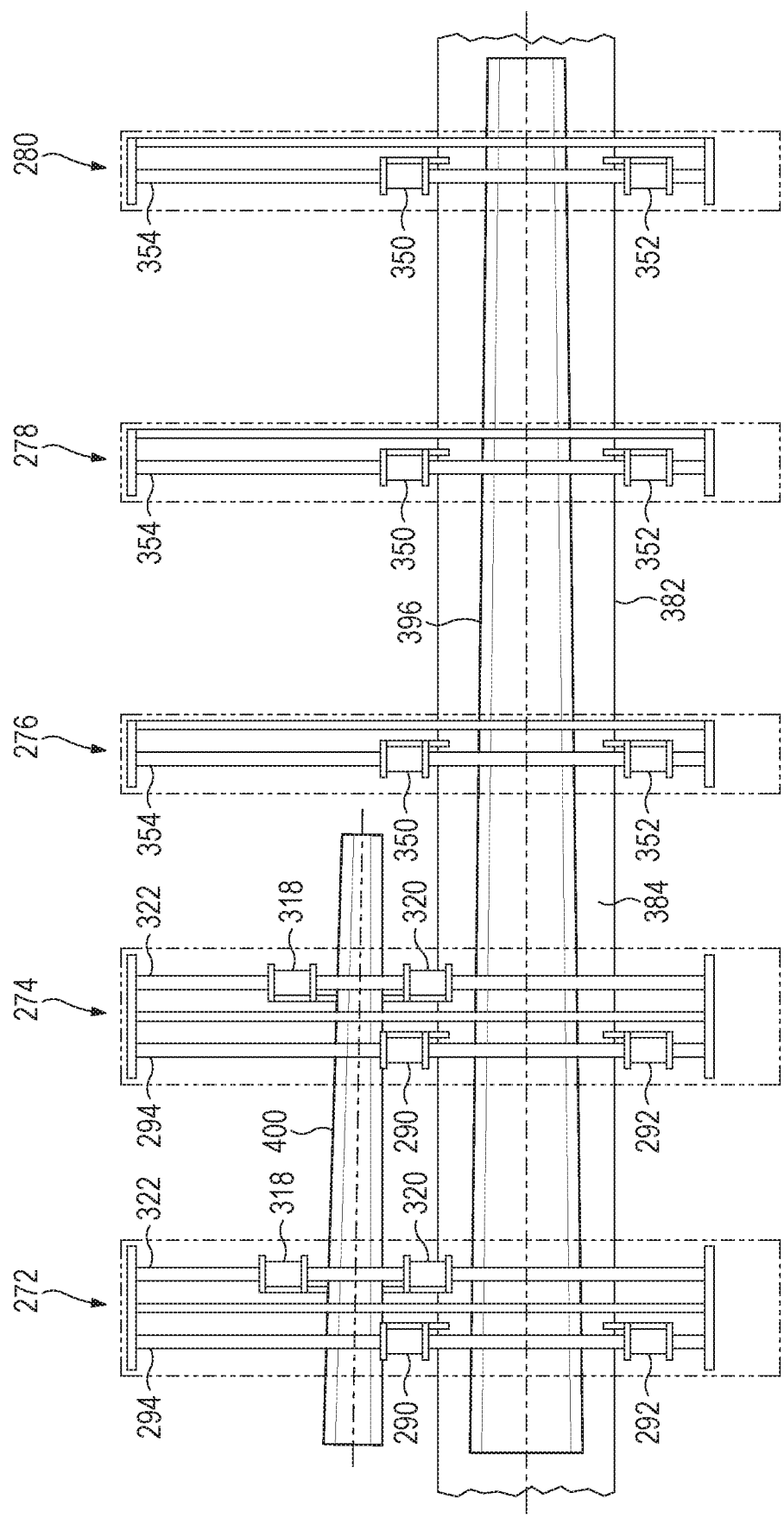

Referring to FIGS. 35-36, the LH and/or RH dogs of the first set of fetchers of the fetcher subassemblies move away from the first flitch to release the first flitch onto the transport surface of the conveyor belt of edger infeed mechanism 222 for the transport surface to deliver the first flitch through the scanner system and to the edger. Additionally, the RH dogs of the second set of fetchers of the fetcher subassemblies move to the grip position contacting and pushing against opposed lateral edge 410 of the second flitch. Subsequently, the LH and RH dogs of the first set of fetchers of the fetcher subassemblies move to the stow position to clear a path for the second flitch.

Figure 37:
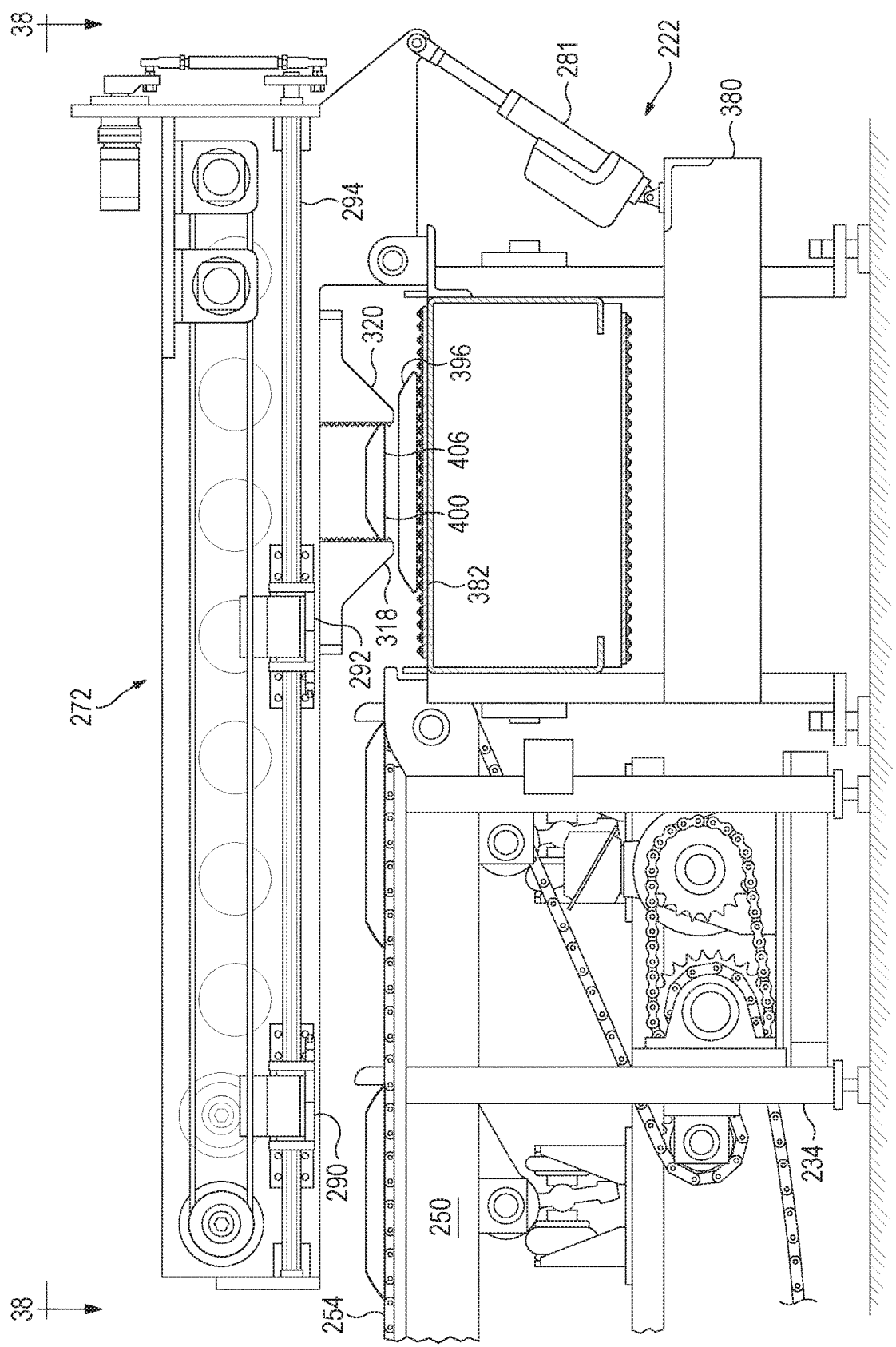
Figure 38:
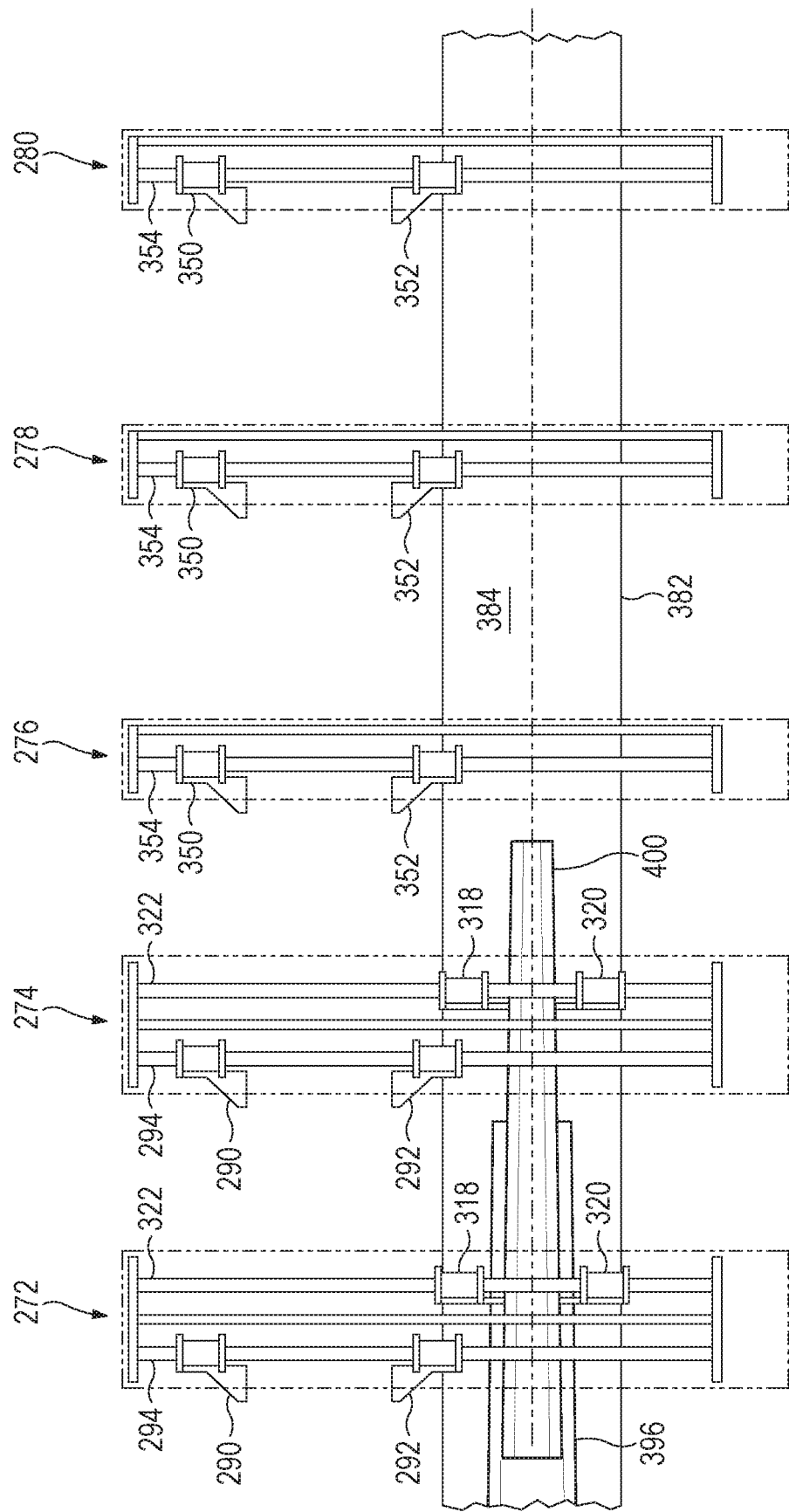
Figure 39A:
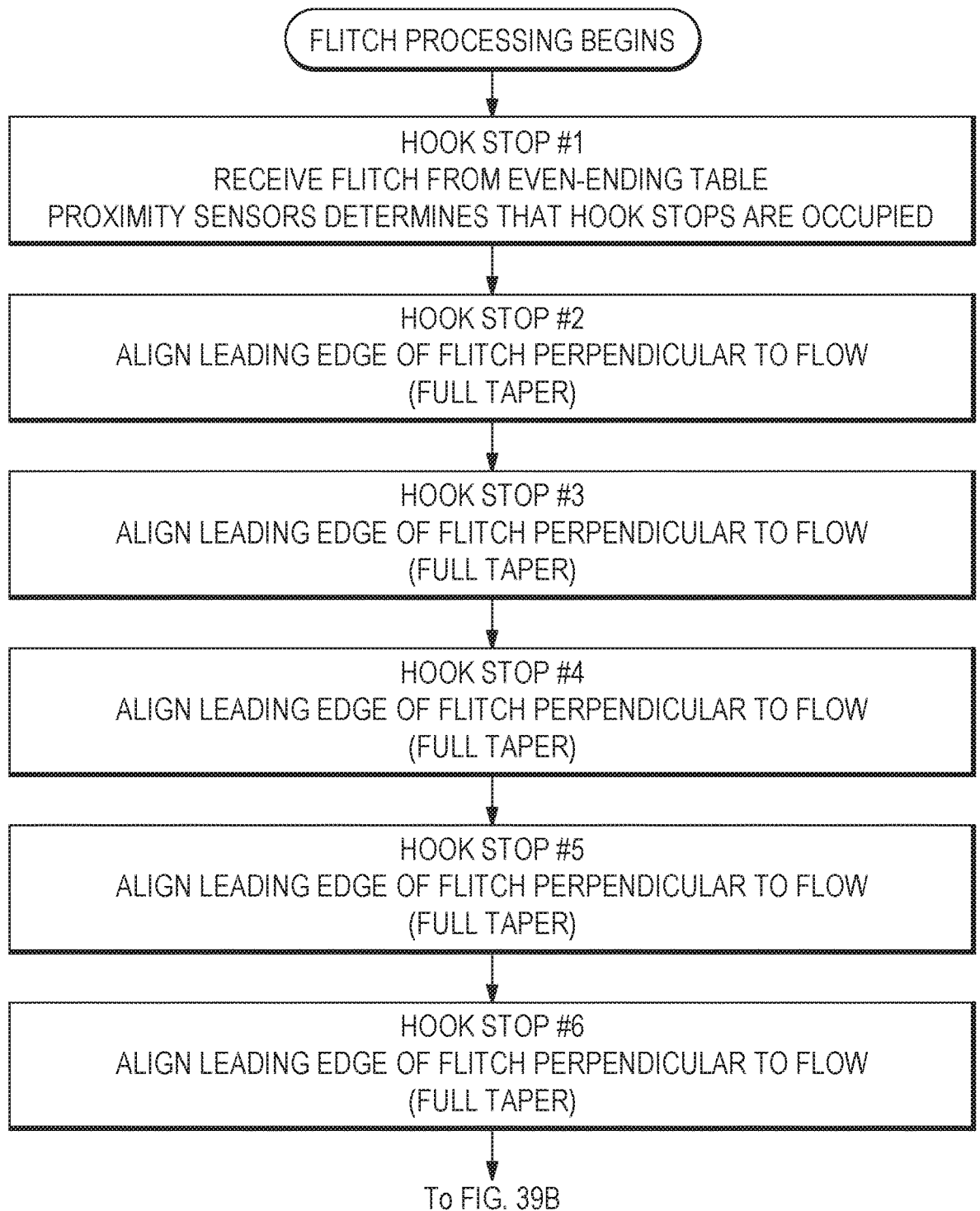
Figure 39C:
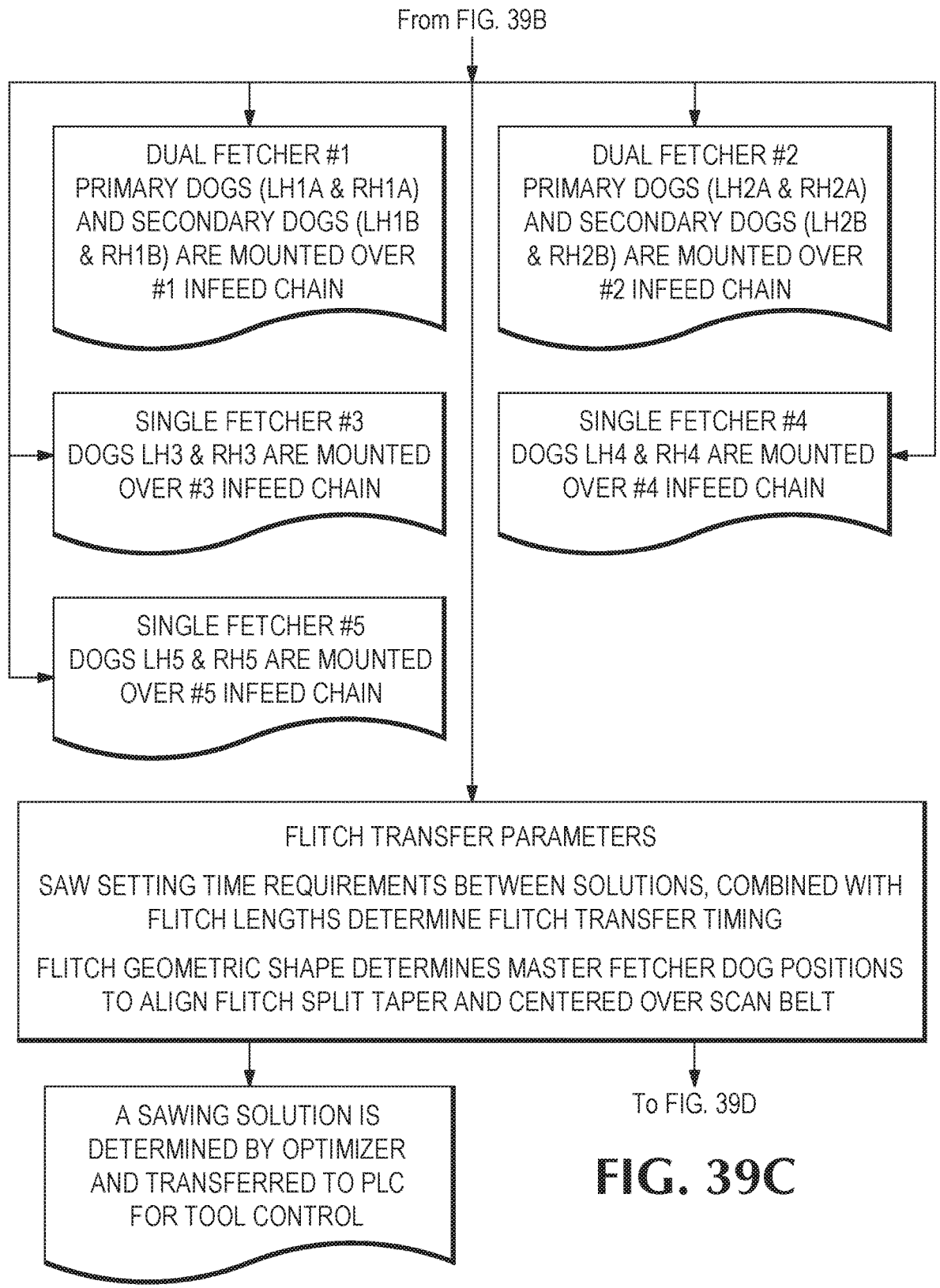
Figure 39E:
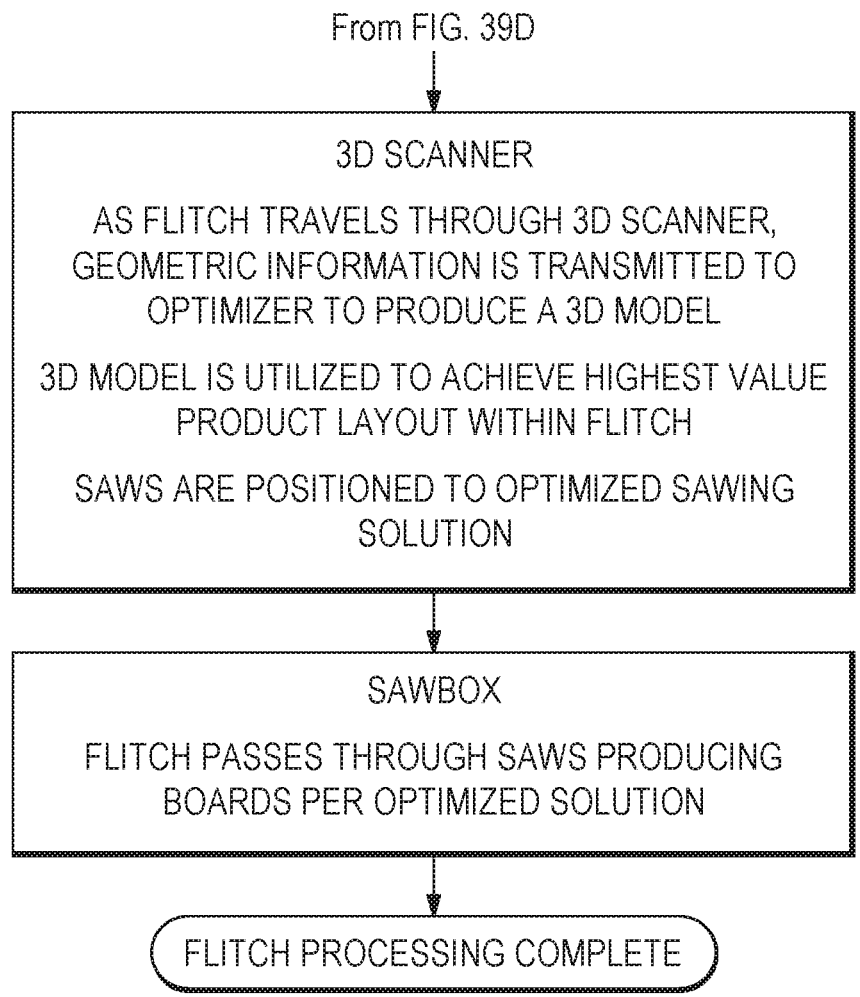

Referring to FIGS. 37-38, the LH and RH dogs of the second set of fetchers of the fetcher subassemblies move second flitch 400 to edger ready position 406, which occurs prior to the first flitch moving clear from beneath the edger ready position. In other words, second flitch 400 is in the edger ready position prior to first flitch 396 moving past, or downstream from, the fetcher assembly. Subsequently, the conveyor belt of edger infeed mechanism 222 moves first flitch 396 clear from beneath the edger ready position and the LH and/or RH dogs of the second set of fetchers of the fetcher subassemblies move apart to release second flitch 400 onto the transport surface of the conveyor belt of edger infeed mechanism 222 for the transport surface to deliver the first flitch through the scanner system and to the edger.

Depending on scanning and sawing operations of prior flitches, second flitch 400 may be held in the edger ready position for a predetermined amount of time after first flitch 396 clears from beneath the edger ready position before the second flitch is released onto the conveyor belt. For example, when the sawing solution for the flitch being moved laterally into the edger ready position calls for it to be sawn by the edger into the same number and sizes of boards as the immediately preceding flitch, very little time is required for adjustment of the positions of the edger saw blades by the servo motors as directed by the control computer. There is then only a minimum delay required between the tail end of a preceding flitch and the leading end of the flitch about to be lowered onto the conveyor belt of the edger infeed mechanism. However, when the flitch is to be sawn into boards of different widths and locations on the flitch than how the preceding flitch has been sawn, the positions of the edger saw blades must be adjusted along the edger saw arbor using servo motors controlled by the control computer. This requires additional time (and resulting distance along conveyor belt) between the tail end of the preceding flitch and the leading end of the flitch. That distance may be determined by a photocell sensing passage by the tail end of the preceding flitch, and by data from encoders on the feed roller of the edger. The edger saws can be quickly relocated on the arbor as controlled by the computer, using data from the optimizer and processed through the programmable logic controller. The edger can thus be quickly adjusted to saw flitches into different widths of boards.

The above process of holding a second flitch in the edger ready position while a portion of the first flitch is on a part of the edger infeed mechanism that is directly below the second flitch may be performed with only the first set of fetchers (such as when the first and second flitches are above a predetermined length), and/or both first and second set of fetchers (such as when the first and/or second flitches are at or below a predetermined length, e.g., 10 feet). In other words, when the first and second flitches are above the predetermined length, the same set of fetchers for moving the first flitch from the transfer ready position onto the conveyor belt of the edger infeed mechanism may be used for moving the second flitch from the transfer ready position onto the conveyor belt of the edger infeed mechanism. Edger feed apparatus 221 includes five fetcher subassemblies but only two of those subassemblies includes dual sets of fetchers because the second set of fetchers are involved only when the flitch is at or below the predetermined length. However, other examples of the edger feed apparatus may include more fetcher subassemblies having dual sets of fetchers, such as when the above process of holding a second flitch in the edger ready position while a portion of the first flitch is directly below the second flitch is performed regardless of the length of the flitches.

The transfer of the flitch from the carriage assembly to the edger infeed mechanism and the change of direction from lateral movement to longitudinal movement of the flitch can all occur within a very brief time, because the flitches moving laterally are at a higher location than the flitches moving longitudinally and have a shorter travel distance, and thus, the flitches moving laterally can be moved precisely, controlled by the fetcher assembly to a properly oriented edger ready position directly above the edger infeed mechanism that is moving longitudinally toward the edger saw blades, and the flitch then can be lowered onto the conveyor belt of the edger infeed mechanism.

Each time division on the time axis in FIG. 41 represents 100 milliseconds (ms). As may be seen in FIG. 41, an entire cycle 412 (first fetchers) or 414 (second fetchers) of moving a flitch from the transfer ready position, through the edger ready position, and releasing the flitch from the edger ready position onto the edger infeed mechanism, occurs in a very short time (e.g., about 2 seconds). Additionally, cycles 412 and 414 overlap by about 1 second. The numbered steps shown in FIG. 41 are listed in the following table:

TABLE 1

1. First set of dogs rotate down around the first flitch
2. LH dogs push the first flitch against the hooks stops, clamping the first flitch (e.g., with 15 lbs. force)
3. Slave RH dogs push the first flitch back against the master LH dogs (e.g., with 10 lbs. force) and the hooks stops drop below chain. LH and RH dogs measure width of the first flitch on lumber line and measure width of first flitch on clear line end. All dogs advance, geometrically centering the flitch, split taper over the belt.
4. LH and RH dogs pause in position over the belt, hook stops raise
5. LH dogs retract 2" and RH dogs advance 2", releasing the first flitch onto the belt.
6. LH and RH dogs raise.
7. LH dogs retract to 0" position, RH dogs retract to 30" position.
8. Waiting for next flitch to travel up against the hooks stop.
9. Second set of dogs rotate down around the second flitch
10. LH dogs push the second flitch against the hooks stops, clamping the second flitch (e.g., with 15 lbs. force)

TABLE 1-continued

11. Slave RH dogs push the second flitch back against the master LH dogs (e.g., with 10 lbs. force) and the hooks stops drop below chain. LH and RH dogs measure width of the second flitch on lumber line and measure width of second flitch on clear line end. All dogs advance, geometrically centering the second flitch, split taper over the belt.
12. LH and RH dogs pause in position over the belt, hook stops raise
13. LH dogs retract 2" and RH dogs advance 2", releasing the second flitch onto the belt.
14. LH and RH dogs raise.
15. LH dogs retract to 0" position, RH dogs retract to 30" position.
16. Waiting for next flitch to travel up against the hooks stop.

Prior to step 1 above, the LH dogs are up at 0" position, RH dogs are up at load position (2" past hook stop) and, subsequently, the first flitch travels up against the hook stop in the loading position. Additionally, prior to step 9 above, LH dogs are up at 0" position and RH dogs are up at 30" position and, subsequently, the second flitch travels against the hook stop in the loading position. Any suitable number of the LH dogs may be the master dogs, while any suitable number of the RH dogs may be the slave dogs. For example, the LH dogs proximate the ends of a particular flitch may be the master dogs for that flitch.

Other examples of edger feed apparatus may include different combinations of the structures and/or components of edger feed apparatus 21 and 221. For example, referring to FIG. 42, another example of edger feed apparatus 21 according to the present disclosure is generally indicated at 421. Unless explicitly stated, edger feed apparatus 421 may additionally, or alternatively, include one or more other components of one or more other edger feed apparatus of the present disclosure. Edger feed apparatus 421 includes the same components of edger feed apparatus 221 with the addition of transverse scanner system 442 positioned above carriage assembly 432 and adjacent fetcher assembly 470, which are in addition to a linear scanner system 488. The transverse scanner systems may include one, two or more scanners, which are controlled and operated by various components shown schematically in FIG. 44. Transverse scanner system 442 may perform one or more (or all) of the steps performed by linear scanner system 388 in edger feed apparatus 221. For example, a first transverse scanner of transverse scanner system 442 may scan the flitch on the carriage assembly for grade defects (such as at hook stop #3), create a three-dimensional model of the flitch locating defects (such as at hook stop #4), a second transverse scanner of transverse scanner system 442 may scan the flitch to determine geometric shape (such as at hook stop #5), and create a three-dimensional model of the flitch to so suit product layout considering the defects and shape (such as at hook stop #6). The control computer may then determine a sawing solution based on the information from transverse scanner system 442.

Linear scanner system 488 may then serve as a verification scanner to determine the flitch's actual position on the conveyor belt of the edger infeed mechanism relative to the calculated position determined by the fetcher assembly. The cutting tools of the edger are then positioned based on the actual position of the flitch. Other examples of the edger feed apparatus of the present disclosure may include only one or more transverse scanners and exclude the linear scanner system. Additionally, edger feed apparatus 221 and/or 441 may additionally, or alternatively, include one or more other components described in the present disclosure. For example, edger feed apparatus 221 and/or 441 may include a flitch turner described for the scanner and carriage assembly in edger feed apparatus 21. Additionally, edger feed apparatus 221 and/or 441 may include a sharpchain and press rollers of edger feed apparatus 21 instead of the conveyor belt of the edger infeed mechanism.

Figure 44:
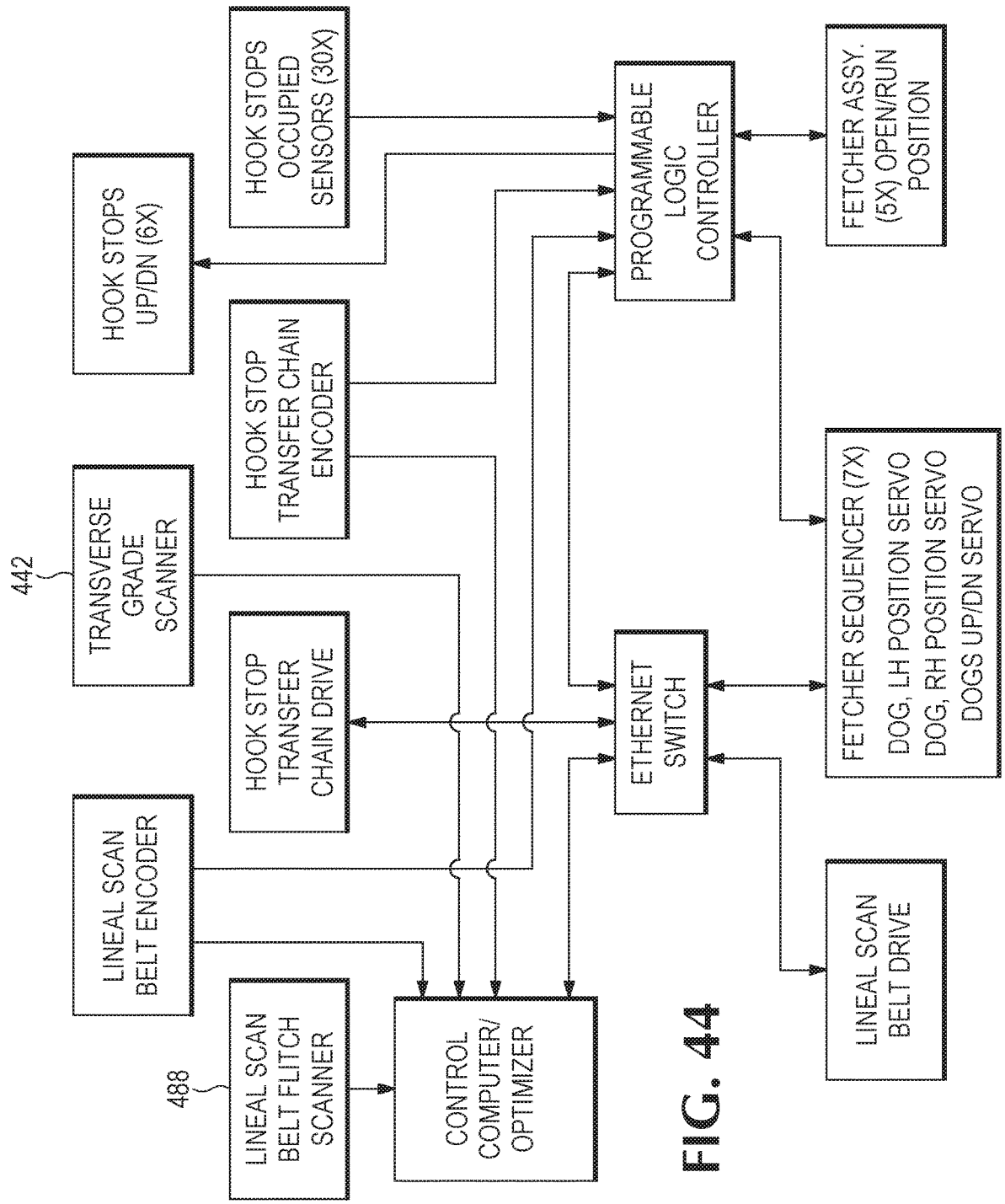
FIG. 44 is a block diagram of the control signal paths between some of the sensors and control and flitch-moving portions of the edger feed apparatus shown in FIG. 42.

An example of the sequence of steps for carrying flitches through edger feed apparatus 421 and the edger is shown in a flow chart in FIGS. 43A-43E. Other examples of the sequence of steps may add, omit, replace, and/or substitute one or more steps shown in FIGS. 43A-43E, such as with one or more steps described in the present disclosure (e.g., FIGS. 18 and/or 39A-39E flowcharts). An example of the components and communication connections between those components are shown in FIG. 44. However, there may be additional and/or alternative components and/or communication connections as described in the present disclosure (e.g., FIGS. 19 and/or 40).

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:
1. An edger feeder apparatus for feeding flitches into an edger, comprising:
a flitch carriage assembly arranged to move a plurality of elongate flitches serially and in a transverse, lateral, direction relative to a length of each of the flitches, toward a transfer ready position at a delivery end of the flitch carriage assembly;
an edger infeed mechanism arranged to engage and carry the flitches into the edger, in a longitudinal direction with respect to the flitches; and
a fetcher assembly arranged to transfer each of the plurality of flitches in turn from the transfer ready position on the flitch carriage assembly to the edger infeed mechanism, the fetcher assembly including
a first set of fetchers located over the delivery end of the flitch carriage assembly, arranged to carry a first flitch in a lateral direction from the transfer ready position to an edger ready position spaced upwardly apart from the edger infeed mechanism and to release the first flitch in the edger ready position such that the first flitch lands on the edger infeed mechanism for delivery of the first flitch to the edger via the edger infeed mechanism, and
a second set of fetchers located adjacent the first set of fetchers arranged to carry a second flitch in the lateral direction from the transfer ready position to the edger ready position while a portion of the first flitch is on a part of the edger infeed mechanism that is directly below the second flitch, and to release the second flitch on to the edger infeed mechanism when the first flitch has moved clear from beneath the edger ready position,
wherein the first and second sets of fetchers each includes two or more pairs of dogs that transversely grip a flitch of the plurality of flitches in the transfer ready position, move the flitch to the edger ready position, and release the flitch on to the edger infeed mechanism,
wherein the fetcher assembly includes a plurality of parallel and elongate rods that are transverse to the direction of travel of the flitches on the edger infeed mechanism, wherein each pair of dogs of the two or more pairs of dogs is slidably connected to a different rod of the plurality of rods, wherein each dog of each pair of dogs of the two or more pairs of dogs includes a generally planar member having an edge with teeth for gripping a flitch of the plurality of flitches, and wherein each rod of the plurality of rods rotates a pair of dogs between a ready position in which the dogs are perpendicular to a flitch in the transfer ready position, and a stow position in which the dogs are parallel to a flitch in the transfer ready position.

2. The apparatus of claim 1, further comprising:

a scanner system located adjacent the flitch carriage assembly and arranged to measure each of the plurality of flitches at a plurality of locations on each of the flitches, wherein the scanner system is located in position to measure each one of the plurality of flitches prior to the respective arrival of each one of the plurality of flitches at the delivery end of the flitch carriage assembly; and a control computer arranged to receive data for each flitch of the plurality of flitches from the scanner system and to determine a sawing solution to be implemented at the edger for each flitch.

3. The apparatus of claim 1, further comprising:

a scanner system located adjacent the edger infeed mechanism and arranged to measure each flitch of the plurality of flitches as the flitch is being moved toward the edger on the edger infeed mechanism; and a control computer arranged to receive data for each flitch of the plurality of flitches from the scanner system and to determine a sawing solution to be implemented at the edger for each flitch.

4. The apparatus of claim 1, further comprising:

a first scanner system located adjacent the flitch carriage assembly and arranged to measure each of the plurality of flitches at a plurality of locations on each of the flitches, wherein the first scanner system is located in position to measure each one of the plurality of flitches prior to the respective arrival of each one of the plurality of flitches at the delivery end of the flitch carriage assembly;

a second scanner system located adjacent the edger infeed mechanism and arranged to determine a position of each flitch of the plurality of flitches of the edger infeed mechanism; and a control computer arranged to receive data for each flitch of the plurality of flitches from the first scanner system and to determine a sawing solution to be implemented at the edger for each flitch and to receive data for each flitch of the plurality of flitches from the second scanner system and adjust cutting tools of the edger to implement the sawing solution based on the received data from the second scanner system.

5. The apparatus of claim 1, wherein, when a pair of dogs of the two or more pairs of dogs is in the ready position, the pair of dogs further moves between a grip position in which the pair of dogs contact a flitch in the transfer ready position and a release position in which the pair dogs is spaced from a flitch in the transfer ready position.

6. A method of feeding flitches into an edger, comprising:

placing first and second flitches each having a length and a width onto a flitch carriage assembly, the placed first and second flitches being spaced from each other;

moving the first and second flitches laterally toward an edger infeed mechanism;

moving the first flitch laterally from the flitch carriage assembly to an edger ready position that is a predetermined distance above the edger infeed mechanism;

releasing the first flitch onto the edger infeed mechanism;

carrying the first flitch on the edger infeed mechanism in a direction that is parallel with the length of the flitch and that is toward the edger;

moving the second flitch laterally from the flitch carriage assembly to the edger ready position such that the second flitch is in the edger ready position while a portion of the first flitch is directly below the second flitch;

retaining the second flitch in the edger ready position for a predetermined time after the first flitch is no longer directly below the second flitch;

releasing the second flitch onto the edger infeed mechanism at the end of the predetermined time; and carrying the second flitch on the edger infeed mechanism in the direction that is parallel with the length of the flitch and that is toward the edger.

7. The method of claim 6, further comprising:

scanning the first and second flitches while the first and second flitches remain on the flitch carriage assembly; and producing a three-dimensional digital model of the first and second flitches in a computer on the basis of the data obtained by scanning the first and second flitches.

8. The method of claim 6, further comprising:

scanning the first and second flitches while the first and second flitches are on the edger infeed mechanism; and producing a three-dimensional digital model of the first and second flitches in a computer on the basis of the data obtained by scanning the first and second flitches.

9. The method of claim 6, further comprising:

scanning the first and second flitches while the first and second flitches remain on the flitch carriage assembly;

producing a three-dimensional digital model of the first and second flitches in a computer on the basis of the data obtained by scanning the first and second flitches on the flitch carriage assembly;

scanning the first and second flitches while the first and second flitches are on the edger infeed mechanism; and confirming the position of the first and second flitches on the edger infeed mechanism on the basis of the data obtained by scanning the first and second flitches on the edger infeed mechanism.

10. The method of claim 6, wherein the predetermined time includes sufficient time for a saw blade of the edger to be repositioned as required to saw the second flitch, after the first flitch has been sawn and has cleared the saw blade of the edger, and before the second flitch engages the saw blade of the edger.

11. The method of claim 6, further comprising:

determining, from the three-dimensional digital model of the first and second flitches, a set of dimensions of a preferred set of boards that can be produced by utilizing the edger to cut the first and second flitches; and positioning a plurality of saw blades of the edger to respective positions in the edger so as to cut the first and second flitches to produce the preferred set of boards, before the edger infeed mechanism carries the first and second flitches into engagement by the saw blades of the edger.

12. The method of claim 6, wherein moving the first and second flitches laterally from the flitch carriage assembly to the edger ready position includes gripping the first and second flitches on opposed transverse sides of the first and second flitches.

13. The method of claim 12, wherein releasing the first and second flitches onto the edger infeed mechanism includes releasing the grip on the opposed transverse sides of the first and second flitches to allow the first and second flitches to fall onto the edger infeed mechanism.

14. The method of claim 6, wherein moving the second flitch laterally from the flitch carriage assembly to the edger ready position includes moving, via a first set of fetchers and when the first and second flitches are above a predetermined length, the second flitch laterally from the flitch carriage assembly such that the second flitch is in the edger ready position while a portion of the first flitch is directly below the second flitch.

* * * * *